United States Patent [19]

Nakadai et al.

[11] Patent Number: 4,959,599

[45] Date of Patent: Sep. 25, 1990

[54] HEAD POSITIONER

[75] Inventors: Katsuo Nakadai; Izumi Miyake; Kiyotaka Kaneko; Kazuya Oda, all of Tokyo, Japan

[73] Assignee: Fuji Photo Film Co., Ltd., Kanagawa, Japan

[21] Appl. No.: 268,443

[22] Filed: Nov. 8, 1988

Related U.S. Application Data

[62] Division of Ser. No. 864,685, May 19, 1986, Pat. No. 4,811,133.

[30] Foreign Application Priority Data

| May 22, 1985 | [JP] | Japan | 60-109512 |
| May 23, 1985 | [JP] | Japan | 60-111252 |
| Jun. 10, 1985 | [JP] | Japan | 60-125289 |
| Aug. 16, 1985 | [JP] | Japan | 60-180742 |
| Sep. 19, 1985 | [JP] | Japan | 60-207353 |
| Sep. 28, 1985 | [JP] | Japan | 60-215606 |
| Sep. 30, 1985 | [JP] | Japan | 60-217739 |
| Nov. 1, 1985 | [JP] | Japan | 60-245927 |
| Nov. 2, 1985 | [JP] | Japan | 60-246831 |
| Nov. 13, 1985 | [JP] | Japan | 60-255685 |

[51] Int. Cl.$^5$ .................. H02P 5/46; G05B 19/28
[52] U.S. Cl. ................... 318/603; 318/480; 318/601; 318/602; 250/233; 340/671; 360/77.03
[58] Field of Search .......... 318/138, 254, 257, 439, 318/603-632, 470, 480; 388/800-841; 360/73.01, 73.07, 73.13, 77.01, 77.03, 77.06, 77.07, 77.16, 77.17, 78.01, 78.05, 78.07, 78.08, 78.11, 78.14; 250/211 R, 233, 234, 236; 340/671

[56] References Cited

U.S. PATENT DOCUMENTS

| 2,968,756 | 1/1961 | Devol | 318/480 X |
| 3,096,444 | 7/1963 | Seward | 250/233 X |
| 3,178,992 | 4/1965 | Murphy et al. | 250/233 X |
| 3,348,050 | 10/1967 | Bez | 250/233 X |
| 3,370,289 | 2/1968 | Hedgrock et al. | 340/671 X |
| 3,381,288 | 4/1968 | Van Vlodrop | 340/671 X |
| 3,590,355 | 6/1971 | Davis | 318/603 X |
| 3,723,748 | 3/1973 | Coburn et al. | 250/233 |
| 3,831,402 | 8/1974 | Schuman | 250/233 X |
| 3,843,915 | 10/1974 | Helmbold | 318/603 X |
| 4,360,769 | 11/1982 | Selkey et al. | 318/601 |
| 4,507,590 | 3/1985 | Miyazaki | 318/602 X |
| 4,591,969 | 5/1986 | Bloom et al. | 318/603 X |
| 4,604,725 | 8/1986 | Davies et al. | 250/233 X |
| 4,736,140 | 4/1988 | Ernst | 318/480 X |

Primary Examiner—William M. Shoop, Jr.
Assistant Examiner—Paul Ip
Attorney, Agent, or Firm—Sughrue, Mion, Zinn, Macpeak & Seas

[57] ABSTRACT

An apparatus for positioning a recording or playback head over a rotating recording medium, such as a magnetic disk. When access to a desired track is attempted, the head is quickly moved and placed within a range close to the track under open loop control. When the head enters the range close to the desired track, the head control is switched to servo feed under closed loop control. During the servo feed, the head is moved according to a head position signal representing the actual position of the head, the head position signal being given by a head position detector having a portion moving together with the head. The head is thus directed to a predetermined position according to an error signal corresponding to the deviation of the head position. When the head has passed through the desired position, driving force in the reverse direction is generated and the head is forced back toward the desired position. The head thus oscillates around the desired position but converges to it.

6 Claims, 29 Drawing Sheets

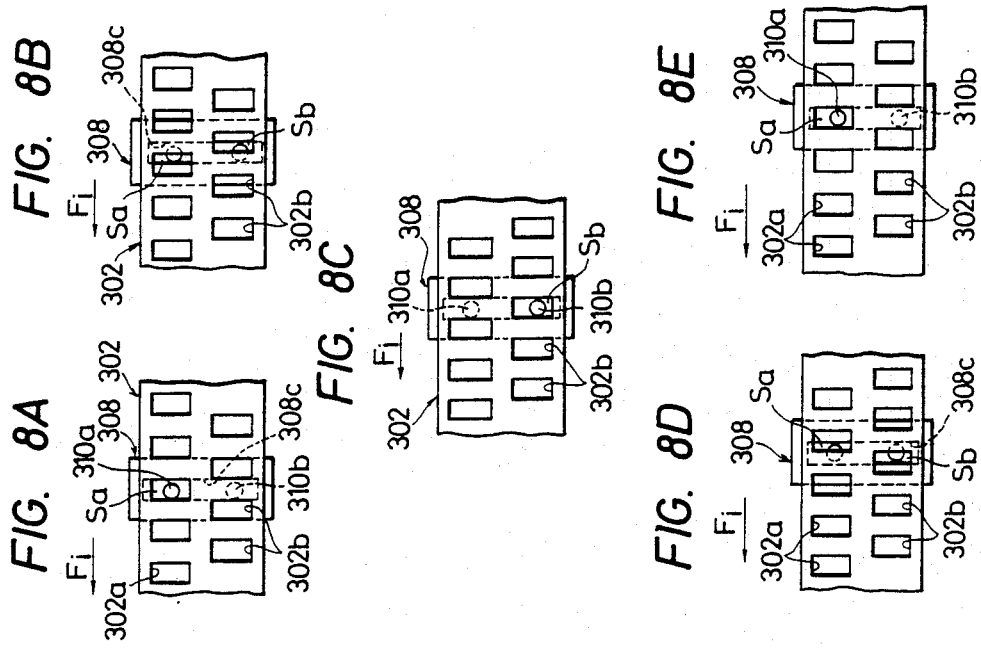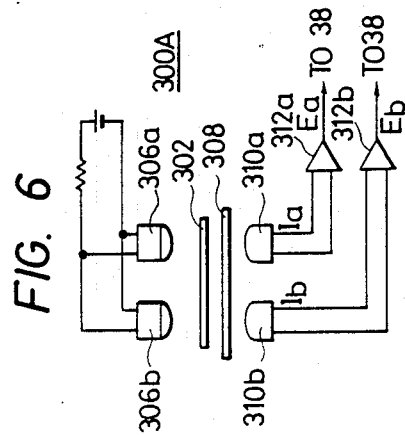

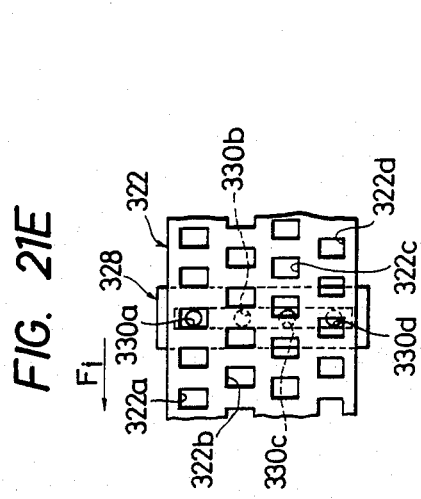
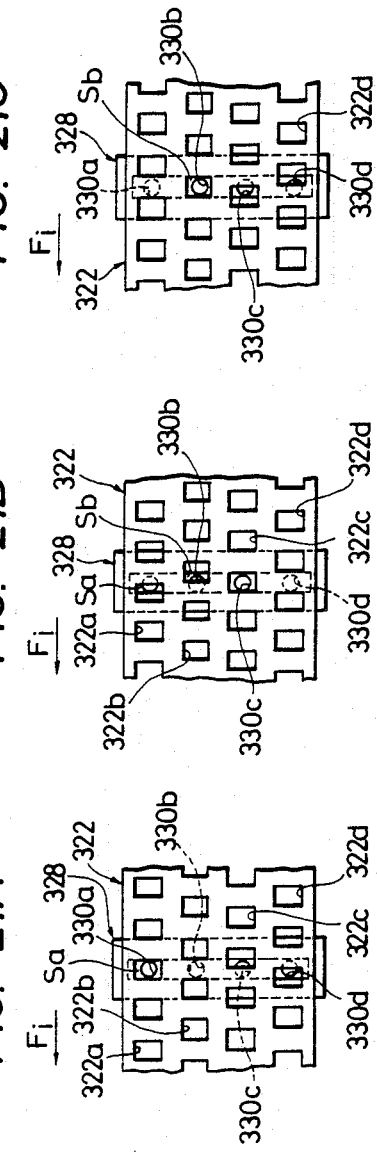
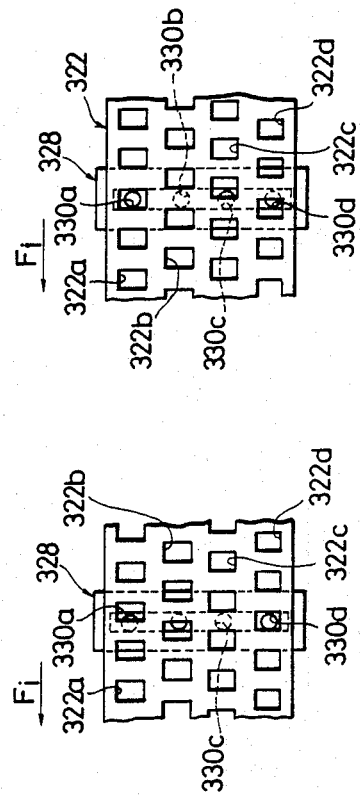

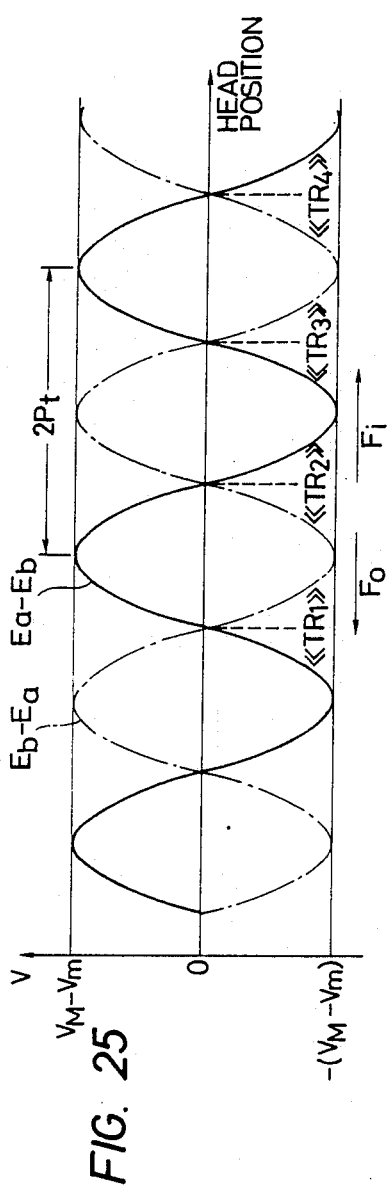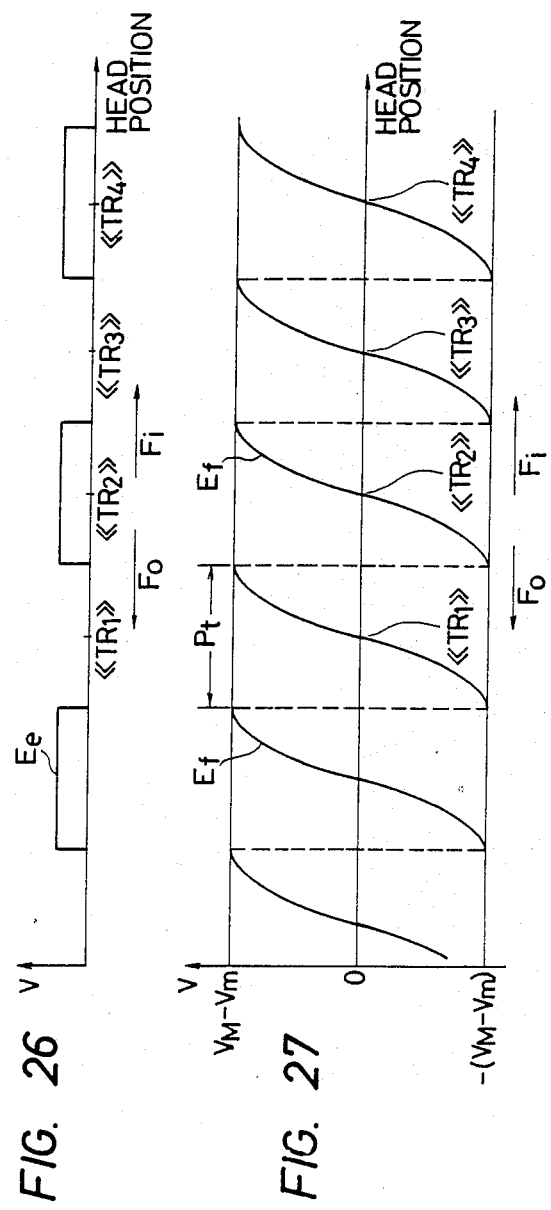
FIG. 25  FIG. 26  FIG. 27

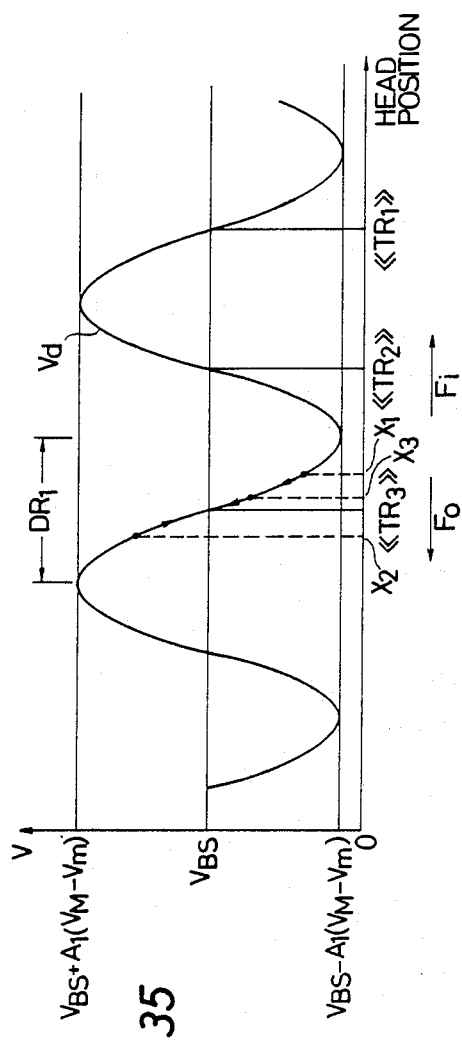
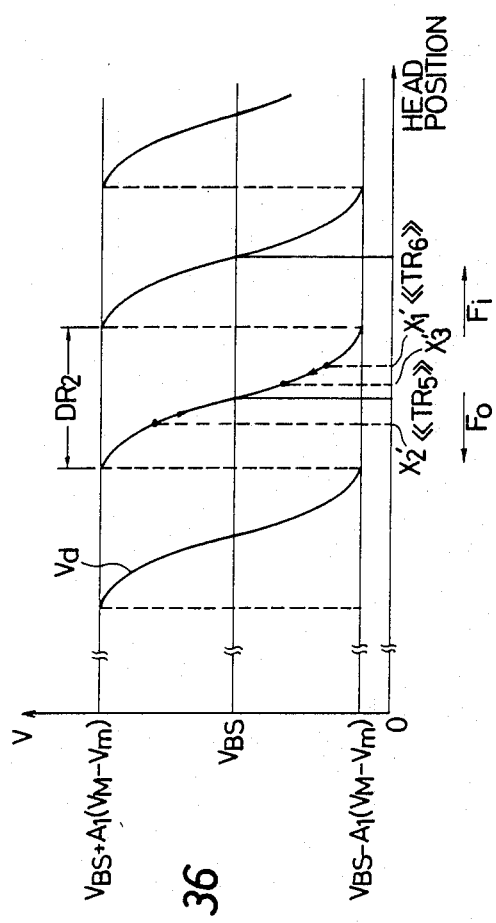
FIG. 35
FIG. 36

HEAD POSITIONER

This is a division of application Ser. No. 06/864,685 filed May 19, 1986, now U.S. Pat. No. 4,811,133.

BACKGROUND OF THE INVENTION

1. Field of the Invention

This invention relates to a device for recording or playing back video and data signals on or from a rotary recording medium such as a magnetic disk. More particularly, it relates to a high speed, accurate recording or playback head positioner.

2. Background Art

Recently developed electronic still cameras are designed to convert the still images of objects formed through lenses into video images by means of solid-state pickup elements, record the images on magnetic disks, and play back the images on separately installed television systems. Alternatively hard copies can be obtained by using printers.

In such a camera system, a magnetic disk about 5 cm in diameter is used and, as shown in FIG. 53, 50 recording tracks are concentrically formed thereon, each recording track band being 60 micrometers in width and each guard band between tracks being 40 micrometers in width.

The first photograph which is taken after a new disk is mounted on an electronic still camera, i.e., the first still image, is normally recorded in a first track position $TR_1$ which is outermost on a disk recording surface 10a. At that time, a recording head 12A shown in FIG. 1, arranged opposite to the disk recording surface 10a is moved from a fixed home position HP (see FIG. 53) to the first track position $TR_1$ and a signal which covers one field and which is equivalent to the still image is written to the whole circumference in the first track position $TR_1$ of the disk 10, which is rotating at a fixed speed of 3,600 rpm. When the first recording track is thus formed, the recording head 12A is kept at that first track position $TR_1$ on standby or returned to the home position HP.

When a second still image is recorded in a second track position $TR_2$ located one track (assuming a track pitch $P_t$ of 100 micrometers) toward the inner side of the first track position $TR_1$, the recording head 12A is moved from the first track position $TR_1$ or the home position HP to the second track position $TR_2$ and a field signal is written to the second track position $TR_2$ in the same manner as described above.

The recording head 12A is thus moved to a track position $TR_n$ where a field signal is written each time a still photograph is taken and, for this reason, utmost accuracy is required for such positioning. Unless the recording head 12A is accurately positioned, an actual track $tr_n$ will be formed in a position deviating from a corresponding track position $TR_n$ and it will be impossible to accurately access the track at the time of playback. In the worst case, the actual track and the adjacent track $tr_{n-1}$ or $tr_{n+1}$ may overlap and this will allow data to be recorded without forming a guard band. In this case, the playback head can scan the adjacent recording track $tr_{n-1}$ or $tr_{n+1}$ when the data is being read from the recording track $tr_n$, thus causing crosstalk.

Conventionally, a step motor is used to move and position the recording head 12A, e.g., the step motor responding to command pulses is so arranged as to rotate an angle of 1.5 revolutions and send the recording head 12A by 4.0 micrometers in the direction shown by arrow $F_i$ or $F_o$ of FIG. 5. In that case, if 25 command pulses are continuously given by a control means to the step motor when the recording head 12A is located in the n-track position $TR_n$, the recording head 12A will be moved about 100 micrometers (and track pitch in the direction of arrow $F_i$ and positioned in the adjacent track position $TR_{n+1}$. If the step motor is excited opposite, in an opposite manner the recording head 12A will be moved in the outward direction of arrow $F_o$ and positioned in the opposite adjacent track position $TR_{n-1}$. When the recording head 12A is moved from the home position HP to a specified track position, e.g., $TR_n$, command pulses equivalent to the moved distance are given by the control means to the step motor. The movement and positioning of the recording head 12A are thus controlled by the number of command pulses given by the controller to the step motor and the present position of the recording head 12A is also monitored by the controller on the basis of a cumulative value of the command pulses given until then.

In the conventional head positioner of the above recorder, an open loop control system is employed to position the head by means of the step motor, whereby the actual head position will not correspond to what is specified by the command pulses because of the presence of backlash if the transfer elements between the step motor and the recording head support (such as gears) generate backlash and a deviation. The disadvantage is that the deviation of the recording track from the format track position poses the above-described access problem at the time of playback. The deviation of the recording track resulting from the mechanical error of the positioner not only degrades compatibility with the playback but also causes crosstalk at the time of playback even with the application of a tracking servo because the transfer error attributed to the backlash increases while the recording head is being moved from the first track position to the second track position and then the third track position, thus ultimately allowing the field signal which should be recorded in the n-th track position $TR_n$ to overlap by being recorded in the adjacent (n−1)st track position $TR_{n-1}$ or the (n+1)st track position $TR_{n+1}$ (without guard band formation).

The tracking servomechanism at the time of playback is designed to position the playback head right in the center of the recording track so that it can accurately scan the latter and the conventional servomechanism is often used to control the so-called singal envelope. Control of single envelope is disadvantageous in that high speed access or tracking is unattainable because the playback head is moved gradually toward the center position of the recording head. An additional problem is that the actual head position will never be superposed on what is instructed by the command pulses if backlash occurs, so that accurate head transfer will become impossible.

SUMMARY OF THE INVENTION

An object of the present invention is to provide a head positioner designed to improve recording track positioning accuracy by positioning a recording head in a predetermined track position with utmost accuracy.

Another object of the present invention is to provide a tracking servomechanism allowing high-speed access to (or tracking of) a desired recording track at the time of playback.

A further object of the present invention is to provide a means for allowing high speed head transfer to ensure accurate head positioning or tracking.

A still further object of the present invention is to provide a means for positioning an in-line double gap head in any desired position at high speed with accuracy.

A still further object of the present invention is to provide a bidirectional d.c. motor driving circuit with a speed servo for linearly driving a bidirectional d.c. motor with single-pole control voltage and making possible high-speed accurate positioning control.

A still further object of the present invention is to provide a bidirectional d.c. motor driving circuit with a speed servo for increasing the utilization efficiency of power source voltage, the speed servo being equipped with a non-adjusting electronic governor type speed detecting means.

A still further object of the present invention is to provide a positioner for generating a position signal for accurately indicating, with high resolution, a moving body such as a recording or playback head moving in a given direction within the positional range predetermined so as to subject the moving body to closed loop control.

An even further object of the present invention is to provide an inexpensive positioner, simple in construction and readily producible.

According to the present invention, a head is moved to a desired track under open loop control so as to gain access to the track. The head is thereby moved in the direction across the track position and a head position signal is generated by a head position detecting means.

When the head enters a range close to the track, as determined by monitoring the position signal or through any other suitable method, the head control is then switched to closed loop control at a predetermined timing.

Under closed loop control, the head is so controlled as to move to the intended track position in response to the generation of an error signal corresponding to its deviation therefrom and it is moved back when it has passed through the intended position and further turned around when it has passed through the position again in the opposite direction. The head thus swings back and forth in the neighborhood of the intended position and converges to the intended position and then stops there.

When the head is located within a range close to the intended track under the open loop control according to an embodiment of the present invention, reverse damping under the open loop control is first effected at a first predetermined timing, whereby the head moving at high speed is surely and instantaneously stopped. Furthermore, the head movement is reversed because of the reverse torque and, when it is placed in a proper position, the head control switched to closed loop control at a second predetermined timing. In consequence, head speed at the beginning of closed loop control is extremely low even if head movement under the open loop control is increased, thus allowing the head to be positioned close to what is initially intended. Also, the head positioning by servo means under closed loop control is stably and quickly carried out.

According to another embodiment of the present invention, head position is monitored even after the head movement is switched to the closed loop control. The head is moved back within a range close to the intended track position by switching it to the position under open loop control whenever it moves out of a range. Then, movement resumes under closed loop control. Even if the head is moved at high speed under the initial open loop control, it will eventually be placed under closed loop control within the range close to the target track to ensure that it is located at the intended position.

These and other objects and features of the invention may readily be ascertained by referring to the following description and appended drawings in which like elements are given like reference characters.

BRIEF DESCRIPTION OF THE DRAWINGS

FIG. 6 is a diagram showing the construction of the head position detector of FIG. 1.

FIGS. 7(a) and 7(b) are diagrams showing a detailed arrangement of moving and fixed slit plates contained in the head position detector of FIG. 6.

FIGS. 8(a)–8(e) are schematic plan views illustrating the functions of the moving slit plates in the head position detector of FIG. 1.

FIG. 21(a)-(e) are schematic plan views illustrating the function of the moving slit plate when it is moved in the head position detector of FIG. 19.

FIG. 25 is a signal waveform chart showing changes in the levels of the voltage signals $E_a$-$E_b$ and $E_b$-$E_a$ produced in the head position detector of FIG. 19 when the recording head is moved.

FIG. 26 is a signal waveform chart showing a change in the level of the signal $E_e$ obtained in the head position FIG. 19 when the recording head is moved.

FIG. 27 is a signal waveform chart showing a change in the level of the head position signal $E_f$ produced by the head position detector of FIG. 19 when the recording head is moved.

FIG. 35 is a graph illustrating a function wherein first and second tracks are accessed for frame recording in the electronic still camera of FIG. 33.

FIG. 36 is a graph illustrating operation wherein a fifth track is accessed for frame recording in the electronic still camera of FIG. 33.

DETAILED DESCRIPTION OF THE PREFERRED EMBODIMENTS

(A) Electronic still camera I

Overall Design

Figure 1:
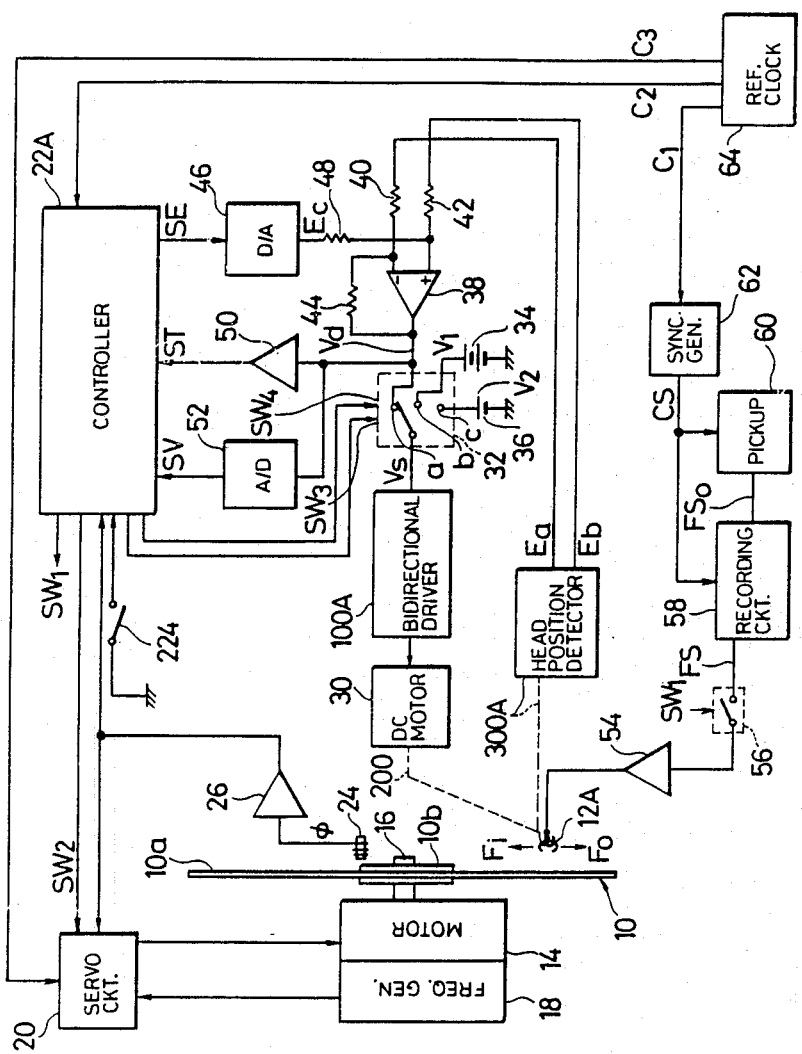
FIG. 1 is a block diagram showing the overall construction of an electronic still camera embodying the present invention.

As shown in FIG. 1, a magnetic disk 10 is detachably mounted on a spindle 16 driven and rotated by a d.c. motor 14. The d.c. motor 14 is equipped with a frequency generator 18 for generating a frequency signal and controlled by a servo circuit 20 so as to rotate at a fixed speed, e.g., of 3,600 rpm. The servo circuit 20 drives the disk 10 in order to rotate and stop it in response to a control signal $SW_2$ received from a control means 22A.

Figure 53:
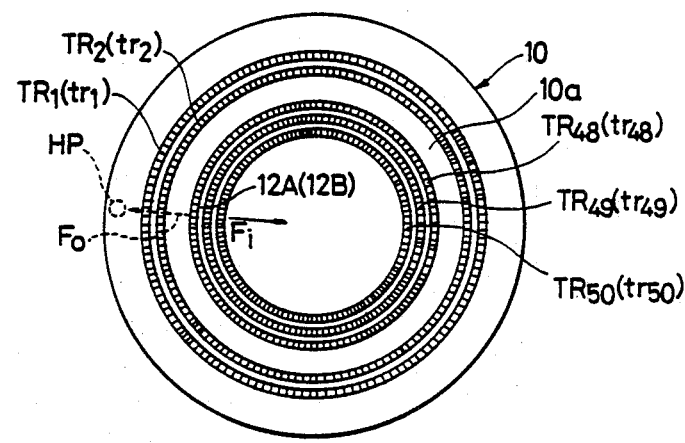
FIG. 53 is a diagram showing a typical magnetic disk recording format used in an electronic still camera system.

The disk 10 has a recording surface 10a with a format shown in FIG. 53. A phase generator 24 arranged in a fixed position close to the recording surface 10a picks up magnetic flux leaking out of a small yoke (not shown) installed in a fixed position on a disk core 10b and generates a phase generator (PG) pulse $\phi$ representing the rotational phase of the disk 10. The PG pulse $\phi$ is supplied to the servo circuit 20 and the control means 22A through an amplifier 26 and employed as a comparison signal for a phase servo system in the servo circuit 20 and also employed as a timing signal for field signal writing operation in the control means 22A.

A magnetic transducer for recording, i.e., a recording head 12A, is arranged opposite to the recording surface 10a and is carried by a head transfer mechanism 200, which will be described later. The head transfer mechanism 200 is, as conceptually shown by a dotted line, driven by a d.c. motor 30 and arranged so that the recording head 12A may be moved along the recording surface 10a in both radial directions shown by arrows $F_i$ and $F_o$ shown in FIG. 53).

A d.c. motor 30 is operated by a bidirectional d.c. motor driving circuit 100A with a speed servo, which will be described later, in accordance with characteristics shown in FIG. 3. In other words, the d.c. motor 30 stops operating when the single-pole (positive pole according to this embodiment) speed control voltage $V_s$ supplied to the driving circuit 100A is at a given value $V_{BS}$, rotates in the forward direction (e.g., clockwise) at a speed proportional to the difference voltage, when the speed control voltage $V_s$ exceeds the $V_{BS}$ and rotates in the reverse direction (counterclockwise) at a speed proportional to the difference when the speed control voltage $V_s$ becomes lower than $V_{BS}$. By means of an electronic changeover switch 32, the speed control voltage $V_s$ supplied to the driving circuit 100A is selected, according to changeover control signals $SW_3$ and $SW_4$ from the control means 22A. The speed control voltage $V_s$ is selected to be either a servo shift control voltage $V_d$ from an operational amplifier 38 or a forward or reverse constant speed feed control voltage $V_1$ or $V_2$ from constant voltage sources 34 or 36. When the change-over control signals $SW_3$ and $SW_4$ are (0, 0), the switch 32 will contact a terminal a to allow the selection of the servo feed control voltage $V_d$ and, when $SW_3$ and $SW_4$ are (0, 1), the switch 32 will contact a terminal b to allow the selection of the forward constant speed feed control voltage V. The switch 32 will contact a terminal c when $SW_3$ and $SW_4$ are (1, 0), so that the reverse constant speed feed control voltage $V_2$ is selected.

A head position detector 300A is coupled to the head transfer mechanism 200 and is caused to generate voltage signals (head position signals) $E_a$ and $E_b$ of opposite phase at amplitudes changing roughly like a sine wave with a period of track pitch $P_t$ when the recording head 12A is moved in the directions of the arrows $F_i$ and $F_o$ as will be described later. Those voltage signals $E_a$ and $E_b$ are supplied to the inverted and non-inverted input terminals of the operational amplifier 38 through resistors 40 and 42. On the other hand, a digital positioning control signal SE is supplied by the control means 22A to a digital to analog (D/A) converter 46, whereby an analog voltage signal $E_c$ is obtained from its output terminal, the voltage signal $E_c$ being supplied to the non-inverted input terminal of the operational amplifier 38 through a resistor 48. The operational amplifier 38 forms a differential amplifier with the input resistors 40, 42 and 48 and a feedback resistor 44 The output voltage $V_d$ of the differential amplifier is expressed by $$V_d = E_c + A_1 \cdot (E_b - E_a)$$

where $A_1 = R_{44}/R_{40} = R_{48}/R_{42}$, because the resistances $R_{40}$ and $R_{42}$ of the resistors 40 and 42 are equal and the resistances $R_{44}$ and $R_{48}$ of the resistors 44 and 48 are equal.

The output voltage $V_d$ of the operational amplifier 38 is supplied to the input terminal a of the changeover switch 32 as the servo feed control voltage $V_d$ and is also supplied to the input terminals of a Schmitt trigger circuit 50 and of an analog to digital (A/D) converter 52, respectively. The Schmitt trigger circuit 50 supplies a pulse ST to the control means 22A, the pulse ST indicating the time at which the voltage $V_d$ becomes equal to the set value $V_{BS}$. The A/D converter 52 supplies the digital value SV to the control means 22A so that the latter can monitor the voltage $V_d$ as occasion demands.

A video signal FS for each field is supplied by a recording circuit 58 to the recording head 12A through a switch 56 and an amplifier 54. The recording circuit 58 is used to signal process a video signal $FS_O$ for one field such as luminance color signal separation and frequency modulation. The video signal $FS_O$ is obtained by the scanning of a pickup element 60 comprising a CCD (charge coupled device), etc., and the recording circuit 58 comprises various correction circuits such as a matrix circuit, a frequency modulator and a pre-emphasis circuit. A composite synchronizing signal CS from a synchronizing signal generator 62 responding to a clock signal $C_1$ from a reference clock generator 64 is supplied to the recording circuit 58 and the pickup element 60. An operating clock signal $C_2$ is supplied by the reference clock generator 64 to the control means 22A, whereas a phase reference clock signal $C_3$ is supplied to the servo circuit 20.

Referring to FIG. 1, the overall construction of the electronic still camera system has been described. Subsequently, the construction of the bidirectional d.c. motor driving circuit 100 equipped with a speed servo, the head moving mechanism 200 and the head position detector 300A will be described in detail further.

Bidirectional DC Motor Driving Circuit

Figure 2:
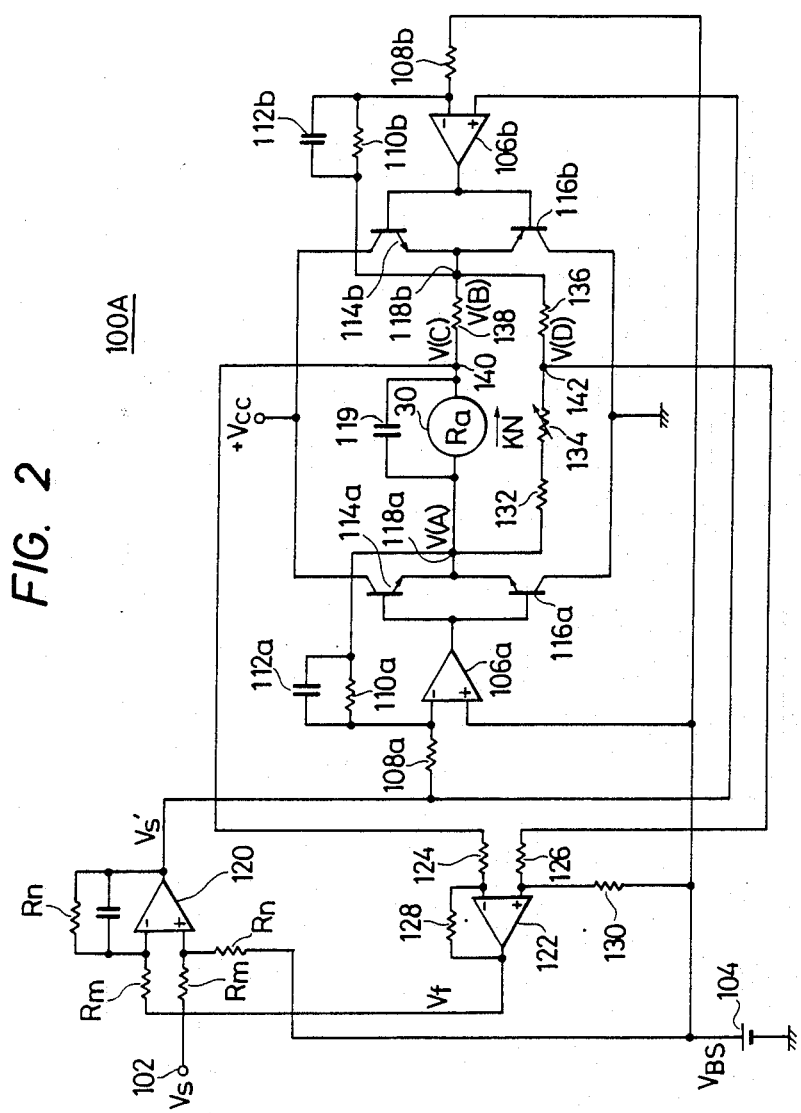
FIG. 2 is a diagram of a bidirectional d.c. motor driving circuit with a speed servo embodying the present invention.

In the bidirectional d.c. motor driving circuit 100 equipped with a speed servo, as shown in FIG. 2, the speed control voltage $V_s$ is supplied by the changeover switch 32 to an input terminal 102. The speed control voltage $V_s$ then is supplied to the non-inverted input terminal of an operational amplifier 120 constituting a comparator of the speed servo system.

The output terminal of the operational amplifier 120 is connected to the inverted input terminal of an operational amplifier 106a through a resistor 108a and directly connected to the non-inverted input terminal of an operational amplifier 106b. The present motor stop voltage $V_{BS}$ is supplied by a d.c. voltage source 104 to the non-inverted input terminal of the operational amplifier 106a and also to the inverted input terminal of the operational amplifier 106b through a resistor 108b. Both operational amplifiers 106a and 106b have similar amplification characteristics, whereas the resistances of both resistors 108a and 108b are set at the same value, ($R_{108}$).

The output terminal of the operational amplifier 106a is connected to the bases of an npn transistor 114a and a pnp transistor 116a constituting a complementary circuit or complementary driver. On the other hand, the output terminal of the operational amplifier 106b is connected to the bases of an npn transistor 114b and a pnp transistor 116b constituting another complementary driver. These driving transistors 114a, 116a, 114b and 116b are coupled by bridge connection and the d.c. motor 30 is connected from one side to the other. Moreover, feedback resistors 110a and 110b for the operational amplifiers 106a and 106b are connected between their inverted input terminals and output terminals 118a and 118b of the complementary drivers of the driving transistors 114a to 116b. The resistances of the feedback resistors 110a, 110b are selected as being of equal value $R_{110}$, whereas the capacitances of phase compensating capacitors 112a and 112b connected thereto in parallel to the feedback resistors 110a and 110b are also selected as equal. A capacitor 119 connected in parallel with the d.c. motor 30 is used as a noise killer.

The description of the bidirectional driving system thus constructed does not include the speed servo system and its operation will subsequently be described. The description of the operational amplifier 120 and a resistor 138 will be omitted in order to facilitate the understanding of the present invention.

The speed control voltage $V_s$ given to the input terminal 102, modified into a control voltage $V_s'$ by the input operational amplifier 120, is supplied to the inverted input terminal of the operational amplifier 106a through the resistor 108a and also directly supplied to the operational amplifier 106b. Hereafter, it will be assumed that $V_s$ equals $V_s'$.

When the speed control voltage $V_s$ is $V_{BS}+\Delta V$, voltages V(A) and V(B) at the output terminals 118a and 118b of the complementary drivers may be expressed as $$V(A)=B_{BS}-A_2\cdot\Delta V$$

$$V(B)=V_{BS}-A_2\cdot\Delta V$$

where $A_2=R_{110}/R_{108}$. The above $V_{BS}$ is the motor stop voltage and the above resistances $R_{108}$ and $R_{110}$ are also the resistances of the resistors 108a (108b) and 110a (110b). In consequence, the difference between the voltages, V(A)—V(B), i.e., the voltage $2A_2\cdot\Delta v$ is applied to the d.c. motor 30, whereby the d.c. motor rotates in the forward (clockwise) direction at a speed $N\cdot(V_{BS}+\Delta V)$, roughly proportional to the voltage applied (see FIG. 3). In this case, the driving transistors 114b and 116a are turned on, whereas the driving transistors 114a and 116b are turned off.

When the speed control voltage $V_s$ is $V_{BS}-\Delta V$, the motor 30 terminal voltages V(A) and V(B) become $$V(A)=V_{BS}-A_2\cdot\Delta V$$

$$V(B)=V_{BS}+A_2\cdot\Delta V$$

Figure 3:
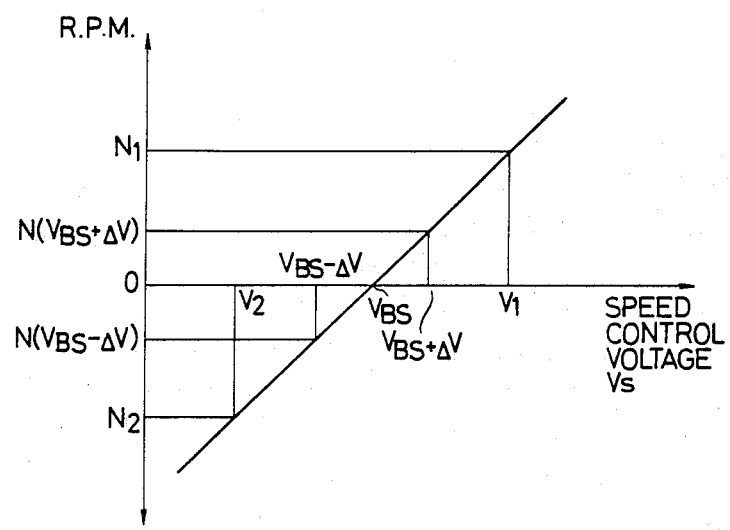
FIG. 3 is a graph showing characteristics of a d.c. motor driven and controlled by the bidirectional d.c. motor driving circuit with a speed servo.

Accordingly, the voltage applied across both terminals of the d.c. motor 30 becomes $-2A_2\cdot\Delta V$, whereby the d c. motor 30 rotates in the reverse (counterclockwise) direction at a speed $N\cdot(V_{BS}-\Delta V)$, roughly proportional to the voltage applied (see FIG. 3). In this case, the driving transistors 114a and 116b are turned on, whereas the driving transistors 114b and 116a are turned off.

When the speed control voltage $V_s$ is set at $V_{BS}$, moreover, the motor terminal voltage V(A) and V(B) are given by either of the above set of equations, provided that V is zero, and so that both V(A) and V(B) are set at $V_{BS}$. Thereby the d.c. motor 30 is stopped since no voltage difference is applied it.

The d.c. motor 30 is thus stopped when the positively polarized speed control voltage $V_s$ given to the input terminal 102 is equal to the motor stop voltage $V_{BS}$. To be more precise, the equality applies to the input terminal on one side of each of the operational amplifiers 106a and 106b. When the speed control voltage $V_s$ is higher than the motor stop voltage $V_{BS}$, the d.c. motor 30 rotates forward (clockwise) at a speed roughly proportional to the difference therebetween, whereas the d.c. motor 30 rotates in reverse (counterclockwise) at a speed roughly proportional to the difference when $V_s$ is lower than $V_{BS}$.

Figure 4:
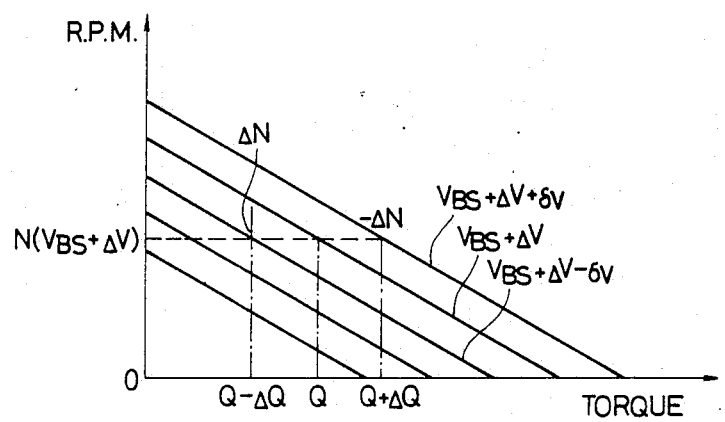
FIG. 4 is a graph illustrating the function of the speed servomechanism of the bidirectional d.c. motor driving circuit with a speed servo.

The construction and function of the speed servo system attached to the above bidirectional driving system will now be described. Highly accurate position control using a motor generally presupposes high performance, constant-speed control and, because of the torque characteristics shown in FIG. 4 and fluctuations in the load and applied voltage, the number of revolutions of the d.c. motor 30 tends to fluctuate. Consequently, a speed servo for offsetting such external disturbance is required. An electronic governor speed servo system as will be described below is provided according to this embodiment.

As shown in FIG. 2, the speed servo system according to this embodiment comprises elements 120–142.

The operational amplifier 120 constituting a comparator of the speed servo system compares the speed control voltage $V_s$ with a feedback signal $V_f$ from an operational amplifier 122 (as will be described later) to produce an error signal, amplifies the signal with a gain $A_4$ and generates an error control voltage $V_s'$. The error control voltage $V_s'$ is supplied through the resistor 108a to the inverted input terminal of the operational amplifier 106a and directly supplied to the non-inverted input terminal of the operational amplifier 106b. Thus the error control voltage $V_s'$ directly controls the speed of the d.c. motor 30.

On the other hand, resistors 132, 134 and 136 are connected in series between the output terminals 118a and 118b of the complementary drivers and, together with the d.c. motor 30 and a resistor 138, constitute a bridge circuit. The connection point (terminal) 140 between the d.c. motor 30 and the resistor 138 and the connection point (terminal) 142 between the resistors 134 and 136 are connected to the inverted and non-inverted input terminals of the operational amplifier 122 through resistors 124 and 126.

Since V(A) is less than V(B) at the outputs of the complementary drivers when the d.c. motor 30 is rotating forward, the induced electromotive force KN (K=constant, N=speed of the d.c. motor 30) of the d.c. motor 30 is directed as shown in FIG. 2. Given an internal resistance $R_a$ of the d.c. motor 30 and resistances $R_{132}$–$R_{138}$ of the resistors 132–138, voltages V(C) and V(D) obtained at the terminals 140 and 142 are expressed by $$V(C)=[V(B)-V(A)-KN]R_a(R_a+R_{138})$$

$$V(D)=[V(B)-V)A)]R_o/(R_o+R_{136})$$

where, $R_o=R_{132}+R_{134}$.

The resistor 134 is a volumetric variable resistor and, by adjusting it so that $R_{136}/R_o=R_{138}/R_a=H$(a constant), the voltages V(C) and V(D) become $$V(C)=[V(B)-V(A)-KN]/(1+H)$$

$$V(D)=[V(B)-V(A)]/(1+H).$$

Accordingly, the potential difference between the terminals 140 and 142 is $$V(D)=V(C)=KN/(1+H)$$

which is proportional to the speed N of the d.c. motor 30. While the d.c. motor 30 is rotating in reverse, the induced electromotive force is directed opposite to what is shown in FIG. 2 and therefore $$V(D)-V(C)=KN/(1+H)$$

That is, the polarity is reversed. The potential difference between the terminals 140 and 142 is such that its absolute value is proportional to the speed N of the d.c. motor 30 and such that the polarity corresponds to the rotational direction of the d.c. motor 30.

The voltages V(C) and V(D) are supplied to the inverted and non-inverted input terminals of operational amplifier 122 through the resistors 124 and 126 and the motor stop voltage $V_{BS}$ is supplied by the constant voltage source 104 to the non-inverted input terminal through the resistor 130. The operational amplifier 122 forms a differential amplifier with the input resistors 124, 126 and 130 and a feedback resistor 128. Since the resistances $R_{124}$ and $R_{126}$ of the resistors 124 and 126 are selected as being equal and the resistances $R_{128}$ and $R_{130}$ of the resistors 128 and 130 are also selected as equal, the output voltage $V_f$ of the differential amplifier is expressed as follows:

$$V_f = V_{BS} + A_3 \cdot [V(D) - V(C)]$$

where $A_3 = R_{128}/R_{124} = R_{130}/R_{126}$.
Therefore, $$V_f = V_{BS} \pm A_3 \cdot KN/(1+H)$$

or $$V_f = V_{BS} \pm K_o N$$

where $K_o = A_3 \cdot K/(1+H)$. In other words, the output voltage $V_f$ of the operational amplifier 122 is the sum of the motor stop voltage $V_{BS}$ and a level fluctuation ($\pm K_o N$) proportional to the speed N of the d.c. motor 30. The output voltage $V_f$ is supplied to the inverted input terminal of the operational amplifier 120, which thus forms a comparator with a negative feedback signal.

Since the operational amplifier 120 compares both input voltages $V_s$ and $V_f$ and amplifies the error therebetween with the amplification gain $A_4$, the error control voltage $V_s'$ generated is expressed as $$V_s' = A_4 \cdot (V_s - V_f).$$

Therefore, $$V_s' = A_4 \cdot [V_s - (V_{BS} \pm K_o N)]$$

where $A_4 = R_n/R_m$, the resistances of feedback and input resistors of the operational amplifier 120.

When the speed control voltage $V_s$ is equal to the motor control voltage $V_{BS}$, the d.c. motor 30 stops and the servo loop is in equilibrium. That is, $V_f = V_{BS}$ in that state. Accordingly, the error control voltage $V_s'$ generated becomes roughly equal to the speed control voltage $V_s$ ($V_{BS}$) and the motor terminal voltages V(A) and V(B) at the terminals 118a and 118b of the complementary drivers are in balance at about $V_{BS}$, whereby the voltage applied to the d.c. motor 30 is roughly zero.

When the speed control voltage $V_s$ changes from that state to $V_{BS} + \Delta V$, the error control voltage $V_s'$ rises, causing a great difference between the motor terminal voltages V(A) and V(B), (V(A) is less than V(B)) at the terminals 118a and 118b of the complementary drivers, and the d.c. motor 30 starts to rotate in the forward direction. Then the feedback voltage $V_f$ ($V_{BS} + K_o N$) increases to close to the speed control voltage $V_s$, whereby the error control voltage $V_s'$ converges to $V_{BS} + \Delta V$, whereas the speed of the d.c. motor 30 converges to $N(V_{BS} + \Delta V)$ and reaches an equilibrium state. Likewise, when the speed control voltage $V_s$ changes from $V_{BS}$ to $V_{BS} - \Delta V$, the d.c. motor 30 starts to rotate in the reverse direction and the error control voltage $V_s'$ converges to $V_{BS} - \Delta V$, whereby the speed of the d.c. motor 30 converges to $N(V_{BS} - \Delta V)$ and reaches an equilibrium state.

In the stable state, e.g., wherein the speed control voltage $V_s$ and the speed of the d.c. motor 30 are respectively stable at $V_{BS} + \Delta V$ and $N(V_{BS} + \Delta V)$, the speed servo will operate as follows if an external disturbance, e.g., a load fluctuation, occurs and causes the torque Q to decrease by $\Delta Q$. Although the speed of the d.c. motor 30 attempts to rise by $\Delta N$ because of the speed vs. torque characteristics shown in FIG. 4, the error control voltage $V_s'$ becomes $\delta v$ lower than $V_{BS} + \Delta V$ as the feedback voltage $V_f$ increases to that extent and so functions so as to maintain the speed of the d.c. motor 30 at $N(V_{BS} + \Delta V)$ regardless of torque. When the torque increases by $\Delta Q$, on the contrary, the feedback voltage $V_f$ decreases to that extent, whereas the error control voltage $V_s$ becomes $\delta v$ higher than $V_{BS} + \Delta V$ and so functions as to maintain the speed of the d.c. motor 30 at $N(V_{BS} + \Delta V)$. The speed servo reacts upon other disturbances such as voltage supply Vcc fluctuations in the same manner and keeps stable the rotational rate of the d.c. motor 30.

In the bidirectional driving circuit 100 with a speed servo, the revolution of the d.c. motor 30 is made bidirectionally switchable using the single-pole (positive according to this embodiment) speed control voltage $V_s$ and the speed is linearly controllable with high accuracy. When the negative speed control voltage $V_s$ is selected, the same function is performed except that the rotational direction of the d.c. motor 30 is reversed.

Head Transfer Mechanism

Figure 5:
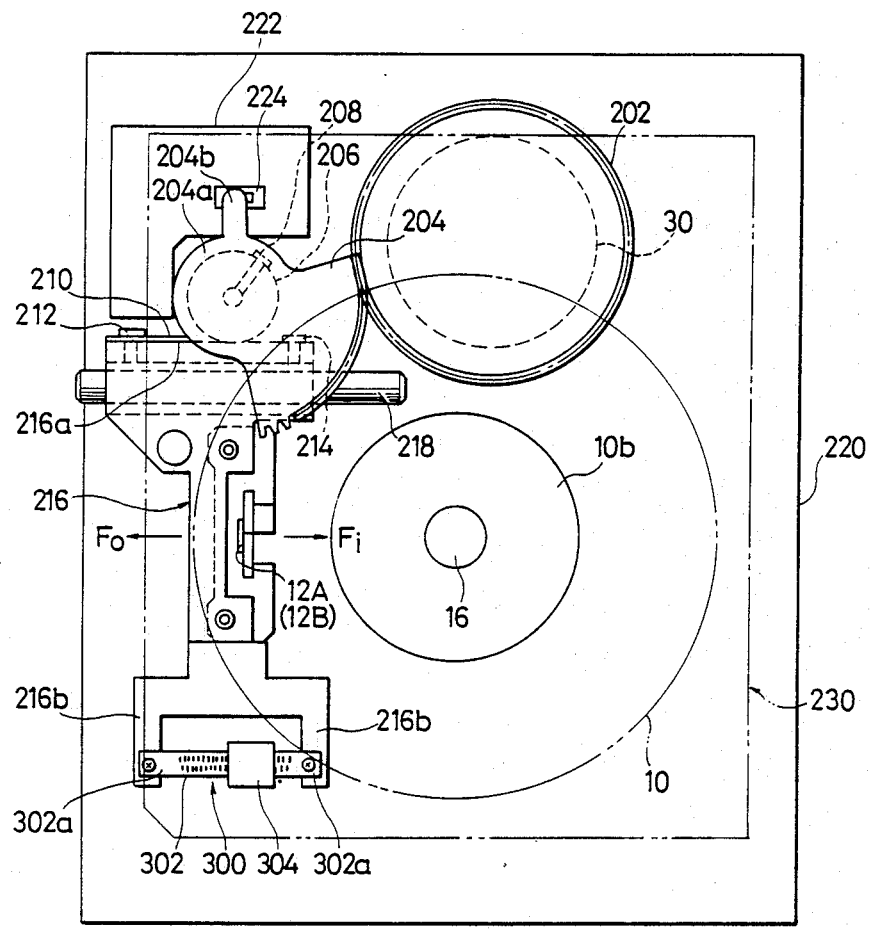
FIG. 5 is a diagram showing the head transfer mechanism of FIG. 1.
Figure 9:
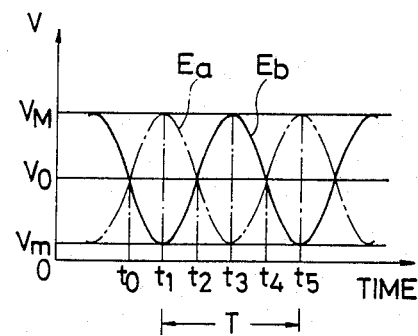
FIG. 9 is a timing chart illustrating the function of the moving slit plate in the head position detector of FIG. 1.

In the head transfer mechanism 200, shown in FIG. 5, the output stage of a speed reducing mechanism 202 is interlocked with the d.c. motor 30 and engages with a fan gear 204. The fan gear 204 is equipped with a pulley 206 rotating in unison with it and one point of a wire 210 is fixed to the pulley 204 with a clamp 208. Both ends of the wire 210, wrapped around the pulley 206, are fixed to the side 216a of a head carriage 216 with further clamps 212 and 214.

The recording head 12A is mounted on the head carriage 216, which slides on a guide bar 218 under the motive power of the rotation of the d.c. motor 30, so that the recording head 12A is moved in the inward and outward directions of arrows $F_i$ and $F_o$ (equivalent to the directions of arrows $F_i$ and $F_o$ of FIGS. 1 and 53). If the d.c. motor 30 rotates in the forward direction (clockwise), the head carriage 216 slides on the guide bar 218 in the direction of $F_i$ and moves the recording head 12a in that direction, whereas if the d.c. motor 30 rotates in the reverse direction (counterclockwise), the head carriage 216 slides on the guide bar 218 in the direction of $F_o$ and moves the recording head 12A in that direction.

When the inner cavity of the electronic still camera is opened to mount the magnetic disk 10 contained in a rectangular package 230, the head 12A is moved in the direction of the arrow $F_o$. The home position HP located at the outer end of the moving stroke is detected by a limit switch 224 arranged on a member 222 fixed to a rectangular receptacle 220. In other words, part of the circular portion 204a of the fan gear 204 has an arm 204b protruding therefrom and, when the recording head 12 is brought to the home position HP, the switch 224 is closed as the arm 204b abuts on the moving member of the switch 224. Then a detecting signal is sent by the switch 224 to the control means 22A to start predetermined operations in response thereto.

Head Position Detector

In FIG. 5, both ends 302a of a moving slit plate 302 of a head position detector 300A are fixed to the front ends 216b of the head carriage 216 and thereby the moving slit plate 302 is movable in the directions of arrows $F_i$ and $F_o$ together with the head carriage 216. A position detector acceptor 304 allowing the moving slit plate 302 to pass therethrough is installed in the rectangular receptacle 220.

FIG. 6 shows the construction of the head position detector 300A. Two light emitting diodes 306a and 306b are arranged in parallel above the moving slit plate 302 and two light receiving photodiodes 310a and 310b are arranged in parallel under the moving slit plate 302 through a fixed slit plate 308.

FIGS. 7(a) and (b) show the moving slit plate 302 and the fixed slit plate 308 in detail. Two rows of slits 302a and 302b are formed in the moving slit plate 302 in the longitudinal direction, the slits being 50 micrometers in width W, 100 micrometers in slit pitch $P_s$ and the two rows 302a and 302b being offset $\frac{1}{2} P_s$ (50 micrometers) from each other. On the other hand, the fixed slit plate 308 has a slit 308c with the same width $W_o$ (50 micrometers) as that of the slits 302a and 302b and a length $L_o$ slightly greater than L representing a distance between opposite ends of the slits 302a and 302b of the slit plate 302. However, the slit length $L_o$ may be, as will readily be understood, the same as or smaller than the distance L.

In FIG. 6, the light emitting diode 306a, the slit 302a of the moving slit plate 302, the slit 308c of the fixed slit plate 308 and the photodiode 310a are arranged vertically in a column, whereas the light emitting diode 306b the slit 302b of the moving slit plate 302, the slit 308c of the fixed slit plate 308 and the light receiving element 310b are arranged vertically in another column. When the moving slit plate 302 moves together with the head carriage 216 in the direction of the arrows $F_o$ and $F_i$ of FIG. 5), the intensity of light received by the photodiodes 310a and 310b from the light emitting diodes 306a and 306b periodically change with the movements of the moving slits 302a and 302b. As a result, photoelectric currents $I_a$ and $I_b$ flowing through the photodiodes 310a and 310b also vary periodically and are converted by current-voltage converters 312a and 312b having the same construction and characteristics into voltage signals $E_a$ and $E_b$. The voltage signals $E_a$ and $E_b$ are head position signals whose values change, as will be described later, with a period corresponding to a track pitch $P_t$ according to the position of the recording head 12A on the disc 10. The voltage signals $E_a$ and $E_b$ supplied to the inverted and non-inverted input terminals of the operational amplifier 38 of FIG. 1 through the resistors 40 and 42, respectively.

With reference to FIGS. 8(a)-8(e) and 9, the operation of the head position detector 300A will be described in detail. FIGS. 8(a)-8(e) show relative orientations as viewed from the side of the light emitting diodes 306a and 306b at given time intervals while the moving slit plate 302 is moving at a constant speed u in the inward direction of arrow $F_i$. While the moving slit plate 302 is moving, light of intensity roughly proportional to areas $S_a$ and $S_b$, defined as the common apertures of the moving slits 302a and 302b and of the fixed slit 308c, is incident on the light receiving diodes 310a and 310b. The amplitudes of the voltage signals $E_a$ and $E_b$ change in proportion to the intensity of the light.

FIG. 8(a) (at the point of time t1 of FIG. 9) shows that the area $S_a$ common to the upper moving slit 302a and the fixed slit 308c is maximized with the maximum level $V_M$ of the voltage signal $E_a$, whereas the photodiode 310b is screened by the lower part of moving slit plate 302 so that $S_b=0$ and the voltage signal $E_b$ has a minimum level $V_m$, approximately equal to zero. As the moving slit plate 302 moves in the direction of arrow the $F_i$, then the area $S_a$ common to the upper moving slit 302a and the fixed slit 308c is reduced and simultaneously the area $S_b$ common to the lower moving slit 302b and the fixed slit 308c increases. At the point of time $t_2$, T/4 after the point of time $t_1$, where T is the period, both moving slit 302a and 302b overlap half of the fixed slit 308c, as shown in FIG. 8(b), and the voltage signals $E_a$ and $E_b$ both attain the average value $V_o$. At a time T/4 after the time $t_2$, the photodiode 310a is screened by the upper part of the moving slit plate 302 ($S_a=0$), as shown in FIG. 8(c), and the voltage signal $E_a$ attains the minimum level $V_m$, whereas the area common to the lower moving slit 302b and the fixed slit 308c is maximized with the maximum level $V_M$ of the voltage signal $E_b$. As the moving slit plate 302 moves in the inward direction of arrow $F_i$, then the area $S_a$ common to the upper moving slit 302a and the fixed slit 308c increases and simultaneously the area $S_b$ common to the lower moving slit 302b and the fixed slit 308c decreases. Both the voltage signals $E_a$ and $E_b$ attain the average value $V_o$ at the time $t_4$. The voltage signal $E_a$ attains the maximum level $V_M$ at the time $t_5$ (FIG. 8(e)), whereas the voltage signal $E_b$ attains the minimum level $V_m$ at this time.

When the moving slit plate 302 thus moves in the inward direction of arrow $F_i$, the voltage signals $E_a$ and $E_b$ have opposite phase, i.e., 180° out of phase, and change roughly sinusoidally with the time period $T=P_s/u$ determined by the moving speed u and the slit pitch $P_s$. The same variation will occur in the case where the moving slit plate 302 moves in the outward direction of arrow $F_o$.

Figure 10:
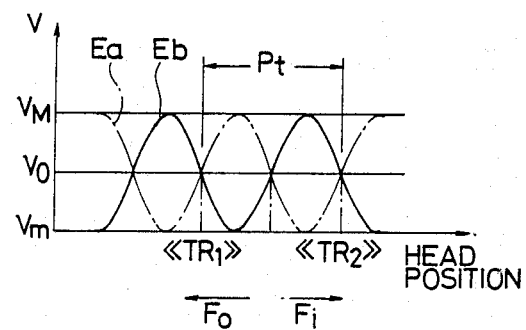
FIG. 10 is a signal waveform chart illustrating changes in the levels of voltage signals $E_d$ and $E_b$ generated in the head position detector of FIG. 1 when the recording head is moved.

The voltage signals $E_a$ and $E_b$ vary sinusoidally with a spatial period set by the slit pitch $P_s$ (100 micrometers). The values change according to the position of the fixed slit 308c relative to the moving slits 302a and 302b as the moving slit plate 302 moves. In that case, the moving slit plate 302, like the recording head 12A, moves together with the head carriage 216 in the inward or outward direction $F_i$ or $F_o$. The slit pitch $P_s$ has been selected as being the same as the track pitch $P_t$ (100 micrometers). In consequence, the levels of the voltage signals $E_a$ and $E_b$ change roughly sinusoidally with the period of track pitch $P_t$ when the recording head 12A moves in either direction $F_i$ or $F_o$. According to this embodiment, the fixed slit 308c is located relative to the moving slits 302a and 302b as shown in FIG. 8(d) when the recording head 12a is located adjacent to the central portion [TR$_1$], [TR$_2$]... of each of the track positions TR$_1$, TR$_2$.... The levels of the voltage signals $E_a$ and $E_b$ change as shown in FIG. 10 in terms of the movement of the recording head 12A and attain the average level $V_o$ when it is located adjacent to the central portion [TR$_1$], [TR$_2$]... of each of the track positions TR$_1$, TR$_2$....

As set forth above, the head position detector 300A produces oppositely phased voltage signals $E_a$ and $E_b$ as head position signals whose levels change with the period of track pitch $P_t$ when the recording head 12A moves in the inward and outward directions. The signals $E_a$ and $E_b$ attain the same level $V_o$ whenever the recording head 12A is located adjacent the central portion [TR$_1$], [TR$_2$]... of each of the track positions TR$_1$, TR$_2$.... The head position signals $E_a$ and $E_b$ are supplied to both input terminals of the operational amplifier 38 through the resistors 40 and 42, as mentioned above.

Operation as a Whole

The operation of this electronic still camera as a whole will now be described.

The recording head 12A is moved to the home position HP when the inner cavity is opened as the magnetic disk 10 is loaded into the rectangular receptacle 220 (FIG. 5) of the electronic camera. When the recording head 12A is moved, the changeover control signals SW$_3$ and SW$_4$ output by the control means 22A are (1,0) so that the switch 32 is connected to the terminal c. As a result, the reverse constant speed feed control voltage V$_2$ from the constant voltage source 36 is supplied to the driving circuit 100 as the speed control voltage $V_s$. Consequently, the d.c. motor 30 rotates in reverse (counterclockwise), causing the head carriage 216 to slide in the outward direction of the arrow $F_o$. On the other hand, the control signal SW$_2$ is given by the control means 22A to the servo circuit 20 and accordingly the d.c. motor 14 for the disk 10 is started and the magnetic disk 10 is driven so as to rotate at 3,600 rpm.

When the magnetic head 12 reaches the home position HP, the control means 22A immediately switches the changeover control signals SW$_3$ and SW$_4$ to (0, 1) in response to the detection signal from the switch 224. The switch 32 is thus connected to the terminal b and the forward constant speed feed control voltage V$_1$ from the constant voltage source 34 is selected as the speed control voltage $V_s$ supplied to the driving circuit 100. The feed control voltage V$_1$ is, as shown in FIG. 3, a constant voltage at a given value higher than the motor stop voltage $V_{BS}$. The d.c. motor 30 is rotated forwardly (clockwise) at a speed N$_1$ (V$_1$) by the control voltage V$_1$ to drive the head carriage 216 and move the recording head 12A in the inward direction of the arrow $F_i$. Simultaneously, the moving slit 302 is also moved in the inward direction, whereby the head position signals $E_a$ and $E_b$ are supplied by the head position detector 300A to the non-inverted and inverted input terminals of the operational amplifier 38. The levels of the head position signals $E_a$ and $E_b$ vary with the timing shown in FIG. 9 and FIG. 10 relative to the movement of the recording head 12A.

On the other hand, a digital positioning control signal SE equivalent to the analog value of $V_{BS}$ is given by the control means 22a to the D/A converter 46 at that time and the analog voltage signal $E_c$ ($V_{BS}$) obtained at the output terminal is supplied to the non-inverted input terminal of the operational amplifier 38 through the resistor 48.

Figure 11:
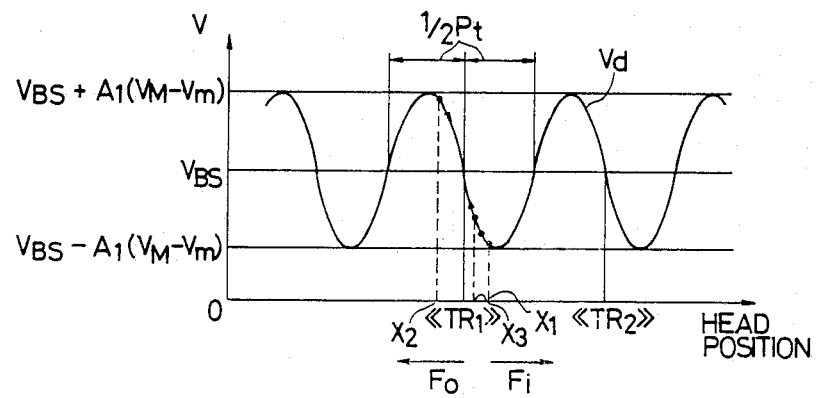
FIG. 11 is a chart illustrating a function wherein the movements of the recording head converge in the central position of a first track.

Consequently, the output voltage $V_d$ of the operational amplifier 38 is expressed as $$V_d = V_{BS} + A_1 \cdot (E_b - E_a)$$

and its value changes as shown in FIG. 11. When the head 12A moves in the inward direction of arrow $F_i$, the voltage $V_d$ level changes like a sine wave with a period of the track pitch $P_t$ and $V_d = V_{BS}$ when the head 12a is located adjacent to the central portion [TR$_1$], [TR$_2$]... of each of the track positions TR$_1$, TR$_2$....

While the head 12A is moving from the home position HP in the inward direction of the arrow $F_i$, the timing pulse ST is given by the Schmitt trigger circuit 50 to the control means 22A each time the voltage $V_d$ becomes equal to $V_{BS}$. The control means 22A counts the number of pulses ST and, when it is given a pulse ST at a predetermined place, i.e., the pulse ST indicating the time at which the recording head 12A has passed through the first completely (100%) on-track position [TR$_1$], it then switches the changeover control signals SW$_3$ and SW$_4$ to (0,0). The switch 32 is thus connected to the terminal a and the output voltage (servo feed control voltage) $V_d$ of the operational amplifier 38 is selected as the speed control voltage $V_s$ supplied to the driving circuit 100A.

When the speed control voltage $V_s$ is switched to the servo feed control voltage $V_d$ in that manner, the recording head 12A is located in a position X$_1$ beyond the completely on-track position [TR$_1$] and, as shown in FIG. 11, $V_D$ is less than $V_{BS}$ at that point. As a result, the d.c. motor 30 rotates in reverse (counterclockwise) and the recording head 12A is moved in the outward direction of the arrow $F_o$.

When the head 12A passes beyond the completely on-track position [TR$_1$] in the outward direction of the arrow $F_o$, $V_d$ is greater than $V_{BS}$ and the d.c. motor rotates forward (clockwise) causing the head 12A to move in the inward direction again. When the head 12A passes beyond the completely on-track position [TR$_1$] in the inward direction. Again $V_d$ is less than $V_{BS}$ and the d.c. motor 30 rotates in reverse, causing the head 12A to be directed outwardly again. However, the direction switch position X$_3$ is closer to the completely on-track position [TR$_1$] than the preceding direction switch position X$_1$. The movement of the head 12a thus converges to the completely (100%) on-track position [TR$_1$] and stops thereupon. The condition $V_d = V_{BS}$ is attained in that standstill position.

In that manner, the recording head 12A is positioned opposite to the central portion of the first track position TR$_1$ where the track is revolving at 3,600 rpm. When the shutter of the electronic still camera is triggered, the control means 22A sends the control signal SW$_1$ to the switch 56 at a suitable timing in response to the PG pulse φ from the phase generator 24 and closes it for a field period, whereby the image signal FS amounting to one field equivalent to the first photograph is supplied by the recording circuit 58 to the recording head 12A through the amplifier 80. The recording head 12A writes the image signal FS amounting to one field onto the whole circumference in the first track position $TR_1$.

After the first photograph is thus recorded, access to the second track position $TR_2$ is attempted. For that purpose, the changeover control signals $S_3$ and $S_4$ from the control means 22A are first switched to (0, 1) and the forward constant speed feed control voltage $V_1$ is supplied from the constant voltage source 34 to the driving circuit 100 as the speed control voltage $V_s$.

Accordingly, the d.c. motor 30 starts rotating forwardly, causing the recording head 12A to move in the inward direction of the arrow $F_i$. When the recording head 12A passes through the completely on-track position [$TR_2$], the pulse ST showing the timing is generated by the Schmitt trigger circuit 50 and the control means 22A switches the changeover control signals $SW_3$ and $SW_4$ to (0, 0). The changeover switch 32 is consequently connected to the terminal a and the servo feed control voltage $V_d$ is supplied to the driving circuit 100A, whereby the servo feed is implemented so that the recording head 12A may be positioned where $v_d = V_{BS}$, i.e., the completely on-track position [$TR_2$].

As set forth above, the recording head 12A in the electronic still camera is first moved at a constant speed in the inward direction of the arrow $F_i$ each time a photograph is taken and its video signal is recorded. The recording head 12A is then switched to the servo feed immediately after it has first passed the completely on-track position [$TR_n$]. Under the servo feedback control, the movements of the recording head 12A converge to the completely on-track position while oscillating inwardly and outwardly and finally stopping. That is, the servo feed control voltage $V_d$ converges, i.e., the head position signals $E_a$ and $E_b$ from the position detector 300A converge to the same value $V_o$.

Head positioning according to the present invention is obviously more accurate than that under the conventional open loop control. The conventional positioning method allows a signal (command pulse) indicating any head position to be unilaterally given by the control means to the head transfer means and, if the head moving means has a backlash, the actual head position may deviate from the desired head or track position. Under the servo feed according to the present invention, however, the actual position of the recording head 12A is expressed by the levels of the head position signals $E_a$ and $E_b$ and fed back. Furthermore, the servomechanism is operated in such a manner that the levels of the head position signals $E_a$ and $E_b$ converge at a fixed value (on-track level) corresponding to the completely (100%) on-track position and equilibrium is attained in a position where the actual position conforms to the completely on-track position. The head is thus accurately positioned.

According to the present invention, the recording head is first quickly moved at constant velocity to a position close to the desired track position. Subsequently, the head position signal whose level represents the actual position of the recording head changes so that an error signal may be generated in compliance with its deviation. The error signal is fed back to cause the movements of the recording head to converge in the central portion of the track position and the recording head to stop thereat. Consequently, high-speed accurate head positioning is made possible compared with the conventional one using a step motor under open loop control.

Moreover, as the recording head position is controlled in accordance with the head position signal according to the present invention, a CPU (microcomputer) for controlling the operation of the whole system may be relieved of work load and this makes possible the use of a CPU smaller in capacity than has been used for the conventional tracking system. Alternately, when a CPU of similar capacity is used, it can provide more functions.

It is also possible to employ one of the head position signals $E_a$ and $E_b$, for instance, only $E_a$ and the level of the voltage signal $E_c$ specified by the control means 22A may be selected as $V_{BS} + A_1 \cdot V_o$. When the level of head position signal $E_a$ conforms to the on-track level $V_o$, the servo feed control voltage $V_d$ becomes equal to $V_{BS}$, i.e., attains equilibrium, and the same effect as what has been described in the above embodiment is attainable. In that case, however, an error can be produced when the level of the head position signal $E_a$ fluctuates because of the temperature characteristics of the position detector 300 and offset voltage. On the contrary, equilibrium is established according to the above embodiment when the difference ($E_b$-$E_a$) between the two head position signals $E_a$ and $E_b$ having similar waveforms of opposite phase becomes zero and therefore the difference compensates for fluctuations in the levels of both head position signals $E_a$ and $E_b$, thus making them free from the influences of temperature characteristics and offset voltage.

Although the digital voltage SE ($E_c$) equivalent to the desired analog voltage $V_{BS}$ is supplied by the control means 22A during the servo feed to the non-inverted input terminal of the operational amplifier 38 through the D/A converter 46 and the resistor 48 according to the above embodiment, a constant voltage source for generating a constant voltage $E_3$ equivalent to $V_{BS}$ may be provided and the constant voltage $E_3$ may be supplied to the non-inverted input terminal of the operational amplifier 38. However, the use of the control means 22A (microcomputer) according to the above embodiment allows the addition of a properly corrected value $\delta V_{BS}$ to $V_{BS}$ by correcting the errors in the optical slit assemblies (302-310B) of the head position detector 300 using the control means 22A. The advantage is that the optical slit assemblies are readily installed.

According to the above embodiment, the timing pulse ST generated by the Schmitt trigger circuit 50 is monitored and the constant speed feed is switched to the servo feed immediately after the recording head 12A has passed through the completely on-track position of the desired track position so as to change the direction of the movement of the recording head 12A. In FIG. 11, the direction switch position $X_1$ may be within the distance range of $\frac{1}{2} P_t$ at which $V_d$ is less than $V_{BS}$ immediately after the completely on-track position [$TR_1$].

(B) Playback

Figure 12:
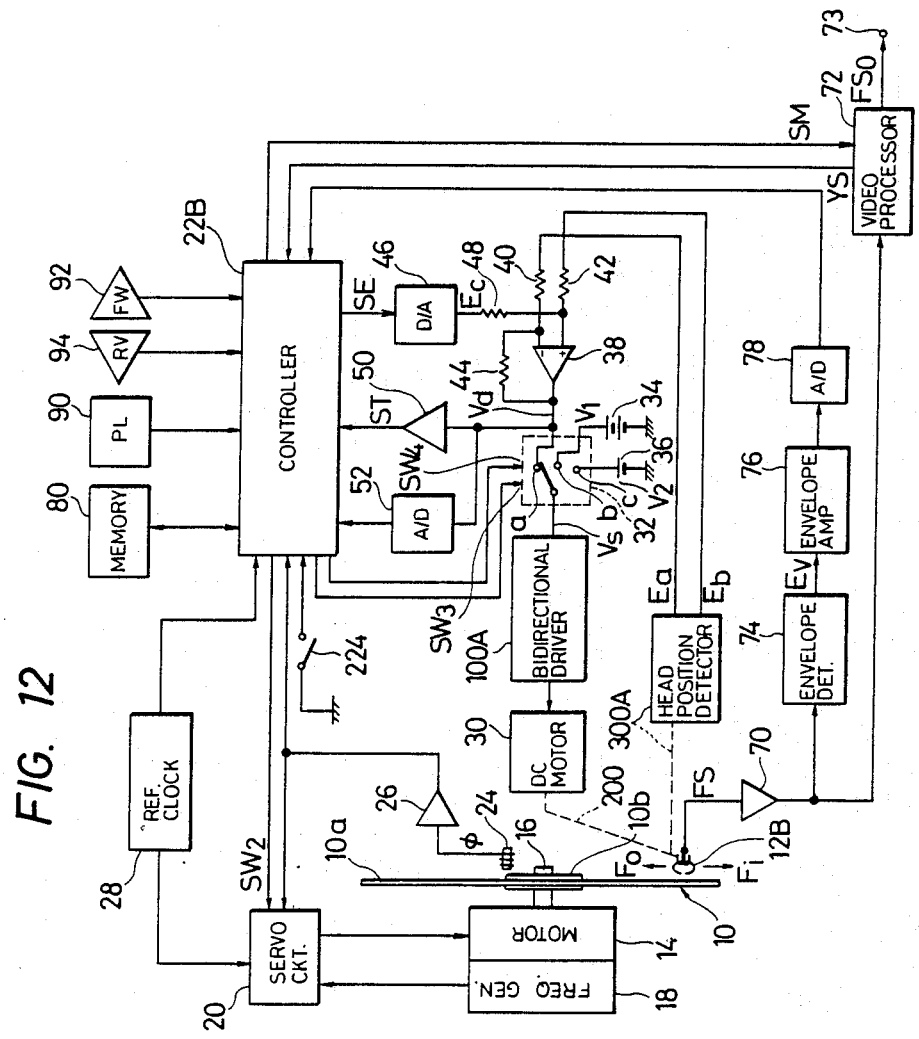
FIG. 12 is a block diagram showing the overall construction of a rotary recorder playback embodying the present invention.

FIG. 12 shows a rotary recorder playback for implementing the present invention A playback head 12B is used to scan a desired recording track $tr_n$ formed on the recording surface 10a and to read an FM video signal FS equivalent to one field while the magnetic disk 10 rotates at 3,600 rpm. The FM video signal FS is supplied to a video signal processing circuit 72 and an envelope detector circuit 74 through an amplifier 70 and an envelope amplifier 76.

The video signal processing circuit 72 includes a de-emphasis circuit, a video amplifying circuit, etc., and generates a base band, e.g., an NTSC type playback video signal $FS_o$, and sends the signal to an output terminal 73 of the playback. A control signal SM such as a field/frame conversion control signal and a mute control signal is supplied by a control means 22B to the video signal processing circuit 72 on one hand, and a synchronizing signal YS extracted from the playback video signal $FS_o$ is given by the video signal processing circuit 72 to the control means 22B.

The envelope detector circuit 74 detects the envelope of the FM video signal FS and outputs a voltage signal $E_v$ indicating the level. The voltage signal $E_v$ is amplified by the envelope amplifier 76, converted into a digital value by an analog to digital (A/D) converter 78 and supplied to the control means 22B.

The control means 22B comprises a microcomputer (CPU). It writes various programs and data from time to time to a memory 80 capable of being rewritten and it reads them out when necessary. According to this embodiment in particular, as will be described later, the output voltage $V_d$ of the operational amplifier 38 is stored in the memory 80 as an error voltage $V_{BS}+v_n$ when the envelope of the FM video signal $FS_o$ reaches a peak value relative to each recording track $tr_n$ and the corresponding error voltage $v_n$ is read out when the recording track is subjected to tracking.

A playback key "PL" 90 is used for instructing the start and stop of the playback, a forward key "FW" 92 is used for moving the playback head 12B in the forward direction (direction $F_i$) of track numbers and a reverse key "RV" 94 is used for moving the playback head 12B in the reverse direction (direction $F_o$). All these keys 90, 92 and 94 are connected to the control means 22B. The track numbers instructed by the keys 92 and 94 are visually displayed on a display unit (not shown) such as a monitor television connected to the control means 22B.

Moreover, various mechanisms and circuits not shown in FIG. 12 are connected to the control means 22B for system controlling purposes, but the description of them will be omitted as they are not directly relevant.

Overall Operation (a) Initializing mode

When the inner cavity is opened as set forth above to load the rectangular receptacle 220 (FIG. 5) of the playback with the magnetic disk 10 or when power is supplied, the playback head 12B is moved to the home position HP. When the playback 12B is moved, the changeover control signals SW$_3$ and SW$_4$ given by the control means 22B are (1, 0), whereby the switch 32 is connected to the terminal c. The reverse constant speed feed control voltage $V_2$ is supplied from the constant voltage source 36 to the driving circuit 100A as the speed control voltage $V_s$ and, as a result, the d.c. motor 30 rotates in reverse (counterclockwise) so as to make a head carriage 216 slide in the outward direction of the arrow $F_o$.

The initializing mode is provided when the power is supplied after the disk 10 is loaded and subsequently the playback key 90 is depressed.

(b) Search mode

When the playback head 12B reaches the home position HP, the control means 22B causes a search mode to start in response to the detection signal from the switch 224.

For that purpose, the control means 22B first switches the changeover control signals SW$_3$ and SW$_4$ to (0, 1). Consequently, the switch 32 is connected to the terminal b and the forward constant speed feed control voltage $V_1$ from the constant voltage source 34 is selected as the speed control voltage $V_s$ supplied to the driving circuit 100A. The forward a constant speed feed control voltage $V_1$ is, as shown in FIG. 3, constant voltage a predetermined value higher than the motor stop voltage $V_{BS}$. By the control voltage $V_1$, the d.c. motor 30 rotates forward (clockwise) at a speed $N_1(V_1)$ so as to drive the head carriage 216 and move the playback head 12B in the inward direction of the arrow $F_i$. The moving slit plate 302 also moves together in the inward direction and the head position signals $E_a$ and $E_b$ change with the timing of FIG. 9 corresponding to the movement of the playback head 12B as shown in FIG. 10. The position signals $E_a$ and $E_b$ are supplied by the head position detector 300A to the non-inverted and inverted input terminals of the operational amplifier 38.

On the other hand, the digital positioning control signal SE, equivalent to the analog voltage $V_{BS}$, is given by the control means 22B to the D/A converter 46 and the analog voltage signal $E_c(V_{BS})$ obtained at its output terminal is supplied to the non-inverted input terminal of the operational amplifier 38 through the resistor 48.

Accordingly, the output voltage $V_d$ of the operational amplifier 38 is expressed as $$V_d = V_{BS} + A_1 \cdot (E_b - E_a).$$

Figure 13:
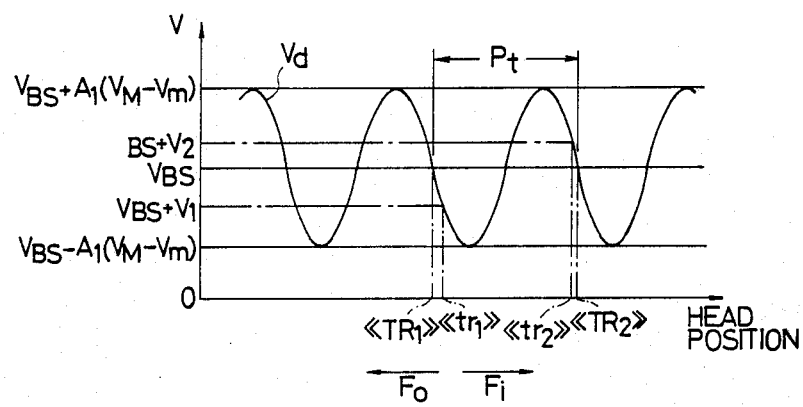
FIG. 13 is a signal waveform chart illustrating a change in the output voltage level $V_d$ of an operational amplifier when the playback head is moved in the search mode of the rotary recorder playback of FIG. 12.

Its value also changes as shown in FIG. 13. When the head 12B moved in the inward direction of the arrow $F_i$, the voltage $V_d$ changes roughly like a sine wave with a period of the track pitch $P_t$ and $V_d = V_{BS}$ where the head 12B is positioned adjacent to the central portion [TR$_1$], [TR$_2$]... of each of the track positions TR$_1$, TR$_2$.... However, the voltage $V_d$ is not supplied to the driving circuit 100A as the speed control voltage $V_s$ during the search mode but is monitored by the control means 22B through the A/D converter 52.

Moreover, the control means 22B supplies the control signal SW$_2$ to the servo circuit 20, whereby the d.c. motor 14 operates, causing the disk 10 to rotate at 3,600 rpm.

When the playback head 12B moves from the home position HP in the inward direction of the arrow $F_i$, it successively crosses each of the rotating recording tracks $tr_1$, $tr_2$... and reads the FM video signals FS recorded thereon. The envelope $e_n$ (FIG. 14) of each FM video signal FS is detected by the envelope detector circuit 74 and its digital value is supplied by the A/D converter 78 to the control means 22B. The control means 22B monitors the envelopes $e_1$, $e_2$... of the video signals recorded on each of the tracks $tr_1$, $tr_2$..., and obtains the value of the voltage $V_d$ (FIG. 13), expressed as $V_{BS}+v_1$, $V_{BS}+v_2$, when a peak value $ep_1$, $ep_2$... (FIG. 14) is attained. The control means 22B successively writes the derived error voltages $v_1$, $v_2$... as error voltages in given addresses of the memory 80.

Figure 14:
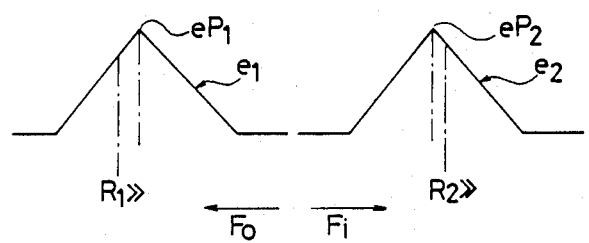
FIG. 14 is a diagram showing the envelope of an FM video signal FS read out when the playback head is moved in the search mode of the rotary recorder playback of FIG. 12.

The peak value $ep_n$ of each envelope $e_n$ is obtained when the playback head 12B is placed opposite to the central position [$tr_n$] of the recording track $tr_n$. Since the central position [$tr_n$] of the recording track $tr_n$ conforms to the central position [TR$_n$] of the track position TR$_n$, when the recording track $tr_n$ is exactly superposed on the track position TR$_n$, the error voltage $v_n$ is zero. When the recording track $tr_1$, however, deviates from the track position $TR_1$ in the inward direction of the arrow $F_i$, as shown in FIG. 14, $v_1$ is less than 0 as shown in FIG. 13. On the other hand, $v_2$ is greater than 0 when the recording track $tr_2$ deviates from the track position $TR_2$ in the outward direction of the arrow $F_o$. When the error voltages $v_1$, $v_2$... are obtained as shown in FIG. 13, the position signals $E_a$ and $E_b$ from the position detector 300 respectively have values ($v_{a1}$, $v_{b1}$), ($v_{a2}$, $v_{b2}$) ... deviating from the reference level $V_o$.

When the error voltage $v_{50}$ relative to a recording track $tr_{50}$ is written to the memory 80 after the recording head thus crosses the final recording track, the control means 22B switches the changeover control signals $SW_3$ and $SW_4$ to (1, 0). The switch 32 is connected to the terminal c, the reverse constant speed feed control voltage $V_2$ is supplied by the constant voltage source 36 to the driving circuit 100 again as the speed control voltage $V_s$. Consequently, the d.c. motor 30 rotates in reverse (counterclockwise) at a speed of $N_2$ ($V_2$) so as to drive the head carriage 216 and move the playback head 12B in the outward direction of the arrow $F_o$. When the playback head 12B reaches the home position HP, the detection signal is sent from the switch 224 to the control means 22B, which responds to the signal, stops the d.c. motor 30 and keeps the playback head 12B on standby in the home position.

On the termination of the search mode, the playback head 12B may be kept on standby in the inner position of the disk 10 (e.g., position of the recording track $tr_{50}$) without returning it to the home position HP However, a description will be given of the subsequent access mode wherein the playback head 12B is kept on standby in the home position HP according to this embodiment.

(c) Access Mode

When the first track is specified by the forward feed key 92 then, the changeover control signals $SW_3$ and $SW_4$ from the control means 22B are switched to (0, 1) and the switch 32 is caused to contact the terminal b, whereby the forward constant speed feed control voltage $V_1$ is selected as the speed control voltage $V_s$. The d.c. motor 30 then rotates forward (clockwise) at a speed $N_1$ ($V_1$) so as to drive the head carriage 216 and move the playback head 12B and the moving slit plate 302 in the inward direction of the arrow $F_i$.

On the other hand, the digital tracking control signal SE equivalent to $V_{BS}$ is given by the control means 22B to the D/A converter 46 and the analog voltage signal $E_c$ equal to the voltage $V_{BS}$ obtained at its output terminal is supplied to the non-inverted input terminal of the operational amplifier 38 through the resistor 48. Consequently, the output voltage $V_d$ of the operational amplifier 38 is expressed by $$V_d = V_{BS} + A_1 \cdot (E_b - E_a)$$

and its value changes as shown in FIG. 13. In other words, $V_d = V_{BS}$ when the playback head 12B is placed opposite to the central portion $[TR_1]$, $[TR_2]$... of the track position $TR_1$, $TR_2$... and $V_d = V_{BS} + v_1$, $V_{BS} + v_2$... when it is placed opposite to the central portion $[tr_1]$, $[tr_2]$... of the track position $tr_1$, $tr_2$...

While the playback head 12B is moving from the home position HP in the inward direction of the arrow $F_i$, the timing pulse ST is given by the Schmitt trigger circuit 50 to the control means 22B each time the voltage $V_d$ becomes equal to $V_{BS}$. The control means 22B counts the number of pulses ST and, when the pulse ST is in a prescribed place i.e., a pulse indicating the time at which the playback head 12B has passed through the central portion $[TR_1]$ of the first track is given, it switches the changeover control signals $SW_3$ and $SW_4$ to (0, 0). The switch 32 is thus connected to the terminal a and the output voltage (servo feed control voltage) $V_d$ of the operational amplifier 38 is selected as the speed control voltage $V_s$ supplied to the driving circuit 100A.

Figure 15:
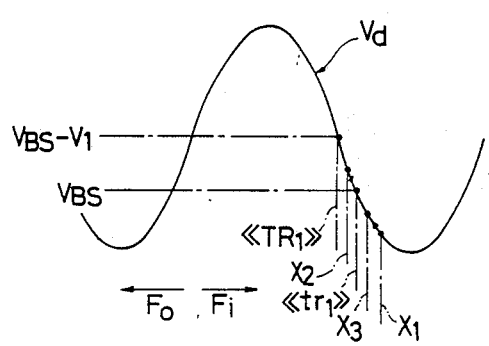
FIG. 15 a graph illustrating a function wherein the movements of the playback head converge in the central position of the first recording track in the access mode of the rotary recorder playback of FIG. 12.

Simultaneously, the control means 22B reads the error a space voltage $v_1$ for the recording track $tr_1$ out of the memory 80 and supplies the digital tracking control signal SE equivalent to $V_{BS}$-$v_1$ to the D/A converter 46, whereby the analog voltage signal $E_c$ is equal to $V_{BS}$-$v_1$, which is then supplied to the non-inverted input terminal $V_d$ of the operational amplifier 38 through the resistor 48. Accordingly, the output voltage $V_d$ of the operational amplifier 38 is expressed by $$V_d = V_{BS} - v_1 + A_1 \cdot (E_b - E_a)$$

and the value of $V_d$ changes as shown in FIG. 15 (an enlarged view). In other words, the waveform is the same as what is shown in FIG. 13 but the central level $V_{BS}$ is replaced with $V_{BS}$-$v_1$. In the above equation, the third term on the right side becomes $v_1$ in a head position where the playback head 12B is placed opposite to the central position $[tr_1]$ of the recording track $tr_1$ as in the case of the search mode or the above constant speed feed. In FIG. 15, consequently, $$V_d = V_{BS} - v_1 + v_1 = V_{BS}$$

when the playback head 12B is placed opposite to the central position $[tr_1]$ of the recording track $tr_1$.

When the speed control voltage $V_s$ is switched to the servo feed control voltage $V_d$ as set forth above, the playback head 12B is located at $X_1$ which is slightly beyond the central position $[tr_1]$ of the recording track $tr_1$ with $V_d$ less than $V_{BS}$, as shown in FIG. 15. The d.c. motor 30 thus rotates in the reverse (counterclockwise) direction, so that the playback head 12B is moved in the outward direction of the arrow $F_o$.

When the playback head 12B passes through the central position $[tr_1]$ of the recording track in the outward direction, $V_d$ is greater than $V_{BS}$ and the d.c. motor 30 then rotates forward (clockwise), whereby head 12B is again moved in the inward direction of the arrow $F_i$.

When the head 12B passes through the central position $[tr_1]$ of the recording track in the inward direction of the arrow $F_i$, thereafter $V_d$ is less than $V_{BS}$. The rotation of the d.c. motor 30 is reversed then and the head 12B is again turned in the outward direction. However, the position $X_3$ where the direction is reversed is closer to the central position $[tr_1]$ of the recording track than the position $X_1$ where the direction has been changed previously. While the head somewhat oscillates, its movement thus converges to the central position $[tr_1]$ of the recording track. At the central position, $V_d = V_{BS}$ in that stationary state and the head position signals $E_a$ and $E_b$ from the position detector 300 have values ($v_{a1}$ and $v_{b1}$) deviating from the reference level $V_o$.

In consequence, the playback head 12B is placed opposite to the first recording track $tr_1$ revolving at 3,600 rpm and is caused to repeatedly read out the FM video signal FS amounting to one field. Also, the video signal processing circuit 72 generates the NTSC playback video signal $FS_o$ in response to the signal FS and supplies the signal to an external apparatus, e.g., a television receiver, through the output terminal 73 of the system. A still image (photograph) recorded on the first recording track $tr_1$ is displayed on the screen of the television receiver.

When the forward feed key 92 is pressed again to specify the next (second) track, the control means 22B switches the changeover control signal $SW_3$ and $SW_4$ to (0, 1) and the forward constant speed feed control voltage $V_1$ is supplied from the constant voltage source 34 to the driving circuit 100 as the speed control voltage $V_s$. The d.c. motor 30 thus starts to rotate in the forward direction and moves the playback head 12B in the inward direction of the arrow $F_i$.

Figure 16:
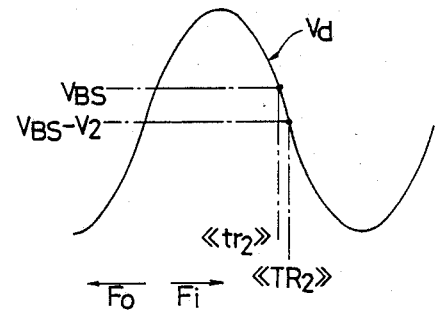
FIG. 16 is a graph illustrating a function wherein the movements of the playback head converge in the central position of the second recording track in the access mode of the rotary recorder playback of FIG. 12.

Simultaneously, the control means 22B reads the error voltage $v_2$ for the second recording track $tr_2$ out of the memory 80 and switches the tracking control signal SE to $V_{BS}$-$v_2$ for the second recording track $tr_2$ out of the memory 80 and switches the tracking control signal SE to $V_{BS}$-$v_2$. The output voltage $V_d$ of the operational amplifier 38 is therefore expressed as $$V_d = V_{BS} - v_2 + A_1 \cdot (E_b - E_a)$$

and its value changes as shown in FIG. 16 (enlarged view). In other words, the central level changes from $V_{BS}$-$v_1$ to $V_{BS}$-$v_2$ compared with the case of FIG. 15. As the third term on the right side in the above equation becomes $v_2$ when the playback head 12B is positioned opposite to the central position $[tr_2]$ of the recording track $tr_2$, then $$V_d = V_{BS} - v_2 + v_2 = V_{BS}$$

when the playback head 12B is positioned opposite to the central position $[tr_2]$ of the recording track $tr_2$ in FIG. 16.

When the playback head 12B passes through the central position $[tr_2]$ of the recording track $tr_2$, the timing pulse ST is generated by the Schmitt trigger circuit 50 and the control means 22B switches the changeover control signals $SW_3$ and $SW_4$ to (0,0) in response to the pulse ST.

The changeover switch 32 is consequently connected to the terminal a and the servo feed control voltage $V_d$ is supplied to the driving circuit 100, whereby the servo feed control is conducted in such a manner as to make the movement of the playback head converge to the position where $V_d = V_{BS}$, i.e., the central position $[tr_2]$ of the recording track $tr_2$. The playback head 12B repeatedly reads the FM video signal FS amounting to one field from the rotating recording track $tr_2$ and the still image recorded on the recording track $tr_2$ is displayed on the screen of the television receiver.

When the third track is subsequently designated by the forward feed key 92, the same tracking operation is conducted. The same operation will be applied to the fourth and other tracks.

Although the same tracking operation is conducted when the reverse key 94 is depressed, the changeover control signals $SW_3$ and $SW_4$ are switched to (1,0) at the initial constant speed feed and the playback head 12B is moved in the outward direction of arrow $F_o$. When the playback head 12B passes through the central position $[tr_n]$ of the designated recording track $tr_n$, the control means 22B switches the changeover control signals $SW_3$ and $SW_4$ to (0, 0) in response to the pulse ST generated by the Schmitt trigger circuit 50. Then the servo feed control is carried out so that the positions of the playback head 12B may converge to the central position $[tr_n]$ of the recording track.

Random access is possible wherein the playback head 12B is made to gain access to a given track from any position. In this case, the playback head 12B is also caused by means of the constant speed feed to first move in the inward or outward direction depending on the relative position of the designated track and the initial selection of the forward or reverse constant speed feed voltage $V_1$ or $V_2$. The constant speed feed is switched to the servo feed immediately after the playback head 12B passes through the central portion $[TR_n]$ of the desired track position or the central position $[tr_n]$ of the recording track.

As set forth above, the output voltage $V_d$ of the operational amplifier 38 is stored in the memory 80 as the error voltage $v_n$ when the envelope $e_n$ of the FM video signal FS is read from each recording track in the search mode (i.e., the playback head 12B is positioned opposite to the central position $[tr_n]$ of the recording track). In the access mode, the playback head 12B is first moved by means of the constant speed feed in the inward or outward direction, the constant speed feed being switched to the servo feed immediately after the playback head 12B passes through the central portion $[TR_n]$ of the desired track position or the central position $[tr_n]$ of the recording track. The error voltage $v_n$ of the track is read from the memory 80 and the tracking control signal SE is set at $V_{BS}$-$v_n$ by means of the servo feed and the tracking control signal SE thus set is added to the head position signals $E_a$ and $E_b$ from the position detector 30. The playback head 12B then oscillates inwardly and outwardly but the servo feed control voltage $V_d$ converges to $V_{BS}$, i.e., the head position signals $E_a$ and $E_b$ converges to ($v_{an}$ and $v_{bn}$) and the movement of the playback head 12B converges to the central position $[tr_n]$ of the recording track and stops at that position.

Such tracking is far superior in speed and accuracy to the conventional tracking relaying on mountaineering control.

In other words, the conventional tracking presupposes a tracking servo with the steps comprising moving a playback head repeatedly in a step form, detecting and comparing the envelopes of playback signals each time and providing a step motor with command pulses for positioning the playback head closer to the central position of a recording track according to the results compared. Thereby it takes longer to cause the movements of the playback head to converge in the central position of the recording track. If the quantity of head transfer per step is increased to shorten the tracking time, tracking accuracy will be reduced. Since the command pulses given by a control means to the step motor are used to control the head position, moreover, an error in the actual head position will readily be produced because of a backlash in the head transfer means.

The servo feed according to the present invention is characterized in that the actual position of a playback head is fed back in the form of a head position signal level, that servo-actuated control is effected so as to make the head position levels converge at a prescribed value corresponding to the central position (100% on-track position) of a recording track and that equilibrium is attained in a position where the actual position of the playback head is located on the central position (100% on-track position) of the recording track. In consequence, the converging speed (tracking speed) and the converging accuracy (tracking accuracy) are high and no error is produced even though backlash may exist in the actual head position.

Although the error voltage $v_n$ of each recording track $tr_n$ is stored in the memory 80 in the search mode according to the above embodiment, it is possible to execute the access mode directly without providing the search mode. In other words, although the constant speed feed in the access mode allows the forward or reverse constant speed feed control voltage $V_1$ or $V_2$ to be selected as the speed control voltage $V_s$ supplied to the driving circuit 100 and allows the playback head 12B to consequently move in the inward or outward direction, this is the same head feed as that in the search mode. Accordingly, the control means 22B can be made to monitor the envelope $e_n$ of the FM video signal FS during the constant speed feed in the access mode and, when it reaches a peak value $ep_n$ (i.e., the playback head 12B is placed opposite to the central position $[tr_n]$ of the recording track $tr_n$), the output voltage $V_d$ of the operational amplifier 38 may be obtained as the error voltage $v_n$ through the A/D converter 52. Thus the constant speed feed is switched to the servo feed and the error voltage is added to the head position signals $E_a$ and $E_b$ as in the case of the above embodiment. In this case, the error voltage $v_n$ may be stored in a buffer within the control means 22B temporarily without being stored in the memory 80.

(C) Electronic Still Camera II

Overall Construction

Figure 17:
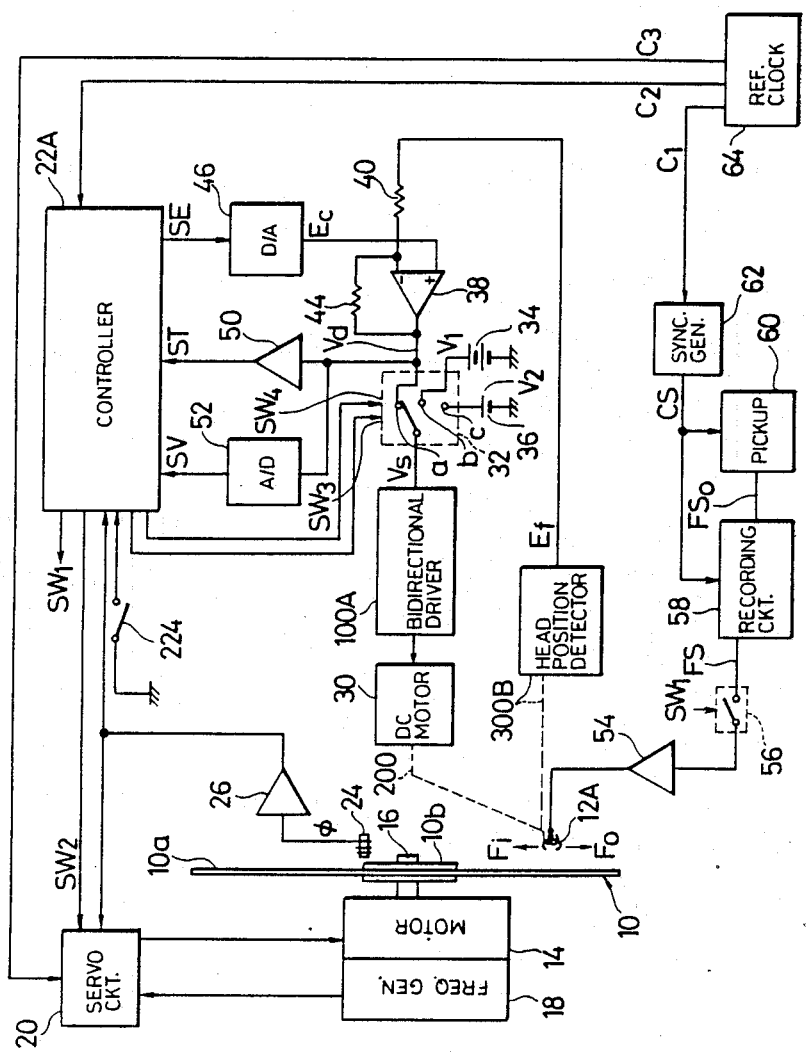
FIG. 17 is a block diagram showing the overall construction of another electronic still camera system embodying the present invention.

FIG. 17 shows another electronic still camera embodying the present invention, the electronic still camera having almost the same construction as what is shown in FIG. 1, except for a head position detector 300B.

As will be described later, the head position detector 300B generates a head position signal $E_f$ whose level continuously changes with the period of track pitch $P_t$ when a playback head 12A moves in the inward and outward directions. The head position signal $E_f$ is supplied to the inverted input terminal of the operational amplifier 38 through the resistor 40. On the other hand, the digital positioning signal SE is supplied by the control means 22A to the D/A converter 46 and the analog voltage $E_c$ from its output terminal is supplied to the non-inverted input terminal of the operational amplifier 38. Therefore, the output voltage $V_d$ of the operational amplifier 38 is expressed by $$V_d = E_c + A_1 \cdot (E_c - E_f).$$

Therefore $V_d = (1 + A_1) \cdot E_c - A_1 \cdot E_f$ where $A_1 = R_{44}/R_{40}$ The output voltage $V_d$ of the operational amplifier 38 is still given to the input terminal a of the changeover switch 32 as the servo feed control voltage and to the control means 22A through the Schmitt trigger circuit 50 and the A/D converter 52.

Head Position Detector

Figure 18:
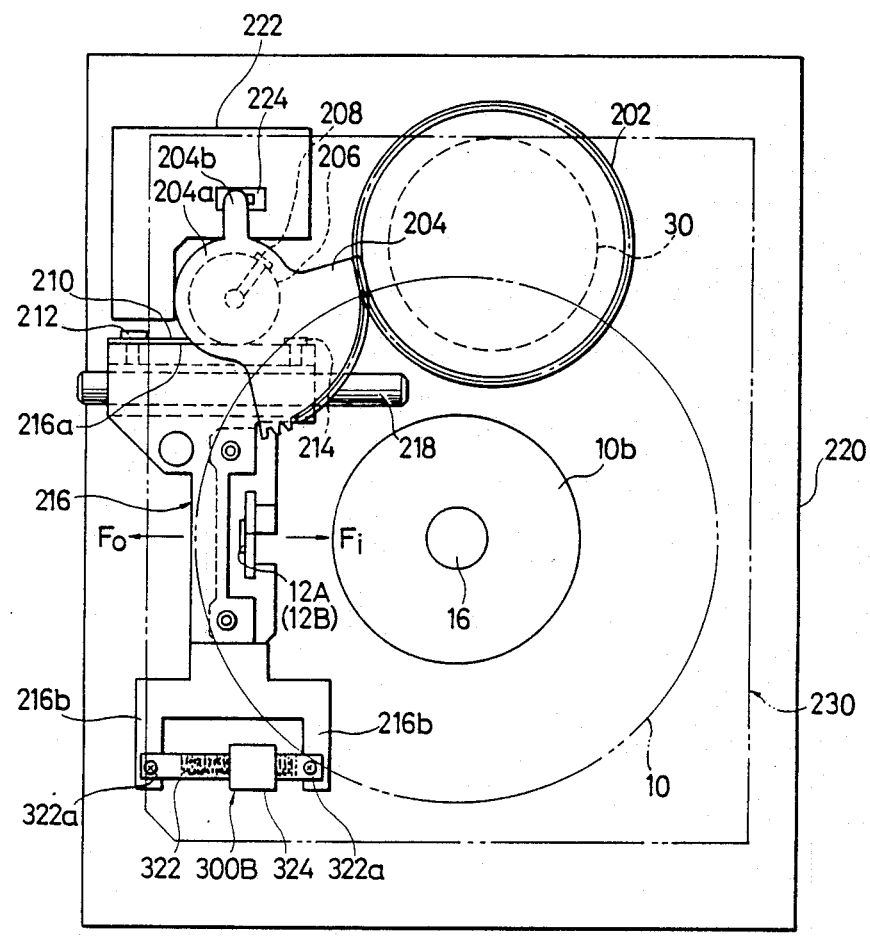
FIG. 18 is a diagram showing the construction of the head moving mechanism of FIG. 17.

Both ends 322a of the moving slit plate 322 of the head position detector 300B, as shown in FIG. 18, are fixed to the front ends 216b of the head carriage 216 of the head moving mechanism 200. Thereby the moving slit plate 211 is moved together with the head carriage 216 in the inward and outward directions of the arrows $F_i$ and $F_o$. On the other hand, the rectangular receptacle 220 is equipped with a head position detector fixing means so constructed as to allow the moving slit plate 322 to pass therethrough.

Figure 19:
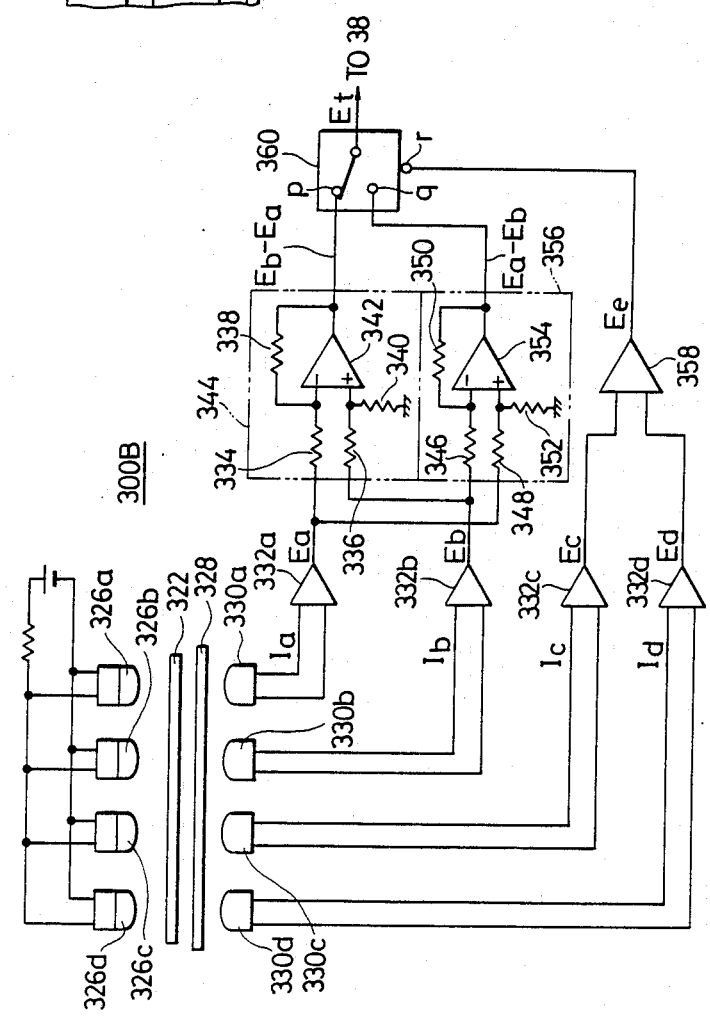
FIG. 19 is a diagram showing the construction of the head position of FIG. 17.

In the head detector 300B shown in FIG. 19, four light emitting elements, e.g. parallel light emitting diodes 326a, 326b, 326c and 326d, each having the same construction and characteristics, are installed above the moving slit plate 322. Four light receiving elements, e.g., parallel photodiodes 330a, 330b, 330c and 330d, each having the same construction and characteristics, are installed under the moving slit plate 322 and affixed to a fixed slit plate 328.

Figure 20A:
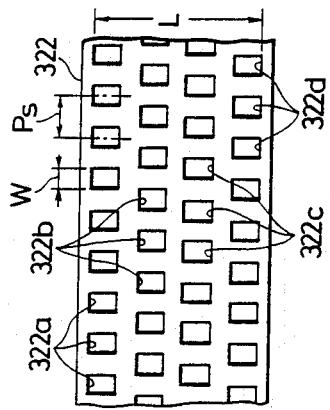
FIGS. 20(a) and 20(b) are detailed diagrams showing the construction of moving and fixed slit plates contained in the head position detector of FIG. 19.
Figure 20B:
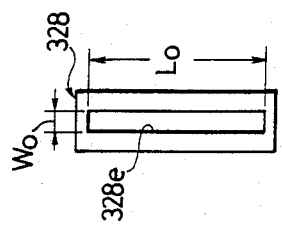

FIGS. 20(a) and 20(b) show the moving slit plate 322 and the fixed slit plate 328 in detail. In the moving slit plate 322 are formed four rows of slits 322a, 322c, 322b and 322d, arranged in rows in its longer direction with a slit width W of 100 micrometers and a slit pitch. $P_s$ of 200 micrometers. It is noted that the recording track pitch $P_t$ is 100 micrometers. The slits 322a, 322c, 322b and 322d are shifted relative to one another in the stated order by a shift of $P_s/4$ (50 micrometers). On the other hand, the fixed slit plate 328 is provided with a slit 328e with the same slit width $W_o$ (100 micrometers) as that of the slits 322a–322d and a length $L_o$ slightly longer than the distance L between both ends of the slits 322a and 322d. However, the length $L_o$ of the slit may be the same as or slightly smaller than the length L.

In FIG. 19, the light emitting diode 326a, the slits 322a of the moving slit plate 322, the slit 328e of the fixed slit plate 328 and the photodiode 330a are vertically set in a column, whereas the light emitting diode 326c, the slits 322c of the moving slit plate 322, the slit 328e of the fixed slit plate 328 and the photodiode element 330c are vertically set in a parallel column. The light emitting diode 326d, the slits 322d of the fixed slit plate 328 and the photodiode 330d are vertically set in yet another parallel column. When the moving slit plate 322 moves together with the head carriage 216 in the direction perpendicular to the surface of paper of FIG. 19 (equivalent to the inward or outward directinos of arrows $F_o$ and $F_i$), the intensity of light propagating from the light emitting diodes 326a–326d to the photodiodes 330a–330d, i.e., periodically changes with the movement of the moving slits 322a–322d. Hence, the intensity of photocurrents $I_a$–$I_d$ flowing through the photodiodes 330a–330d also periodically vary and are converted into voltages $E_a$–$E_d$ by current-voltage converters 332a–332d, each having the same construction and characteristics. The values of the voltage signals $E_a$–$E_d$ change as the recording head 12A moves roughly like a sine wave with a period twice that of the track pitch $P_t$, as will be described later.

Figure 22:
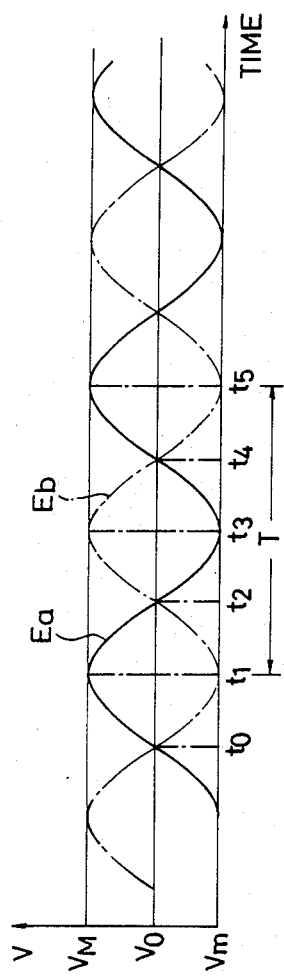
FIG. 22 is a timing chart illustrating the function of the moving slit plate when it is moved in the head position detector of FIG. 19.
Figure 23:
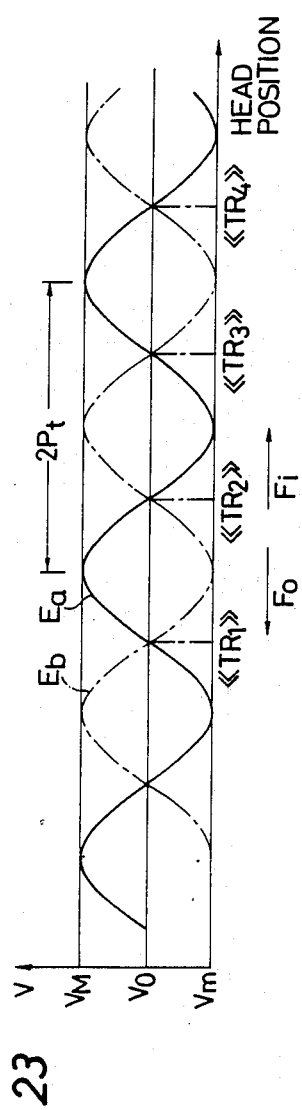
FIG. 23 is a signal waveform chart showing changes in the levels of the voltage signals $E_a$ and $E_b$ generated in the head position detector of FIG. 19 when the recording head is moved.

Referring now to FIGS. 21 and 22, the operation of the moving slit plate 322 while it moves will be described in detail. FIGS. 21(a)–(e) show the configurations as viewed from the light emitting diodes 326a–326d at fixed time intervals when the moving slit plate 322 moves at a constant speed u in the inward direction $F_i$. While the moving slit plate 322 is moving, the light receiving elements 330a–330d receive light of intensity roughly proportional to the areas $S_a$–$S_d$ on which the moving slits 322a–322d are superimposed on the fixed slit 328e. As a result, the values of the voltage signals $E_a$–$E_d$ change in proportion to the intensity of the light and thus the areas $S_a$–$S_d$.

In FIG. 21(a) (at the point of time of $t_1$ of FIG. 22), the area common to the moving slit 322a and to the fixed slit 328e is maximized with a maximum value $V_M$, whereas the photodiode 330b is screened ($S_b=0$) by the moving slit plate 322 and its voltage signal $E_b$ is at a minimum level $V_m$, approximately equal to zero. As the moving slit plate 322 then moves in the inward direction of arrow $F_i$, the area $S_a$ common to the moving slit 322a and the fixed slit 328e decreases, whereas the area $S_b$ common to the moving slit 322b and the fixed slit 328e simultaneously increases. At the point of time $t_2$, T/4 (T=period) later than the time $t_1$, the moving slits 322a and 322b each half overlap the fixed slit 328e and the voltage signals $E_a$ and $E_b$ both reach the average value $V_o$. When a time T/4 elapses from the time $t_2$, the photodiode 330a is screened by the moving slit plate 322 ($S_a=0$), as shown in FIG. 21(c), and the voltage signal $E_a$ has a minimum value $V_m$, whereas the area $S_b$ common to the moving slit 322b and the fixed slit 328e is maximized and the voltage signal $E_b$ has a maximum value $V_M$. As the moving slit plate 322 then moves in the inward direction of $F_i$, the area $S_a$ common to the moving slit 322a and the fixed slit 328e simultaneously increases, whereas the area $S_b$ common to the moving slit 322b and the fixed slit 328e decreases. The voltage signals $E_a$ and $E_b$ both have the average value $V_o$ at the point of time $t_4$ (FIG. 21(d)) and at the point of time $t_5$ (FIG. 21(e)), the voltage signal $E_a$ has maximum value $V_M$, whereas the voltage signal $E_b$ has a minimum level value $V_m$.

When the moving slit plate 322 is thus moved in the inward direction $F_i$, the levels of the voltage signal $E_a$ and $E_b$ change sinusoidally with opposite phase, i.e., 180° out of phase, with the time period T ($P_s/u$) determined by the transfer speed u and the slit pitch $P_s$. Similar waveforms are obtained for the moving slit plate 322 moving in the outward direction of the arrow $F_o$.

The voltage signals $E_a$ and $E_b$ vary relative to the movement of the moving slit plate 322 and with a period of slit pitch $P_s$ (200 micrometers) in accordance with the relative position of the fixed slit 328e to the moving slits 322a and 322b. However, the moving slit plate 322 moves together with the recording head 12A commonly connected to the head carriage 216 in the same inward or outward direction. The slit pitch $P_s$ (200 micrometers is selected to be twice as great as the track pitch $P_t$ (100 micrometers). When the recording head 12A moves in the inward or outward direction, accordingly, the levels of the voltage signals $E_a$ and $E_b$ change roughly like a sine wave with a period twice as long as that of the track pitch $P_t$. According to this embodiment, it has been arranged that the fixed slit 328e and the moving slits 322a and 322b are relatively positioned as shown in FIG. 21(d) when the recording head 12A is positioned opposite to the central portion (100% or completely on-track position) of each odd-numbered track position. Thus the voltage signals $E_a$ and $E_b$ have waveforms dependent on the movement of the recording head 12a and are at the average value $V_o$ when the recording head 12A is located in on-track position [TR$_1$], [TR$_2$]... for each track.

Figure 24:
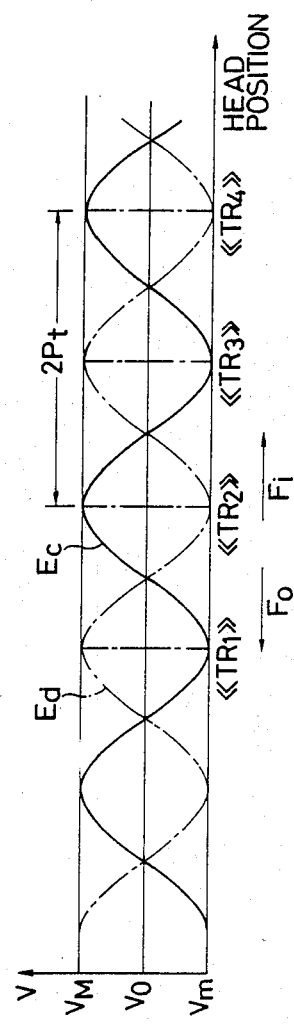
FIG. 24 is a signal waveform chart showing changes in the levels of the voltage signals $E_c$ and $E_d$ generated in the head position detector of FIG. 19 when the recording head is moved.

As the moving slits 322c and 322d are offset respectively from the moving slits 322a and 322b by one-quarter of the slit pitch, $P_s/4$ (50 micrometers), the levels of the voltage signals $E_c$ and $E_d$ are, as will be understood, positioned as shown in FIG. 24 relative to the movement of the recording head 12A. In other words, the voltage signals $E_c$ and $E_d$ lag behind the voltage signals $E_a$ and $E_b$ by 90° in phase angle.

Referring again to FIG. 19, the voltage signal $E_a$ is supplied to the inverted input of an operational amplifier 342 through a resistor 334 and to the non-inverted input of an operational amplifier 354 through another resistor 348. The voltage signal $E_b$ is supplied to the non-inverted input of the operational amplifier 342 through a resistor 336 and to the inverted input of the operational amplifier 354 through a resistor 346. Feedback resistors 338 and 350 are put in parallel to the operational amplifiers 342 and 354. The resistance of the resistors 334–340 associated with the first operational amplifier 342 are selected as being equal so as to provide a differential amplifier 344 with a gain of 1. In the same manner, the resistances of the resistors 346–352 associated with the second operational amplifier 354 are selected as being equal and they constitute another differential amplifier 356 with a gain of 1. Accordingly, the two voltage signals $E_b–E_a$ and $E_a–E_b$ that vary sinusoidally, as shown in FIG. 25, are obtained at the output terminal of the operational amplifiers 344 and 356 and these signals are respectively supplied to input terminals p and q of an analog switch 360, as shown in FIG. 19.

On the other hand, the voltages $E_c$ and $E_d$ are respectively supplied to input terminals of a comparator 358 and a square signal $E_e$, as shown in FIG. 26, is obtained at the output terminal of the comparator 358 and supplied to a changeover control terminal r of the analog switch 360.

The analog switch 360 is so arranged that its terminal p is connected to its output when the level of the signal $E_e$ at the changeover control terminal r is "1", whereas the terminal q is connected when the level of $E_e$ is "0". Accordingly, there is obtained, at the output terminal of the switch 360 as shown in FIG. 27, a voltage signal $E_f$ whose level continuously changes with the period of track pitch $P_t$ when the recording head 12A moves in the inward and outward directions of $F_i$ and $F_o$ and reaches the reference average level when the recording head 12A is located at the completely 100% on-track position [TR$_1$], [TR$_2$].... As shown in FIG. 17, the voltage signal $E_f$ is supplied through the resistor 40 to the non-inverted input terminal of the operational amplifier 38 as the head position signal.

Operation

The operation of the electronic still camera of FIG. 17 is similar to that camera of FIG. 1 The recording head 12A is first moved to the home position HP when the inner cavity is opened or power is applied after the magnetic disk 10 is already contained in the rectangular receptacle 220 (FIG. 18). Then track access begins When the recording head 12A reaches the home position HP, the changeover control signals SW$_3$ and SW$_4$ from the control means 22A are switched to (0, 1) and the switch 32 is connected to the terminal b. As a result, the forward constant speed feed control voltage V$_1$ from the constant voltage source 34 is selected as the speed control voltage V$_s$ supplied to the driving circuit 100. Thereby the recording head 12A is moved in the inward direction of the arrow $F_i$. Simultaneously, the moving slit plate 322 is also moved in the inward direction and the head position signal $E_f$, whose value changes as shown in FIG. 27, is supplied by the head position detector 300B to the inverted input terminal of the operational amplifier 38.

On the other hand, the digital positioning control signal SE corresponding to $V_{BS}/(1+A_1)$ is given by the control means 22A to the D/A converter 46 and the analog voltage signal $E_c$, equal to $V_{BS}$, obtained at its output terminal is supplied to the non-inverted input terminal of the operational amplifier 38.

Figure 28:
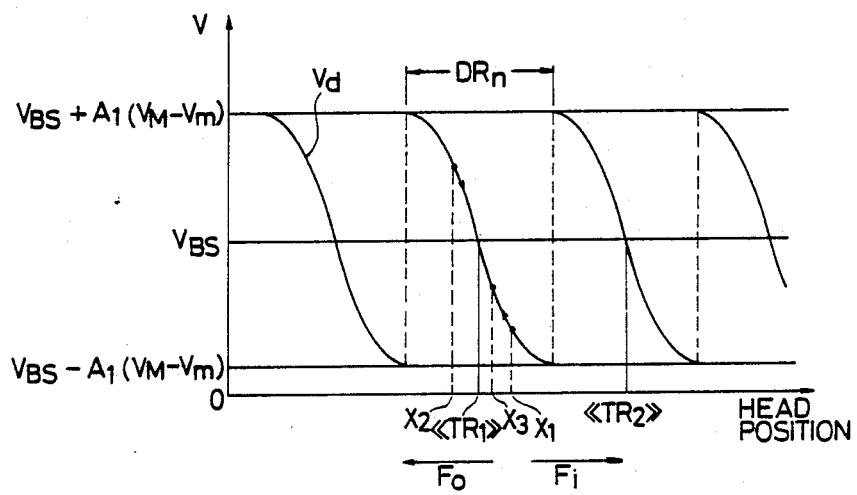
FIG. 28 is a graph illustrating a function wherein the movements of the recording head of the electronic still camera of FIG. 19 converge to the central position of the first track.

Accordingly, the output voltage $V_d$ of the operational amplifier 38 is expressed as $$V_d = V_{BS} - A_1 \cdot E_f$$

and its value changes as shown in FIG. 28. In other words, the level of the voltage $V_d$ continuously changes with a period of the track pitch $P_t$ when the head 12A moves in the inward direction of the arrow $F_i$. Also, $V_d = V_{BS}$ when the head 12A is located in the completely on-track position $[TR_1]$, $[TR_2]$. . . .

While the head 12A is moving from the home position HP in the inward direction, the timing pulse ST is given by the Schmitt trigger circuit 50 to the control means 22A each time the voltage $V_d$ becomes equal to $V_{BS}$. The control means 22A counts the number of pulses ST and, when the pulse ST in the predetermined place is given, i.e., when the pulse ST indicates a time at which the recording head 12A has passed through the first completely 100% on-track position $[TR_1]$, the control means 22A switches the changeover control signals $SW_3$ and $SW_4$ to (0, 0). Consequently, the switch 32 is connected to the terminal a and the output voltage (servo feed control voltage) $V_d$ of the operational amplifier 38 is selected as the speed control voltage $V_s$ supplied to the driving circuit 100A.

When the speed control voltage $V_s$ is switched to the servo feed control voltage $V_d$, the recording head 12A is located at the position $X_1$ slightly beyond the completely on-track position $[TR_1]$ and, as shown in FIG. 28, $V_d$ is less than $V_{BS}$. The d.c. motor 30 thus rotates in the reverse (counterclockwise) direction and the head 12A is moved in the outward direction $F_o$.

When the head 12A passes outwardly through the completely on-track position $[TR_1]$, thereafter $V_d$ is greater than $V_{BS}$ and the d.c. motor 30 then rotates forward (clockwise), whereby the head 12A is again moved in the inward direction $F_i$. When the head 12A again passes inwardly through the completely on-track position $[TR_1]$, thereafter $V_d$ is again less than $V_{BS}$ and the d.c. motor is reversed, thus changing the movement of the head 12A to the inward direction $F_i$ again. However, the position $X_3$ where the direction is reversed is closer to the completely on-track position $[TR_1]$ than the previous position $X_1$. The movement of the head 12A thus slightly oscillates, but converges to the completely on-track position $[TR_1]$ and then stops there. The servo feed control voltage is maintained at $V_d = V_{BS}$ in that standstill position.

When the recording head 12A is located at the first track position $TR_1$, the video signal FS amounting to one field is written by the recording head 12A to the whole circumference in the first track position $TR_1$ in the same manner as in the case of the electronic still camera of FIG. 1. Consequently the first recording track $tr_1$ is formed on the first track position $TR_1$. The recording head 12A is thereafter similarly moved to the following track positions $TR_2$ and $TR_3$, so that the subsequent video signals FS are written in those tracks.

As is obvious from FIG. 28, the positional range within which the servo feed is possible, i.e., the range $DR_n$ close to the track position within which the head 12A is returned to the completely on-track position $[TR_n]$, extends over a distance equal to the track pitch $P_t$ (100 micrometers) and is centered around the completely on-track position $[TR_n]$. The absolute value of the servo feed voltage $V_d$ relative to $V_{BS}$ increase as it is located further from the completely on-track position $[TR_n]$ within the range $DR_n$ so that the force (rotational force of the motor 30) for making the head 12A return to the completely on-track position $[TR_n]$ proportionally increases for larger errors. The servo feed dynamic range is maximized according to this embodiment and therefore the constant speed feed is safely switched to the servo feed at high speed.

(D) Playback 11

Figure 29:
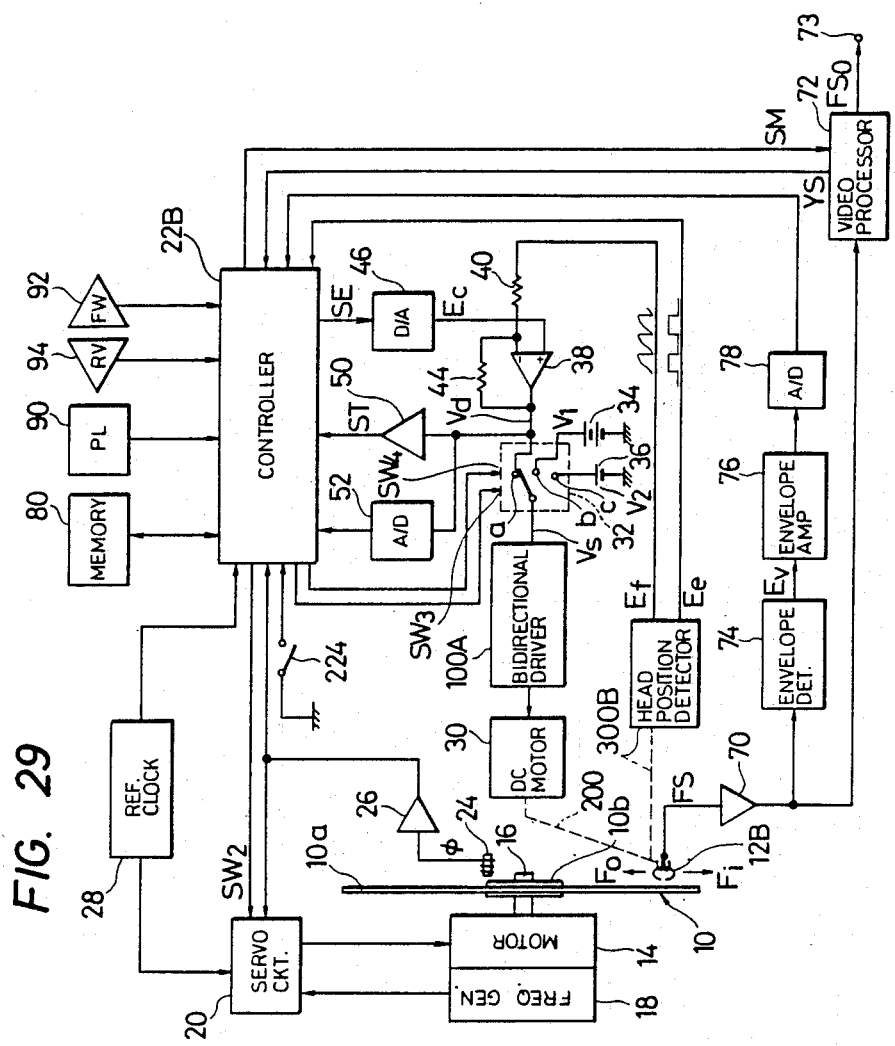
FIG. 29 is a block diagram showing the overall construction of the playback of another electronic still camera system embodying the present invention.

Another rotary recorder playback embodying the present invention is, as shown in FIG. 29, of almost the same construction as what is shown in FIG. 12 except for the head position detector 300B.

Although the head position detector 300B is the same as what is shown in FIG. 19, the square pulse signal $E_e$ according to this embodiment is also given to the control means 22B. Moreover, the head position signal $E_f$ is given to the inverted input terminal of the operational amplifier 38 through the resistor 40. On the other hand, the digital positioning signal SE is supplied by the control means 22B to the D/A converter 46 and the analog voltage $E_c$ from its output terminal is supplied to the non-inverted input terminal of the operational amplifier 38. The output voltage $V_d$ of the operational amplifier 38 is thus expressed as $$V_d = E_c + A_1 \cdot (E_c - E_f)$$

Therefore, $$V_d = (1 + A_1) \cdot E_c - A_1 \cdot E_f$$

where, $A_1 = R_{44}/R_{40}$

Operation

Even in this playback, as in the case of the playback of FIG. 12, the playback head 12B can be moved close to an intended track quickly at a constant speed under initial open loop control (constant speed feed) during initial positioning near a desired recording track. A head position signal whose level represents the actual position of the head 12B is converted to an error signal according to its positional deviation. Under closed loop control (servo feed), the error signal is fed back, whereby the movement of the head 12B converges to the central position of the recording track and stops thereat. Accordingly, tracking can be conducted accurately without being affected by backlash, etc.

Furthermore, the head position detector 300B supplies the head position signal $E_f$ whose level continuously changes with a period of the track pitch $P_t$ (100 micrometer). Therefore the positional range within which the servo feed is possible, i.e., the range $DR_n$ close to the track position within which the head 12B converges to the desired position $[tr_n]$ extends over a distance equivalent to the track pitch $P_t$ and is centered around the central portion $[TR_n]$ of the track position. Within the range $DR_n$ close to the track position, the absolute value of the servo feed control voltage $V_d$ relative to $V_{BS}$ increases as the head 12B moves farther from the predetermined position. As a result, the force for directing the head 12B to the predetermined position (rotational force of the d.c. motor) increases in proportion to the absolute value, so that the maximum dynamic range is obtained.

As will be described hereafter, two kinds of high-speed head transfer switching systems are provided with the embodiment of FIG. 29.

(a) First high-speed head transfer switching system:

When the n-th track is specified by the forward feed key 92 in the access mode, the changeover control signals $SW_3$ and $SW_4$ from the control means 22B are first switched to (0, 1) so that the forward constant speed feed control voltage $V_1$ is selected as the speed control voltage $V_s$. Then the head 12B is moved across the disc toward its inner peripheral side (in the direction of arrow $F_i$). It is assumed that the error signals $v_n$ have previously been generated in the access mode.

In response to the timing pulse ST given by the Schmitt trigger circuit 50 given when the playback head 12B passes through the central portion $[TR_n]$ of the n-th track (FIG. 30), the control means 22B switches the changeover control signals $SW_3$ and $SW_4$ to (1, 0). The switch 32 is thus connected to the terminal c and the reverse constant speed feed control voltage $V_2$ from the constant voltage source 36 is supplied to the driving circuit 100. In consequence, reverse torque in the counterclockwise direction is produced by the d.c. motor 30, whereby damping force is reversely applied to the d.c. motor 30 and the head transfer mechanism 200. The playback head 12B thus stops immediately after it has passed the central portion $[TR_n]$ of the track position. The instant that the d.c. motor 30 is stopped by the reverse torque, it starts to rotate counterclockwise and the head 12B is reversed at the position $X_1$ and moved back in the outward direction of arrow $F_o$. When the head 12B passes outwardly through the central portion $[TR_n]$ of the track position, the pulse ST is generated by the Schmitt trigger circuit 50 and the control means 22B switches the control signals $SW_3$ and $SW_4$ to (0, 0) in response thereto. The switch 32 is then connected to the terminal a and the output voltage (servo feed control voltage) $V_d$ of the operational amplifier 38 is selected as the speed control voltage Vs supplied to the driving circuit 100.

Figure 30:
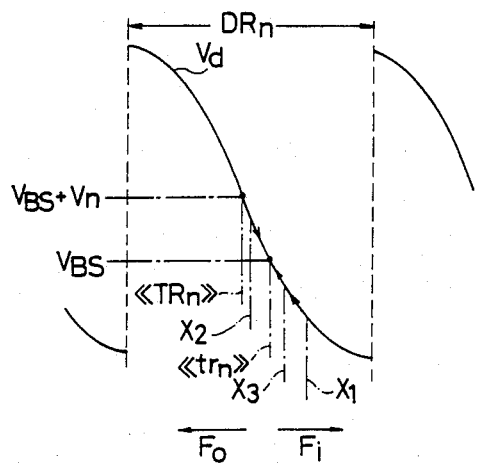
FIG. 30 is a graph illustrating the movements of the playback head in converging to a central position of the n-th recording track in the access mode of the playback of FIG. 29 through the first high-speed head movement changeover method embodying the present invention.

Simultaneously, the control means 22B reads the error voltage $v_n$ for the recording track $tr_n$ out of the memory 80 and supplies the tracking signal SE equivalent to $V_{BS}+v_n$ to the D/A converter 46, whereby the analog voltage signal $E_c$ equivalent to $V_{BS}+v_n$ is supplied to the non-inverted input terminal of the operational amplifier 38 through the resistor 48. The output voltage $V_d$ of the operational amplifier 38 is accordingly expressed as $$V_d = V_{BS} + v_n - A_1 \cdot E_f$$

and its value changes as shown in FIG. 30 (expanded view). The third term on the right side in the equation becomes $v_n$ in the position where the playback head 12B is placed opposite to the central position $[tr_n]$ of the recording track $tr_n$. In FIG. 30, accordingly, the servo feed control voltage becomes $$V_d = V_{BS} + v_n - v_n = V_{BS}$$

in the position where the playback head 12B is placed opposite to the central position $[tr_n]$ of the recording track $tr_n$.

When the speed control voltage $V_s$ is switched to the servo feed control voltage Vd, the playback head 12B is located in the position $X_2$ slightly outside the central portion $[TR_n]$ of the track position $TR_n$ on the outward side $F_o$ and, as shown in FIG. 30, $V_d$ is greater than $V_{BS}$. At that time, the rotational moment is small because the d.c. motor 30 has just started rotating in reverse. The d.c. motor 30 is therefore turned so as to forwardly (clockwise) rotate and cause the playback head 12B to move in the direction of arrow $F_i$.

When the playback head 12B passes through the central position $[tr_n]$ of the recording track in the inward direction $F_i$, thereafter $V_d$ is less than $V_{BS}$ and the d.c. motor 30 is turned so as to rotate in reverse (counterclockwise) and the head 12B is again moved in the outward direction $F_o$. The movement of the head 12B slightly oscillates, but converges to the central position $[tr_n]$ of the recording track and stop there. In that standstill state, $V_d = V_{BS}$ and the head position signal $E_f$ from the position detector 300B is offset by $v_n/A_1$ from the central level $V_o$.

In the above head transfer switching system, the playback head 12B is first moved at high speed by means of constant speed feed under the open loop control, brought to a given track and then reversely braked at a given time under the open loop control. The playback head 12B is thereby quickly stopped, returned to a position close to the central position of the track and thereafter switched to the closed loop servo feed control.

The reverse damping in this system is extremely effective in the case of random access. In other words, the random access is intended to make the playback head 12B attain access to given track from a given position, e.g., the head 12B positioned on the fourth track may be run a long distance to attain access to the 36th track To make quick access available in the case of long distance transfer, constant head transfer speed $N_1$ ($V_1$) or $N_2$ ($V_2$) under open loop control may be increased by increasing the voltages $V_1$ and $V_2$ of the constant voltage sources 34 and 36. However, the inertia of the d.c. motor 30 and the head transfer mechanism 200 will become fairly large when the playback head 12B enters the range $DR_n$ close to the desired track.

Accordingly, if the constant speed feed is directly switched to the servo feed without inserting reverse braking in the above open loop state (the switch being kept in contact with the terminal b or c), the head 12B will be unable to stop quickly and will enter the range $DR_{n+1}$ or $DR_{n-1}$ of an adjacent track and be positioned at that adjacent track by the closed loop control. In this system, the reverse braking is effected after the head 12B is caused to enter the range $DR_n$ close to the track and open loop control is first performed in order to stop the head 12B, which is then returned to a position close to the central portion of the track. The constant speed feed is then switched to the servo feed. Thereby it becomes possible to direct the head 12B to any desired position $[tr_n]$ quickly and positively even if the high-speed constant speed feed is used.

(b) Second High-Speed Head Transfer Switching System

In this system, the constant speed feed under the open loop control is directly switched to servo feed under closed loop control without the above reverse damping and then the position of the head 12B is monitored. When the head 12B has entered the range $DR_{n-1}$ or $DR_{n+1}$ of the adjacent track, next beyond the desired track, the switch 32 is switched to the terminal c or b so as to reverse direction and to return the head 12B to the desired range $DR_n$ over which it has just passed under open loop control. Thereafter, the head 12B is subjected to servo feed control. At that time, the time at which the head 12B comes out of or into the adjacent range is obtained by detecting the change (from "1" to "0" or "0" to "1") of the logic level of the signal $E_e$ (FIG. 26) from the head position detector 300B.

Figure 31:
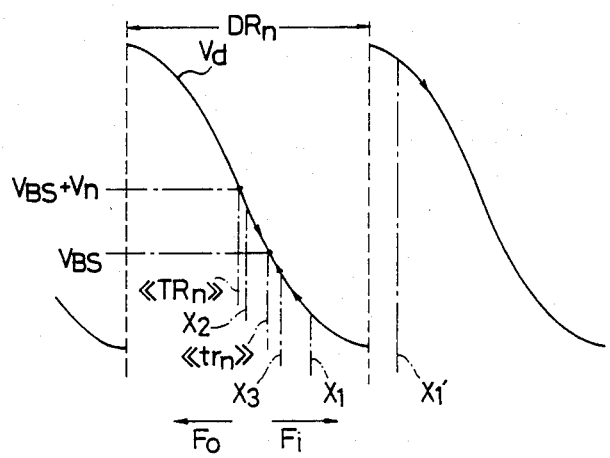
FIG. 31 is a graph illustrating the movements of the playback heas converging to a central position of the n-th recording track in the access mode of the playback of FIG. 29 through the second high-speed head movement changeover method embodying the present invention.

As shown in FIG. 31, for instance, the control means 22B monitors the signal $E_e$ after the head 12B enters the desired range $DR_n$ close to the n-th track when the head 12B attempts to gain access to the n-th track from the outer periphery of the disk. When the level of the signal $E_e$ transitions, the control means 22B responds to the transition and switches the changeover control signals $SW_3$ and $SW_4$ to (1, 0). The switch 32 is thus connected to the terminal c and the reverse constant speed feed control voltage $V_2$ from the constant voltage source is selected as the speed control voltage $V_s$ supplied to the driving circuit 100. Consequently, counterclockwise reverse torque is generated by the d c. motor 30 and ultimately the rotation of the d c. motor 30 as well as the transfer of the head 12B is stopped. The d.c. motor 30 starts to rotate in the reverse direction because of the counterclockwise torque and the head 12B also starts to move in the outward direction $F_o$. When the head 12B again enters the desired range $DR_n$ close to the n-th track, the level of the signal $E_e$ then transitions whereby the control means 22B responds to the transition and switches the changeover control signals $SW_3$ and $SW_4$ to (0, 0). The switch 32 is thus connected to the terminal a and the servo feed control is restarted. Since $V_d$ is then less than $V_{BS}$, the head 12B is moved in the outward direction $F_o$ but its speed and inertia are small. When the head 12B passes through the central position [$tr_1$] of the n-th recording track, $V_d$ is thereafter less than $V_{BS}$ and it immediately turns to move in the inward direction $F_i$. The movement of the head 12B oscillates but converges to the central position [$tr_1$] of the n-th recording track.

Figure 32:
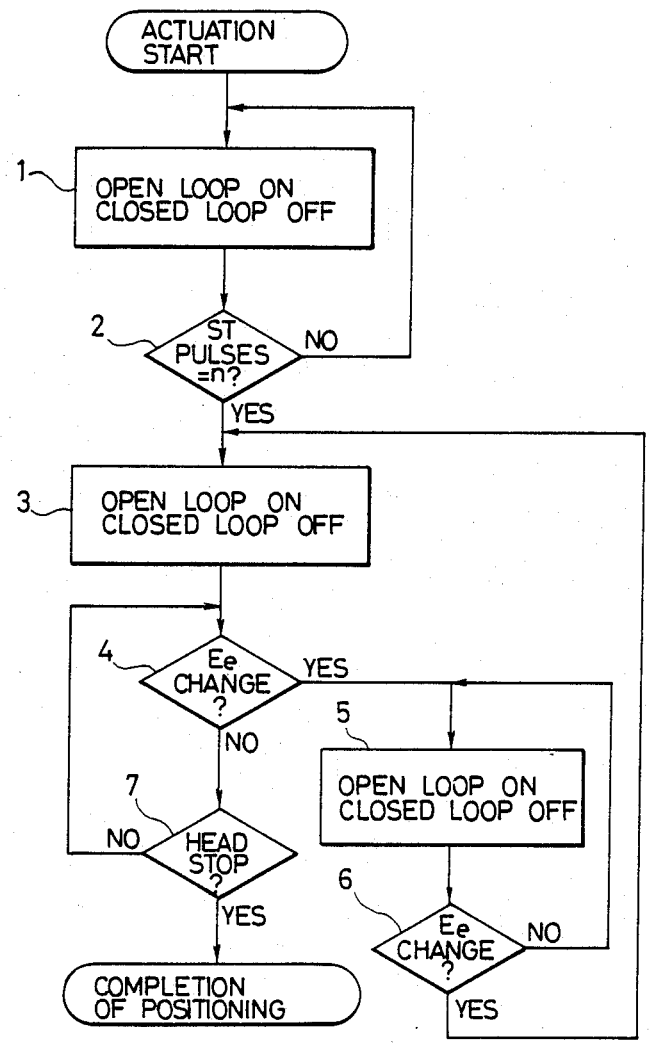
FIG. 32 is a flowchart showing the second high-speed head method changeover method.

FIG. 32 is a flowchart showing the head transfer switched according to this system. When access to a desired track is instructed, the control means 22B first selects the constant speed feed under the open loop control by switching the switch 32 to the terminal b or c so as to move the head 12B at high speed in the selected direction (step (1)). In the case of forward feed access, the head 12B reaches the range relatively close to a desired track before attaining a set speed. When the control means detects the head 12B has passed close to the central position of the desired recording track upon receipt of the pulse ST in a predetermined place, it switches the switch 32 to the terminal a and causes the servo feed under closed loop control to start (steps (2) and (3)). However, the control means 22B monitors the pulse signal $E_e$ and, if its level changes from "0" to "1" or from "1" to "0", it judges that the head 12B has gone out of the range close to the track onto the next adjacent range therefore switches the closed loop control to the open loop one (steps (4) and (5)). The control means 22B judges that the head 12B has returned to the range close to the desired track if the level of the pulse signal $E_e$ is reversed and again switches to the closed loop control (steps (6) and (3)). The head 12B is thus controlled by the closed loop in the range close to the desired track and is thus moved to the desired position (steps (4) and (7)).

The above first and second head transfer switching systems are, needless to say, applicable to the electronic still camera recorder.

(E) In-Line Double Gap Head Type Still Camera

An in-line double gap head (also called dual head) type still camera is equipped with heads in which two gaps are arranged at predetermined intervals in the predetermined direction, i.e., two heads electrically and magnetically independent of each other are arranged in an in-line form. The use of such heads makes it possible to simultaneously gain access to two adjacent tracks and obtain the so-called 1 frame/2 track recording or frame recording wherein access is simultaneously accomplished to two adjacent tracks. Such heads further can write odd and even numbered fields on the adjacent tracks. It is also possible to provide the so-called field recording wherein either an odd or an even number of fields can be written using one of the heads (one gap).

Figure 33:
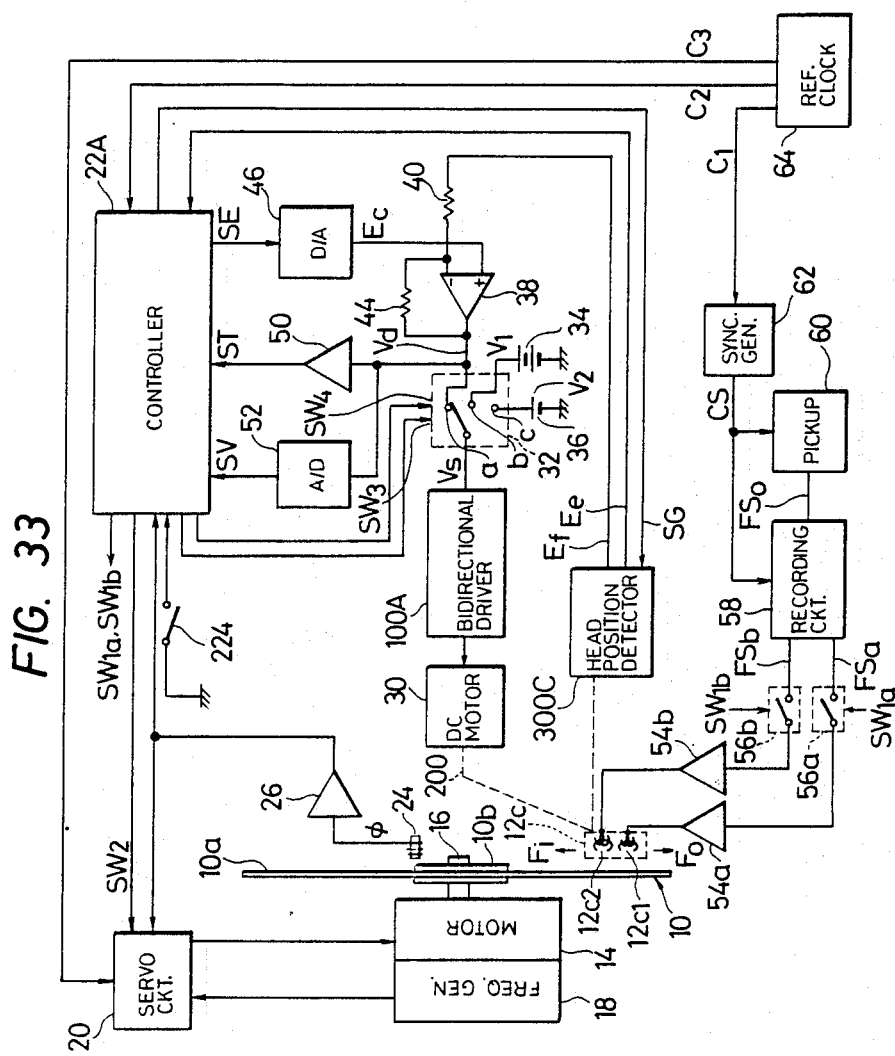
FIG. 33 is a block diagram showing the overall construction of an in-line double gap head type electronic still camera embodying the present invention.

As shown in FIG. 33, another electronic still camera embodying the present invention is equipped with an in-line double gap head 12C arranged opposite to the recording surface 10a of the magnetic disk 10.

Video signals $FS_a$ and $FS_b$ of odd and even numbered fields are respectively supplied by the recording circuit 58 to the head 12C through amplifiers 54a and 54b and switches 56a and 56b in the case of frame recording. On the other hand, in the case of the field recording, e.g., odd number field recording, only the odd numbered field is supplied by the recording circuit 58 which receives this odd numbered field through the amplifier 54a and the switch 56a.

Figure 34:
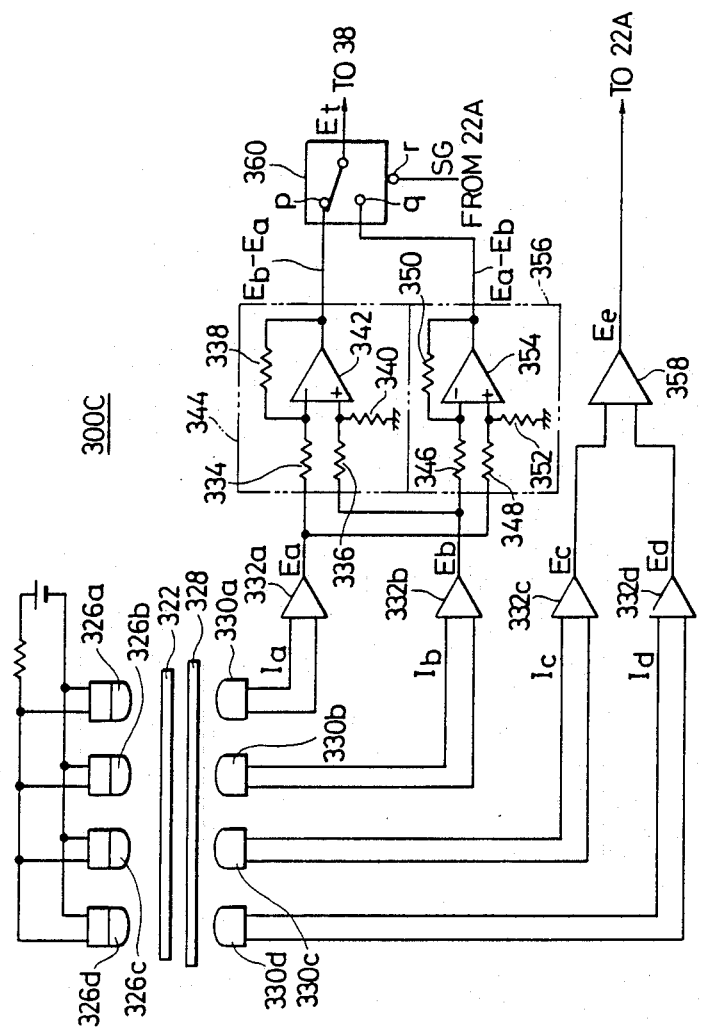
FIG. 34 is a diagram showing the construction of a head position detector contained in an electronic still camera of FIG. 32.

As shown in FIG. 34, a head position detector 300C for use in the present electronic still camera is almost the same in construction as the head position detector 300B of FIG. 19. However, a select signal SG is supplied by the control means 22A to the changeover control terminal r of the analog switch 360. This contrasts with the signal $E_e$ being used for this purpose in FIG. 19. In the reverse direction, the signal $E_e$ obtained at the output terminal of the comparator 358 is supplied to the control means 22A.

The analog switch is arranged so that it is switched to the terminal p when the select signal SG is "1" and to the terminal q when the signal SG is "0". When the select signal SG is kept at "1", the first head position signal $E_b-E_a$ is selected and produced, whereas when the select signal SG is kept at "0", the second head voltage signal $E_a-E_b$ is selected and produced. When the signal SG repeats the "1" and "0" states with the same timing as the square wave signal $E_e$, both the head position signals $E_b-E_a$ and $E_a-E_b$ are alternately switched with a phase selected for setting them at a maximum or minimum level. At that time, head position signals [$E_b-E_a$, $E_a-E_b$] having the same waveform as that of signal $E_f$ of FIG. 27 are obtained at the output terminal of the switch 360. In other words, the levels of the head position signals [$E_b-E_a$, $E_a-E_b$] continuously change with a period of the track pitch $P_t$ when the head 12C moves in the inward and outward directions and the outer gap $12c_1$ and inner gap $12c_2$ of the head 12C respectively conforms to the reference (central) level in the central portion [$TR_1$], [$TR_2$] ... of the track position.

Referring to FIGS. 35 and 36, the head positioning operation in this electronic still camera will be described.

When frame recording is carried out after gaining access to the first and second tracks, the select signal SG of "0" is given by the control means 22A and the second head position signal $E_a-E_b$ is supplied to the inverted input terminal of the operational amplifier 38 as the output head position signal $E_f$.

On the other hand, the digital positioning control signal SE corresponding to $V_{BS}/(1+A_1)$ is supplied by the control means 22A to the D/A converter 46 and the analog voltage signal $E_c$ obtained at the output terminal is supplied to the non-inverted input terminal of the operational amplifier 38, the analog voltage signal $E_c$ being equal to $V_{BS}$.

Accordingly, the output voltage $V_d$ of the operational amplifier 38 is expressed by $$V_d = V_{BS} - A_1 \cdot E_f = V_{BS} - A_1 \cdot (E_a - E_b)$$

and its level changes as shown in FIG. 35. In other words, the level of the voltage $V_d$ when the head 12C moves in the inward direction $F_i$ changes like a sine wave with a period twice as large as the track pitch $P_t$ and, when the outer gap $12c_1$ of the head 12C is within the range of one track pitch $P_t$ centered around the central portion (100% on-track position) $[TR_{2n-1}]$ of an odd numbered track $TR_{2n-1}$, i.e., within the adjacent range $DR_{2n-1}$, the voltage $V_d$ continuously changes and $V_d = V_{BS}$ at the central portion $[TR_{2n-1}]$ of the track position.

While the head 12C is moving inwardly from the home position HP, the timing pulse ST is supplied the Schmitt trigger circuit 50 to the control means 22A each time the voltage $V_d$ becomes equal to $V_{BS}$. The control means 22A counts the number of the pulses ST and, when a pulse ST in the predetermined place is given, i.e., the pulse ST indicating the time at which the outer gap $12c_1$ of the head 12C has passed through the central portion $[TR_1]$ of the first track position, it switches the changeover control signals $SW_3$ and $SW_4$ to (0, 0). The switch 32 is thus connected to the terminal a and the output voltage (servo feed control voltage) $V_d$ of the operational amplifier 38 is selected as the speed control voltage $V_s$ supplied to the driving circuit 100.

When the speed control voltage $V_s$ is switched to the servo control voltage $V_d$, the outer gap $12c_1$ of the head 12C reaches the position $X_1$ slightly beyond the central portion $[TR_1]$ of the first track position and $V_d$ is less than $V_{BS}$, as shown in FIG. 35. The d.c. motor 30 thus rotates in reverse (counterclockwise) and the head 12C is moved in the outward direction $F_o$.

When the outer gap $12c_1$ of the head 12C passes outwardly through the central portion $[TR_1]$ of the first track, thereafter $V_d$ is less than $V_{BS}$ and the d.c. motor 30 is switched so as to rotate forward (clockwise) and then the head 12C is again moved in the inward direction $F_i$. When the outer gap $12c_1$ of the head 12C passes inwardly through the central portion $[TR_1]$ of the first track, again $V_d$ becomes less than $V_{BS}$ and the d.c. motor 30 rotates in reverse and the head 12C is again switched so as to move in the outward direction $F_o$. The movement of the head 12C thus slightly oscillates but converges to a position opposite to the central portion $[TR_1]$ of the first track position and then stop there. In that standstill state, $V_d = V_{BS}$. The inner gap $12c_2$ of the head 12C is positioned opposite to the central portion $[TR_2]$ of the second track position.

The head 12C is positioned in the central portion $[TR_1]$ of the first track position rotating at 3,600 rpm and, when the shutter of the electronic still camera is triggered, the control means 22A responds thereto and sends control signals $SW_{1a}$, $SW_{1b}$ to the switches 56a and 56b at a suitable timing to close them for a one field period in accordance with the PG pulse $\phi$ from the phase generator 24. Thereby video signals $FS_a$ and $FS_b$ of odd and even numbered fields equivalent to the one photograph from the recording circuit 58 are supplied to the head 12C through the amplifiers 54a and 54b. The head 12C writes the odd numbered field signal $FS_a$ from the outer gap $12c_1$ to a circumference in the first track position $TR_1$ and the even numbered field signal $FS_b$ from the inner gap $12c_2$ to a circumference in the second track position $TR_2$. As a consequence, the first and second recording tracks $tr_1$ and $tr_2$ are formed on the first an second track positions $TR_1$ and $TR_2$. In addition, a code for distinguishing the odd and even numbered field signals $FS_a$ and $FS_b$ and another for indicating the frame records are recorded on the first and second recording tracks $tr_1$ and $tr_2$ in a multiple mode according to the DPSK (Differential Phase Shift Keying) method. Those codes are used to give information on the fact that frame recording has been conducted on the first and second tracks.

After the first photograph is recorded, access is gained to the third and fourth track position $TR_3$ and $TR_4$ at which frame recording is again to be conducted. For that purpose, the changeover control signals $S_3$ and $S_4$ from the control means 22A are switched to (0, 1) and the forward constant speed feed control voltage $V_1$ from the constant voltage source 34 is supplied to the driving circuit 100 as the speed control voltage $V_s$.

The d.c. motor 30 starts to rotate forward and the head 12C moves in the inward direction of $F_i$. When the outer gap $12c_1$ of the head 12C passes through the central portion $[Tr_3]$ of the third track position, the pulse ST indicating the timing is generated by the Schmitt trigger circuit 50 and the control means 22A switches the changeover control signals $SW_3$ and $SW_4$ to (0, 0) in response thereto. The changeover switch 32 is thus connected to the terminal a and the servo feed control voltage $V_d$ is supplied to the driving circuit 100, so that the servo feed control is performed to locate the outer gap $12c_1$ and inner gap $12c_2$ respectively in a position where $V_d = V_{BS}$ in the same manner as described above, i.e., in the central portions $[TR_3]$ and $[TR_4]$ of the third and fourth track positions.

When access to the fifth track is subsequently attempted for field recording, the control means 22A switches the changeover control signals $S_3$ and $S_4$ to (0, 1) and moves the head 12C according to the forward constant speed feed in the inward direction $F_i$. Simultaneously, it controls the select signal SG while monitoring the pulse signal $E_e$ in such a manner as to repeat the "1" and "0" states at the same timing as that for monitoring. The signal $[E_b-E_a, E_a-E_b]$, whose level thereby changes as shown in FIG. 27, is supplied to the inverted input terminal of the operational amplifier 38 as the output head position signal $E_f$. On the other hand, the signal $E_c$ equivalent to $V_{BS}/(1+A_1)$ is also supplied by the control means 22A to the non-inverted terminal of the operational amplifier 38 through the D/A converter 46.

Accordingly, the output voltage $V_d$ of the operational amplifier 38 is expressed by $$V_d = V_{BS} - A_1 \cdot E_f$$

and the level changes as shown in FIG. 36. In other words, the level of the voltage $V_d$ continuously changes with a period of the track pitch $P_t$ when the head 12C moves in the inward direction $F_i$ and $V_d = V_{BS}$ when the outer and inner gaps $12c_1$ and $12c_2$ of the head 12C are located opposite to the central portion of the adjacent track.

When the outer gap $12c_1$ of the head 12C passes through the central portion [$TR_5$] of the fifth track during the forward constant speed feed, the control means 22A switches the changeover control signals $SW_3$ and $SW_4$ to (0, 0) in response to the timing pulse ST from the Schmitt trigger circuit 50. The changeover switch 32 is consequently connected to the terminal a and the servo feed control voltage $V_d$ is supplied to the driving circuit 100. As a result, the servo feed is conducted so as to locate the outer gap $12c_1$ in a position where $V_d = V_{BS}$, i.e., at the central portion [$TR_5$] of the fifth track position. Then the switch 56a is closed by the control signal $SW_1$ for one field period with suitable timing. The video signal $FS_a$ of an odd numbered field is supplied by the recording circuit 58 to the head 12C through the amplifier 54a and the head 12C writes the odd numbered field signal $FS_a$ from the outer gap $12c_1$ to a circumference in the fifth track position $TR_5$. At that time, the code providing information of the field recording is recorded on the fifth track on a multiple basis according to the DPSK method. When the outer gap $12c_1$ is located in the central portion [$TR_5$] of the fifth track position, the inner gap $12c_2$ is located in the central portion [$TR_6$] of the adjacent sixth track position. However, the even numbered field signal $FS_b$ is not given according to the odd numbered field recording in the above manner and therefore the inner gap $12c_2$ is not used.

When access to the sixth and seventh tracks is attempted for frame recording, the control means 22A switches the changeover control signals $S_3$ and $S_4$ to (0, 1) and moves the head 12C by means of the forward constant speed feed in the inward direction $F_i$ and then sets the select signal SG to the level of "1". The first head position signal $E_b-E_a$ is thus supplied to the inverted input terminal of the operational amplifier 38 as the output head position signal $E_f$. On the other hand, the signal $E_c$ equivalent to $V_{BS}/(1+A_1)$ is supplied by the control means 22A to the non-inverted input terminal of the operational amplifier 38 through the D/A converter 46. In that case, the level of the output voltage $V_d$ of the operational amplifier 38 varies sinusoidally with a period twice as large as the track pitch $P_t$. However, since the first head position signal $E_b-E_a$ is 180° out of phase with the second head position signal $E_a-E_b$, the level of the voltage $V_d$ is continuously reduced when the outer gap $12c_1$ of the head 12C is positioned within the range $DR_{2n}$ equal to a track pitch width centered around the central portion [$TR_{2n}$] of the track position $TR_{2n}$ in an even numbered place and $V_d = V_{BS}$ in the central portion [$TR_{2n}$] of the track position. That is, the dynamic range wherein the servo feed control is performed works only when the outer gap $12c_1$ of the head 12C is within the range $DR_{2n}$. Therefore, when the outer gap $12c_1$ of the head 12C passes through the central portion [$TR_6$] of the sixth track, the control means 22A responds to the timing pulse ST from the Schmitt trigger circuit 50, switches the changeover control signals $SW_3$ and $SW_4$ to (0, 0) and causes the servo feed control to start. Consequently, the head 12C is so positioned that the outer gap $12c_1$ is located opposite to the central portion [$TR_6$] of the sixth track position, whereas the inner gap $12c_2$ is located opposite to the central portion [$TR_7$] of the seventh track position.

In the present electronic still camera, the select signal SG from the control means 22A is employed so that the switch 360 can select either the first head position signal $E_b-E_a$ or second one $E_a-E_b$, or otherwise alternately switch one to the other with a predetermined phase timing. As a result, the dynamic range of the servo feed is so selected as to be located within the range $DR_{2n-1}$ close to the odd numbered track, the range $DR_{2n}$ close to the even numbered track or the range close to every track. Therefore, not only access to any pair of tracks ($TR_{2n-1}$, $TR_{2n}$), ($TR_{2n}$, $TR_{2n+1}$) for frame recording but also access to any track $TR_n$ for field recording becomes possible.

The present invention is also applicable to an in-line double gap head type playback. In the case of the playback, however, the servo feed control is conducted in such a manner that both gaps of the playback head are respectively located opposite to the central positions of adjacent recording tracks. Consequently, the head positioning or tracking control signal SE given by the control means to the operational amplifier 38 contains a corrected value corresponding to the deviation of the central position of the recording track from the central position of the track. The data code recorded on a multiple basis according to the DPSK method is read out and used to select (distinguish) either the frame or field playback.

(F) Bidirectional DC Motor Driving Circuit with Speed Servo

Figure 37:
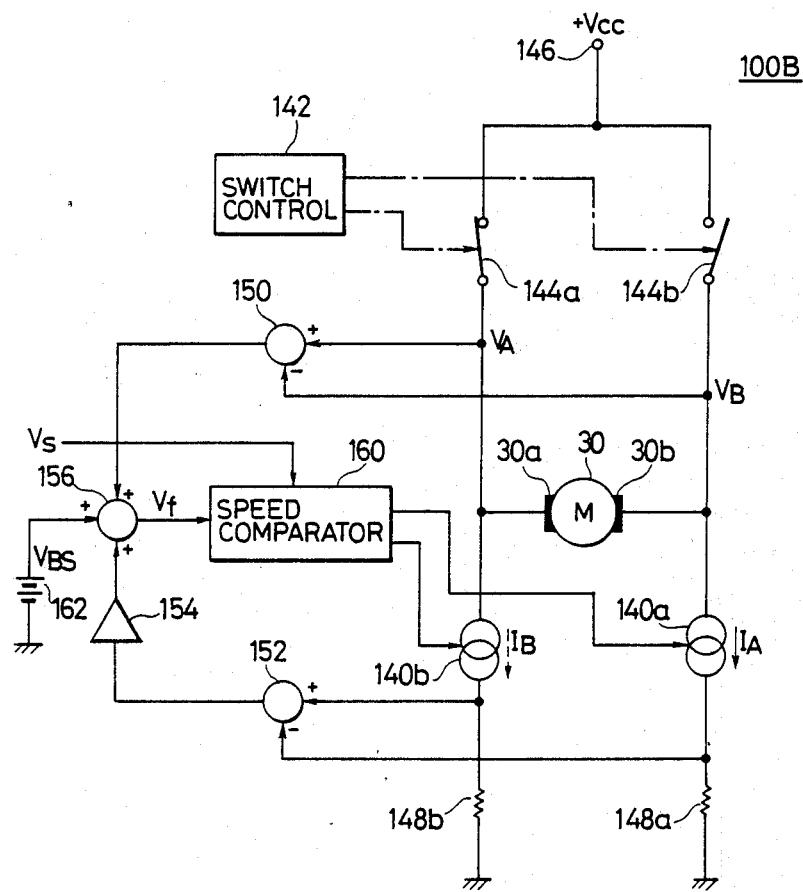
FIG. 37 is a circuit diagram showing the basic arrangement of another bidirectional d.c. motor driving circuit embodying the present invention, the driving circuit being equipped with a speed servo.

As shown in FIG. 37, another bidirectional d.c. motor driving circuit 100B having a speed servo according to the present invention is equipped with first and second variable d.c. current sources 140a and 140b.

Assuming the first variable d.c. current source 140a is in operation and the second variable d.c. current source 140b is not, a first analog switch 144a is turned on because of the action of a switching control means 142, whereas a second analog switch 144b is off. Consequently, a d.c. current $I_A$ flows from a source voltage terminal 146 to ground through the first analog switch 144a, the d.c. motor 30, the first variable d.c., current source 140a and a first resistor 148a. The d.c. motor 30 is thus excited by the d.c. current $I_A$ flowing from a left-side terminal 30a to a right-side terminal 30b and it rotates clockwise. At that time, the source voltage $+V_{cc}$ supplied by the source voltage terminal 146 is almost wholly applied to the d.c. motor 30. The (clockwise) speed of the d.c. motor is controlled by the driving current $I_A$ of the variable d.c. current source 140a and increases as the driving current $I_A$ increases.

When the second variable current source 140b is in operation and the first variable current source 140a is not. Moreover, the second analog switch 144b is turned on at this time through the action of the switching control means 142 and the first analog switch 144a is turned off, whereby the d.c. current $I_B$ flows from the source voltage terminal 146 to the ground through the second analog switch 144b, the d.c. motor 30, the second variable current source 140b and a second resistor 148b. The d.c. motor 30 is thus excited by the d.c. current $I_B$ in the opposite direction from the right-side terminal 30b to the left-side terminal 30a and rotates counterclockwise.

The source voltage $+V_{cc}$ supplied by the source voltage terminal 146 is almost wholly applied to the d.c. motor 30. The (counterclockwise) speed of the d.c. motor is controlled by the driving current $I_B$ of the d.c. current source 140b and increases as the driving current $I_B$ increases.

In the driving circuit 100B, the source voltage $V_{cc}$ is effectively utilized by the current driving method. The selection of the first or second d.c. current source 140a or 140b may be made by the switching means 142 depending on the desired rotational direction.

An electronic governor type speed detecting means which need no regulation in particular is formed in the driving circuit 100B.

The voltage equation of the armature circuit of a d.c. motor is generally expressed by $$V_M = R_a \cdot I_a + K \cdot N \qquad (1)$$

where $V_M$ is the voltage across the terminals of d.c. motor, $R_a$ is the resistance of armature, $I_a$ is armature current, K is the reverse electromotive force constant, and N is the motor speed.

The above equation is expressed in terms of the reverse electromotive force K.N as follows:

$$K \cdot N = V_M - R_a \cdot I_a \qquad (2)$$

In FIG. 37, the voltages $V_A$ and $V_B$ at both terminals 30a and 30b of the d.c. motor 30 are respectively given to a subtractor 150 and the voltage difference $V_A - V_B$ obtained at the output terminals of the subtractor 150 is supplied to an adder 156. On the other hand, the voltages generated in the first and second resistors 148a and 148b are given to a substractor 152 and a voltage $-R_A \cdot I_A$ or $R_B \cdot I_B$ is obtained at the output terminal of the subtractor 152. In other words, the voltage $-R_A \cdot I_A$ is obtained while the d.c. motor 30 rotates clockwise and the voltage $R_B \cdot I_B$ is obtained while it rotates counterclockwise. These voltages $-R_A \cdot I_A$ and $R_B \cdot I_B$ are given to the adder 156 through an amplifer 154 with a gain of C.

Accordingly, the output voltage $V_f$ of the adder 156 becomes $$V_f = [(V_A - V_B) - C \cdot R_A \cdot I_A] + V_{BS} \qquad (3)$$

while the d.c. motor rotates clockwise and $$V_f = [(V_A - V_B(-C \cdot R_B \cdot I_B] + V_{BS} \qquad (4)$$

while the d.c. motor rotates counterclockwise.

With respect to the first terms on the right sides of the above equations (3) and (4), they are equivalent to the right side of the equation (2) if $C \cdot R_A = C \cdot R_B = R_a$ (armature resistance) because $V_A - V_B$ and $V_B - V_A$ represent the voltage $V_M$ across the motor terminals. Accordingly, the above equations (3) and (4) are expressed as follows:

$$V_f = K \cdot N + V_{BS} \qquad (3)'$$

$$V_f = -K \cdot N + V_{BS} \qquad (4)'$$

In other words, the output voltage $V_f$ of the adder 156 represents a rotational angle by means of the polarity of displacement from the offset voltage $V_{BS}$ and also represents the speed (the number of revolutions) by the size of the displacement.

The resistances $R_A$ and $R_B$ of the first and second resistors 148a and 148b are preferably selected so as to be smaller than the resistance $R_a$ of the armature in order to decrease the voltage drop, e.g., $R_a/10$. In that case, the gain of the amplifier 154 is selected as 10.

The speed detection voltage $V_f$ expressing the speed of the d.c. motor 30 is given to a speed servo comparator means 160 as a feedback signal. The speed servo comparator means 160 may be constructed in an ordinary manner and is used to generate an error control voltage $V_s'$ by comparing the speed control voltage $V_s$ for setting the motor speed with the speed detecting voltage $V_f$ and then controlling the driving current $I_A$ or $I_B$ so as to make the motor speed stable at the set value by sending the error control voltage $V_s'$ to the d.c. current source 140a or 104b currently in operation.

In the driving circuit 100B, as set forth above, a simple inexpensive speed detecting means becomes available only by setting resistances for the first and second resistors 148a and 148b and setting the gain coefficient for the adjustable circuit.

Bidirectional Driving System

Figure 38:
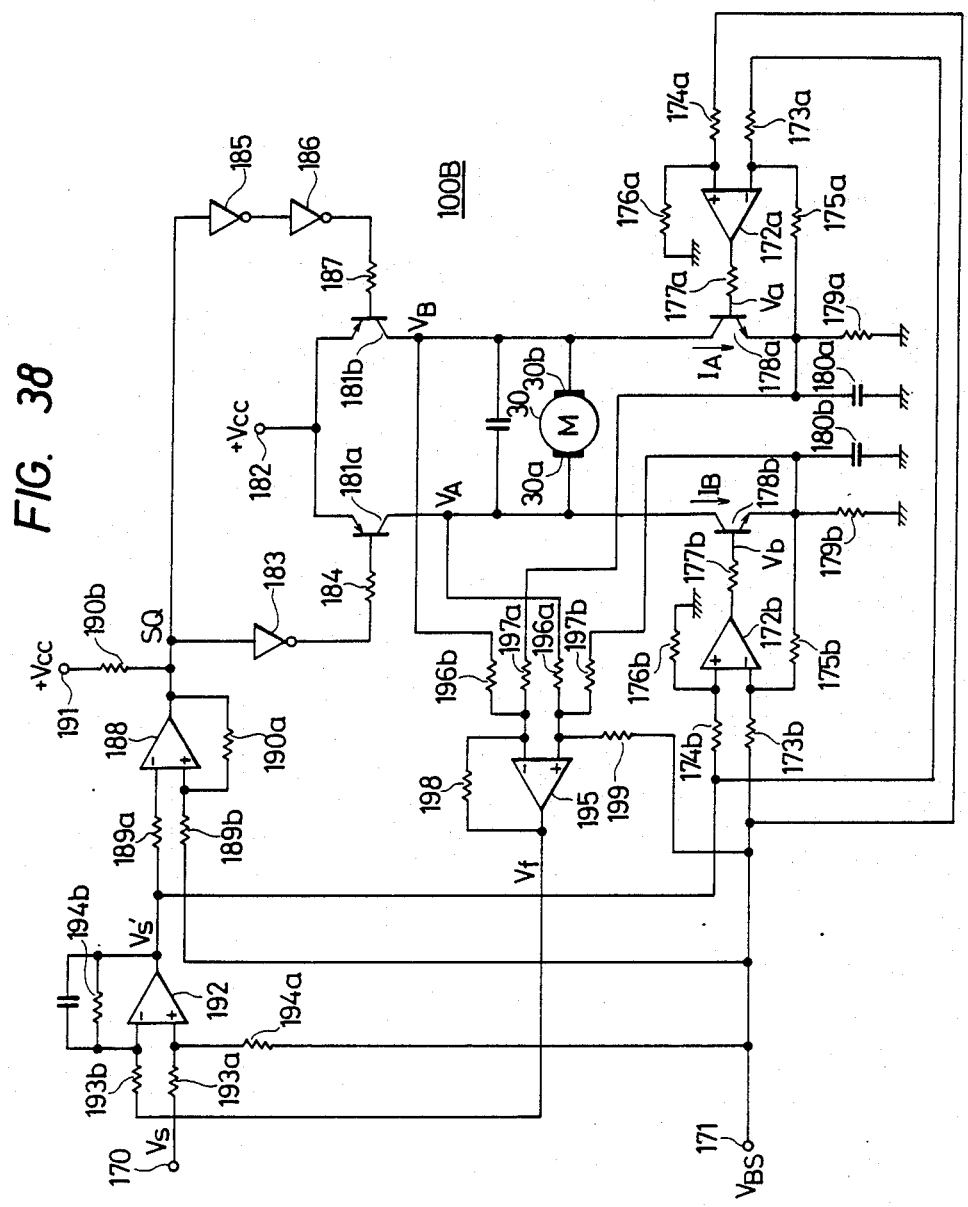
FIG. 38 is a circuit diagram showing an concrete example of the bidirectional d.c. motor driving circuit of FIG. 37, the driving circuit being equipped with a speed servo.

Referring to FIG. 38, there is shown a concrete example of the bidirectional d.c. motor driving circuit 100B.

In FIG. 38, the speed control voltage $V_s$ for setting or instructing the speed of the d.c. motor 30 is supplied to an input terminal 170. The speed control voltage $V_s$ is supplied through a resistor 193a to the non-inverted terminal of an operational amplifier 192 constituting the servo comparison control means.

The output terminal of the operation amplifier 192 is connected to the inverted input terminal of an operational amplifier 172a though a resistor 173a and also to the non-inverted input terminal of an operational amplifier 172b through a resistor 173b. The preset motor stop voltage $V_{BS}$ is supplied by the input terminal 171 through a resistor 174a to the non-inverted input terminal of the operational amplifier 172a and the motor stop voltage $V_{BS}$ is supplied to the inverted input terminal of the operational amplifier 172b through the resistor 173b.

In the operation amplifier 172a, the output terminal is connected through a resistor 177a to the base of an npn transistor 178a for current driving. Its inverted input terminal is connected through a feedback resistor 175 to the emitter of the transistor 178a, whereas its non-inverted input terminal is connected to ground though a feedback resistor 176a. Therefore, the operational amplifier 172a constitutes a differential amplifier and its output voltage $V_a$ is expressed by $$V_a = A_o(V_{BS} - V_s')$$

where $A_o$ is a positive value representing an amplification factor of the differential amplifier and $V_s'$ is the error control voltage obtained at the output terminal of the operational amplifier 192 and 82 equal to the speed control voltage $V_s$ in the normal state.

The transistor 178a at the output of the operational amplifier 172a constitutes a voltage-current converter and its collector current $I_A$ is expressed as $$I_A = k \cdot A_o(V_{BS} - V_s')$$

where k is a positive proportionality coefficient.

The current $I_A$ flows only when $V_s'$ is less than $V_{BS}$. If $V_a$ is less than 0 because $V_s'$ is greater than $V_{BS}$, then no current $I_A$ flows because the transistor 178a is kept in a cutoff state.

On the other hand, the output terminal of the operational amplifier 172b is connected through the resistor 177b to base of the npn transistor 178b and its inverted input terminal thereof is connected to the emitter of the transistor 178b through the feedback resistor 175b, whereas the non-inverted input terminal is grounded through the feedback resistor 176b so as to also constitute a differential amplifier. The operational amplifier 172b has the same construction as that of the operational amplifier 172a and the resistances of the resistors 173b–176b are selected as being the same as those of the resistors 173a–176a. Accordingly, the output voltage $V_b$ of the operational amplifier 172b is expressed by $$V_b = A_o(V_s' - V_{BS})$$

The transistor 178b also constitutes the voltage-current converter and its collector current $I_B$ is expressed by $$I_B = k \cdot A_o(V_s' - V_{BS})$$

However, the current $I_B$ flows only when $V_s'$ is greater than $V_{BS}$. If $V_s'$ is less than $V_{BS}$, then $V_b$ is less than 0, thus keeping the transistor 178b in a cutoff state and preventing the current $I_B$ from flowing therethrough.

Figure 39:
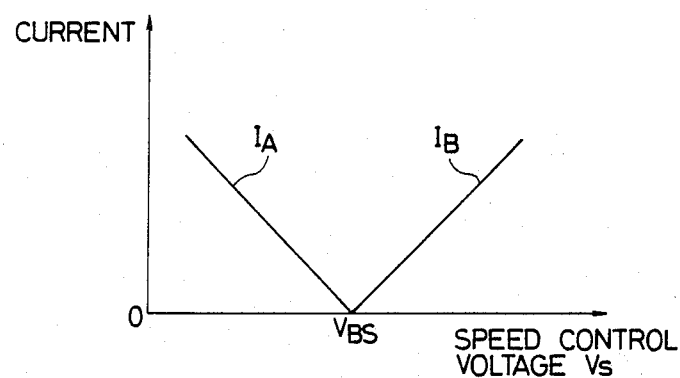
FIG. 39 is a graph showing the characteristics of the driving current relative to the speed control voltage in the motor driving circuit of FIG. 37.

As shown in FIG. 39, the characteristics of the currents $I_A$ and $I_B$ relative to the positively polarized speed control voltage $V_s$ become symmetrical about the motor stop voltage $V_{BS}$.

Returning to FIG. 38, the emitter of the transistor 178a is grounded in a speed servo configuration through a current detecting resistor 179a having a small resistance $R_A$ and a parallel noise removing capacitor 180a and its collector is connected to the right-side terminal 30b of the d.c. motor 30. Likewise, the emitter of the transistor 178b is grounded in a speed servo configuration through a current detecting resistor 179b having a small resistance $R_B$ and a parallel noise removing capacitor 180b and its collector is connected to the left-side terminal 30a of the d.c. motor 30.

In the above construction, the operational amplifier 172a, the resistors 173a–177a and the transistor 177a constitute the first variable d.c. current source, whereas the operational amplifier 172b, the resistors 173b–177b and the transistor 178b constitute the second variable d.c. current source.

Both terminals 30a and 30b of the d.c. motor 30 are respectively connected to the collectors of the pnp switching transistors 181a and 181b constituting the first and second analog switches. Both emitters of the switching transistors 181a and 181b are connected to one ($+V_{cc}$) of the source voltage terminals 182, the other source voltage terminal being at ground.

The output terminal of the operational amplifier 188 is connected to the base of the switching transistor 181a through an inverter buffer 183 and a resistor 184 and to the base of the switching transistor 181b through inverter buffers 185 and 186 and a resistor 187.

The error control voltage $V_s'$ from the operational amplifier 192 is supplied to the inverted input terminal of the operational amplifier 188 through the resistor 189a, whereas the motor stop voltage $V_{BS}$ from the input terminal 171 is supplied to the non-inverted input terminal through the resistor 189b. A feedback resistor 190a is connected across the output terminal and non-inverted input terminal of the operational amplifier 188 and the source voltage terminal 191 is connected to the output terminal through a pull-up resistor 190b. Consequently, the operational amplifier 188 constitutes a comparator for comparing both input voltages $V_s'$ and $V_{BS}$ and generating a binary signal SQ having either a "1" ($+V_{cc}$) or "0" (OV) voltage state on the basis of the resulting of comparison. In other words, it generates a "1" level voltage signal SQ when $V_s'$ is less than $V_{BS}$ and a "0" level voltage signal SQ when $V_s'$ is greater than $V_{BS}$.

The above construction applies to a bidirectional driving system has excluded description of a speed servo. The operation of the driving system will now be described. As set forth above, the speed control voltage $V_s$ and the error control voltage $V_s'$ are roughly equal in the normal condition and therefore the direct supply of the speed control voltage $V_s$ to the operational amplifiers 172a, 172b and 188 is considered allowable practice. The description of an operational amplifier 192 in the speed servo system will be omitted at this point for convenience of ready reference but will be discussed later.

Figure 40:
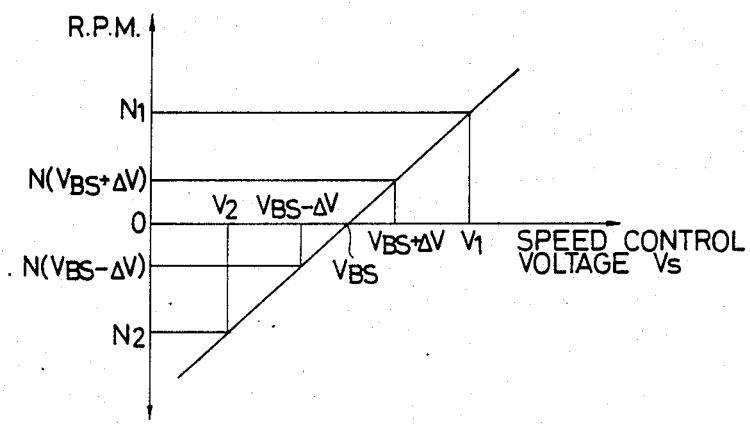
FIG. 40 is a graph showing the characteristics of the d.c. motor driven by the driving circuit of FIG. 37.

When the positively polarized speed control voltage $V_s$ is lower than the motor stop voltage $V_{BS}$, a positive output voltage is generated by the operational amplifier 172a so as to operate the driving transistor 178a. A negative output voltage $V_b$ is generated by the operational amplifier 172b so that the transistor 178b is placed in a cutoff state. Then the "0" voltage signal SQ is generated by the operational amplifier 188 and thereby the switching transistor 181a is saturated and becomes conductive (ON), whereas the switching transistor 181b is placed in a cutoff state. Accordingly, the d.c. current $I_A$ flows through a path connecting the $+V_{cc}$ source voltage terminal 182 to ground through the switching transistor 181a, the d.c. motor 30, the driving transistor 178a and the resistor 179a. As the driving current $I_A$ flows from the left-side terminal 30a to the right-side terminal 30b, clockwise torque is produced by the d.c. motor 30. The driving current $I_A$ linearly increases as the speed control voltage $V_s$ becomes lower than the motor stop voltage $V_{BS}$ (FIG. 39) and therefore the clockwise speed of the d.c. motor 30 also linearly increases, as shown in FIG. 40.

When the speed control voltage $V_s$ is higher than the motor stop voltage $V_{BS}$, the positive output voltage $V_b$ is generated by the operational amplifier 172b, whereby the transistor 178b is operated. When a negative output voltage $V_a$ is generated by the operational amplifier 172a, the transistor 178a is placed in a cutoff state. Then the "1" voltage signal SQ is produced by the operational amplifier 188 and this turns on the switching transistor 181b and turns off the switching transistor 188a off. Consequently, the d.c. current flows through a path connecting the $+V_{cc}$ source voltage terminal 182 to ground through the switching transistor 181b, the d.c. motor 30, the driving transistor 178b and the resistor 179b, whereby counterclockwise torque is produced by the d.c. motor 30 as the driving current $I_B$ flows from the right-side terminal 30b to the left-side terminal 30a of the motor 30. As shown in FIG. 40, the speed linearly increases as the speed control voltage $V_s$ becomes higher than the motor stop voltage $V_{BS}$.

With respect to the driving of the d.c. motor 30, because the source voltage $+V_{cc}$ is applied to the d.c. motor 30 without a greater voltage drop in any of the switching transistor 181a or 181b, the driving transistor 178a or 179b and the current detecting resistor 179a or 179b, the utility factor is high. Even when the source voltage $+V_{cc}$ is comparatively low, e.g., 5 V, sufficient driving capability is available and quick starting or high-speed rotation also becomes possible.

Speed Servo System

A speed servo system attached to the above bidirectional driving system will now be described.

As shown in FIG. 38, the speed servo system comprises elements 192–199.

An operational amplifier 192 constitutes a speed servo system and it operates so as to compare the speed control voltage $V_s$ with the feedback signal (speed detecting voltage) $V_f$ from an operational amplifier 195, as will be described later. The operational amplifier provides an error signal, amplifies the signal with an amplification factor $A_s$ and produces the error control voltage $V_s'$. The error control voltage $V_s'$ is supplied to the inverted input terminal of the operational amplifier 172a through the resistor 173a as a voltage signal for directly controlling the speed of the d.c. motor 30 and to the non-inverted input terminal of the operational amplifier 172b through the resistor 174b.

On the other hand, voltages $V_A$ and $V_B$ at both terminals 30a and 30b of the d.c. motor 30 are respectively supplied to the non-inverted and inverted input terminals of the operational amplifier 195 through the resistors $196_a$ and 196b. The voltages $R_A.I_A$ and $R_B.I_B$ produced at the resistors 179a and 179b for current detection are supplied to the inverted and non-inverted input terminals of the operational amplifier 195 through rtesistors 197a and 197b. The inverted input terminal thereof is connected to the output terminal of the operational amplifier 195 through a feedback resistor 198, whereas the motor stop voltage $V_{BS}$ is given to the non-inverted input terminal of the operational amplifier through a resistor 199. An adder-subtractor circuit is thus constructed and, as the resistances $R_{196a}$–$R_{197b}$ of the resistors 196a–197b are selected as $R_{196a}=R_{196b}=10.R_{197a}=10.R_{197b}$, the output voltage $V_f$ of the operational amplifier 195 is expressed as $$V_f = k[(V_A - V_B) - 10.(R_A.I_A - R_B.I_B)] + V_{BS} \quad (5)$$

where k is the amplification factor determined by the resistances $R_{196a}$–$R_{197b}$ of the resistors 196a–197b and the resistances $R_{198}$ and $R_{199}$ of the resistors 198 and 199.

The above equation (5) can be expressed differently depending on the rotational direction of the d.c. motor 30.

Since $V_A$ is less than $V_B$ and $R_B.I_B=0$ when the d.c. motor 30 rotates clockwise, then in this condition, $$V_f = k[(V_A - V_B) - 10.R_A.I_A] + V_{BS} \quad (5)\text{-}1$$

On the other hand, since $V_A$ is less than $V_B$ and $R_A.I_A=0$ when the d.c. motor rotates counterclockwise, then in this condition, $$V_f = k[(V_B - V_A) - 10.R_B.I_B] + V_{BS} \quad (5)\text{-}2$$

In the driving circuit, the resistances $R_A$ and $R_B$ of the resistors 179a and 179b are selected to be $R_a/10$ ($R_a$ is the resistance of the armature of the d.c. motor 30). Consequently equations (5)-1 and (5)-2 respectively correspond to the above-described equations (3), (4) and the output voltage $V_f$ of the operational amplifier 195 is thus the speed detecting voltage indicating the speed of the d.c. motor 30.

The speed detecting voltage $V_f$ is supplied to the inverted input terminal of the operational amplifier 192 constituting the comparator as a negative feedback signal.

As the operational amplifier 192 compares both input voltage $V_s$ and $V_f$ and amplifies an error with an amplification factor $A_s$, the error control voltage $V_s'$ obtained at the output terminal is expressed by $$V_s' = A_s.(V_s - V_f)$$

where, $A_s = R_{194a}/R_{193a} = R_{194b}/R_{193b}$.

When the speed control voltage $V_s$ is equal to the motor stop voltage $V_{BS}$, the d.c. motor 30 stops and reaches equilibrium. In that state, $V_A = V_B$ and, since $I_A = I_B$ and both are approximately zero, then $V_f = V_{BS}$ and therefore $V_s'$ approximately equals $V_{BS}$.

When the speed control voltage $V_s'$ in that state changes to $V_{BS} - \Delta V$, the error control voltage $V_s'$ becomes lower than $V_{BS}$ and a positive output voltage $V_a$ is produced by the operational amplifier 172a, whereby the driving transistor 178a operates and causes the driving current $I_A$ to flow. As a result, the d.c. motor 30 starts to rotate clockwise. As the driving current $I_A$ increases, the speed detecting voltage $V_f$ decreases (equation (5)-1) and the error control voltage $V_s'$ converges to $V_{BS} - \Delta V$, whereas the speed of the d.c. motor 30 also converges to $N.(V_{BS} - \Delta V)$ and reaches equibrium. When the speed control voltage $V_s$ changes from $V_{BS}$ to $V_{BS} + \Delta V$, the error control voltage $V_s'$ rises from $V_{BS}$ and causes the operational amplifier 172b to produce the positive output voltage $V_b$. Consequently, the driving transistor 178b operates and causes the driving current $I_B$ to flow and the d.c. motor 30 rotates counterclockwise As the driving current $I_B$ increases, the speed detecting voltage $V_f$ increases (equation (5)-2) and the error control voltage $V_s'$ converges to $V_{BS} + \Delta V$, whereby the speed of the d.c. motor 30 converges to $N.(V_{BS} + \Delta V)$ and reaches equilibrium.

When external disturbances such as load fluctuations occur in that stable stage, the speed of the d.c. motor fluctuates. However, the fluctuation is negatively fed back through the speed detecting voltage $V_f$ and the error control voltage $V_s'$ changes in such a manner so as to compensate for the fluctuation and the speed servo is actuated so that the driving current $I_A$ or $I_B$ may become variable. Consequently, the rotation of the d.c. motor 30 is thereby made stable.

As set forth above, the d.c. motor stops when the single-pole speed control voltage is equal to the motor stop voltage set at the predetermined value $V_{BS}$ with the same polarity in the driving circuit 100B of FIG. 38 as in the case of the driving circuit 100A of FIG. 2. When the speed control voltage $V_s$ becomes lower than the motor stop voltage, the d.c. motor rotates in one direction (clockwise) at a speed roughly proportional to the difference and, when the speed control voltage becomes higher than the motor stop voltage, the d.c. motor rotates in the other direction (counterclockwise) at a speed roughly proportional to the difference. Accordingly the speed of the d.c. motor can be controlled linerly in both directions using single-pole variable voltage (speed control voltage). As the utilization factor of the source voltage is set high, moreover, sufficient driving capability is obtained even if low source voltage is used and therefore quick starting as well as high-speed rotation becomes available. An additional advantage is that, because it is relatively simple, inexpensive speed detecting means can be installed without the necessity of adjustments. Thus, the present invention is applicable to portable equipment.

(G) Head Position Detector

Figure 41:
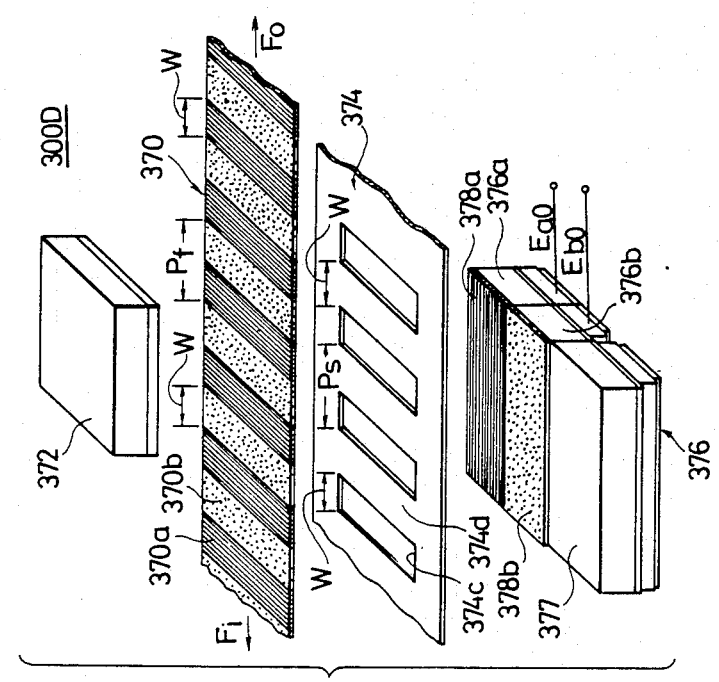
FIG. 41 is a perspective view showing the construction of another head position detector embodying the present invention.

As shown in FIG. 41, another head detector 300D embodying the present invention is equipped with a moving color filter plate 370. Both ends of the color filter plate 370 are fixed to the front end of the head carriage 216 like the moving slit plate 302 of FIG. 5 or the moving slit plate 322 of FIG. 18. As a result, the color filter plate 370 is movable together with the head carriage 216 in the inward and outward directions $F_i$ and $F_o$. A white light source 372 and a fixed slit plate 374 are respectively arranged above and below the color filter plate 370. A color sensor 376 is fixed beneath the fixed slit plate 374.

The color filter plate 370 comprises a color negative or color stripe filter comprising blue filters 370a effectively passing only the blue component of light and red filters 370b effectively passing only the red component. Both the blue and red filters 370a and 370b are alternately arranged and each has the same width W. According to this embodiment, 50 micrometers is selected as the width W so that a filter pitch $P_f$ is 100 micrometers.

The fixed slit plate 374 comprises slits 374c and shades 374d, both having the same width (50 micrometers) as the width W of the red filter 370b. The slits 374c and the shades 374d are alternately arranged in the same direction as are the filters 370a and 370b. As a result, a slit pitch $P_s$ is the same 100 micrometers as the filter pitch $P_f$.

The color sensor 376 comprises a blue filter 378a and a red filter 378b, to provide color selectivity, both being mounted on a photoelectric converter array 377, such as of amorphous silicon. A blue sensor 376a and a red sensor 376b are arranged in parallel with each other and extend in the direction perpendicular to the filters on the color filter plate 370, that is, along the inward and outward (directions $F_i$ and $F_o$).

Figure 42:
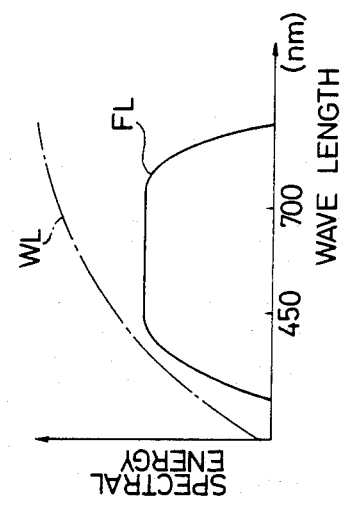
FIG. 42 is a graph showing the relative spectral energy characteristics of white light irradiated by a white light source and white light passed through a color filter.

FIG. 42 shows relative spectral energy characteristics of white light radiated from the white light source and the light passed through the color filter. The white light radiated from the white light source is, as shown by a broken line WL of FIG. 42, characterized in that the longer the wavelength of a light component, the higher its spectral energy becomes. However, the amount of light passed through any color filter shows a roughly uniform energy distribution within the fixed wavelength range of the filter as shown by an actual line FL. That is, line FL does not display the filtering characteristic. According to this embodiment, the light radiated from the white light source 372 has also energy characteristics shown by a broken line WL and the blue component of the light (having wavelengths close to 450 micrometers) and the red component of the light (having wavelength close to 700 micrometers) passed through the color filter plate 370 satisfy the characteristics shown by the actual line FL and have roughly the same energy.

Figure 43:
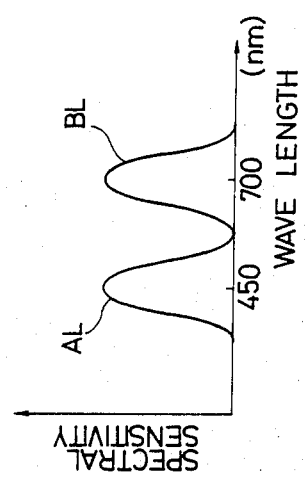
FIG. 43 is a graph showing the relative sensitivity characteristics of the color sensor used for the head position detector of FIG. 41.

FIG. 43 shows the relative sensitivity characteristics of the color sensor 376 as a function of light wavelength. The blue sensor has characteristics shown by a curve AL and provides effective photoelectric conversion for only the blue component of light. On the other hand, the red sensor 376b has characteristics shown by a curve BL and provides effective photoelectric conversion for only the red component of light. As the relative sensitivities of the blue sensor 376a and of the red sensor 376b are roughly equal, output voltages $E_{ao}$ and $E_{bo}$ having roughly equal levels are produced by the sensors, respectively, when the blue and red components of light having the same energy or intensity are incident on the blue sensor 376a and the red sensor 376b.

As shown in FIG. 41 again, white light from the white light source 372 is projected on the surface of the color filter plate 370 and the blue and red components of the light are selectively passed through the blue filter 370a and the red filter 370b. These selected blue and red components come out of the under surface of the color filter plate 370. These blue and red components of light pass through the fixed slits 374c of the fixed slit plate 374 and are incident on the color sensor 376 and subjected to selective photoelectric conversion in the blue sensor 378a and the red sensor 378b, so that the voltage signals $E_{ao}$ and $E_{bo}$ are generated. When the color filter plate 370 moves in the inward or outward direction $F_i$ or $F_o$ together with the recording or playback head 12 (not shown), the quantity of light of the blue and red components passing through the slits 374c of the fixed slit 374 periodically changes, whereby the levels of the voltage signals $E_a$ and $E_b$ also periodically change. As will be described later, the voltage signals $E_{ao}$ and $E_{bo}$ are position signals whose values change with a period of the track pitch $P_t$ depending on the position of the head 12. In FIG. 1 or FIG. 12, for instance, the position signals are supplied to the inverted and non-inverted input terminals of the operational amplifier 38 through the resistors 40 and 42.

Figure 45:
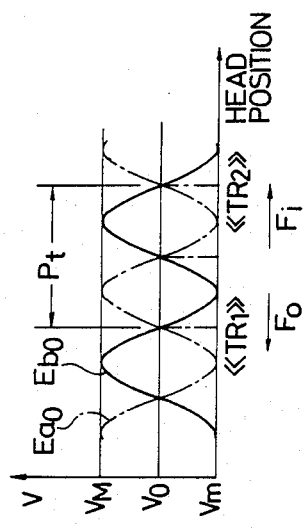
FIG. 45 is a timing chart illustrating the operation of the head position detector of FIG. 41.

Referring to FIGS. 44 and 45, the operation of the head position detector 300D will subsequently be described in detail. FIGS. 44(a)–(e) show the relation of the relative positions of the color filter plate 370 and the fixed slit plate 374 on a fixed time interval basis when the color filter plate 370 is moved at a fixed speed u in the inward direction $F_i$. While the color filter 370 is moving, the blue component of a beam has an intensity roughly proportional to an area $S_{ao}$ where the blue filter 370a and the slit 374c are superimposed Also, the red component of a beam has an intensity roughly proportional to an area $S_{bo}$ common to the red filter 370b and the slit 374c. Both color components are incident on the color sensor 376. The levels of the voltage signals $E_{ao}$ and $E_{bo}$ change in proportion to the intensity of the light.

Figure 44A:
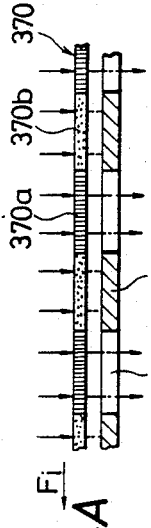
FIGS. 44(a)-(e) are particularly enlarged side views illustrating the detailed operation of the head position detector of FIG. 41.
Figure 44B:
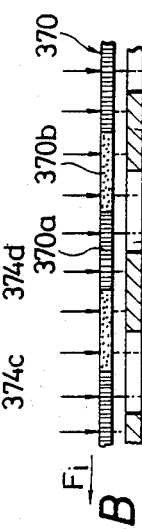
Figure 44C:
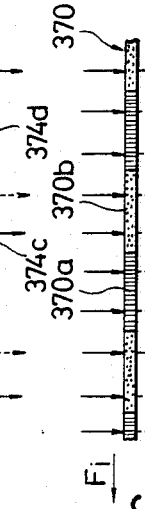

In FIG. 44(a) (at the point of time $t_1$ in FIG. 45), the area $S_{ao}$ when the overlap of the blue filter 370a and the slit 374c is maximum so that the blue component of the light coming out of the blue filter 370a is almost wholly incident on the color sensor 376 with the voltage signal $E_{ao}$ at a maximum level $V_M$. On the other hand, the red component of the light coming out of the red filter 370b is almost wholly screened by the shade 374d ($S_{bo}=0$) with the voltage signal $E_{bo}$ being at a minimum level. As the color filter plate 302 moves in the inward direction $F_i$, the area Sao where the blue filter 370a overlaps the slit 374c is reduced, whereas the area $S_{bo}$ where the red filter 370b overlaps the slit 374c increases. At the point of time $t_2$, T/4 (T being the period) later than the time $t_1$, the blue filter 370a and the red filter 370b each overlap half of the slit 374c, as shown in FIG. 44(b). As a result, both voltage signals $E_{ao}$ and $E_{bo}$ are positioned at the average level $V_o$. At the point of time $t_3$, which is T/4 later than the time $t_2$, the blue filter is almost wholly screened ($S_{ao}=0$) by the shade 374d, as shown in FIG. 44(c), so that the voltage signal $E_{ao}$ is at a minimum level $V_m$, whereas the area where the red filter 370b and the slit 374c are superimposed is maximized with the voltage signal $E_{bo}$ being at the maximum level $V_M$. As the color filter plate 370 then moves in the inward direction $F_i$, the area $S_{ao}$ where the blue filter 370a overlaps the slit 374c increases, whereas the area $S_{bo}$ where the red filter 370b overlaps the slit 374c decreases, and both voltage signals $E_{ao}$ and $E_{bo}$ are placed at the average level $V_o$ at the point of time $t_4$. At the point of time $t_5$ (FIG. 44(e)), the voltage signal $E_{ao}$ is at the maximum level $V_M$, whereas the voltage signal $E_{bo}$ is at the minimum level $V_m$.

When the color filter plate 370 continuously moves in the inward direction of $F_i$, the voltage signals $E_{ao}$ and $E_{bo}$ change sinusoidally with opposite phase, i.e., 180° out of phase, and with a time period ($P_s/u$ or $P_f/u$) determined by the moving speed u and the filter pitch $P_f$ or the slit pitch $P_s$. The same phenomenon is seen when the color filter 370 moves in the outward direction $F_o$.

The values of the voltage signals $E_{ao}$ and $E_{bo}$ relative to the movement of the color filter plate 370 change roughly like a sine wave with a period of the filter pitch $P_f$ or of the slit pitch $P_s$ (both equal to 100 micrometers) in accordance with the relative positions of the blue filter 370a, the red filter 370b and the slit 374c of the fixed slit plate 374. The color filter plate 370 moves together with the head 12 in the same inward or outward direction and the filter pitch $P_f$ and the slit pitch $P_s$ are selected as being the same as the track pitch $P_t$ (100 micrometers). When the head 12 moves in the inward or outward direction, the voltage signals $E_a$ and $E_o$ accordingly vary approximately sinusoidally with a period of the track pitch $P_t$.

Figure 46:
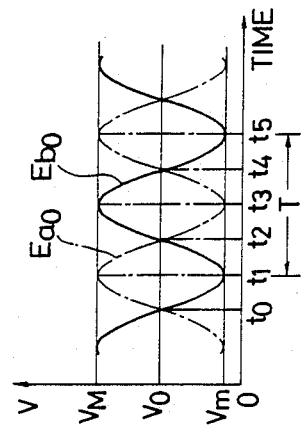
FIG. 46 is a graph showing changes in the levels of the head position signals $Ea_0$ and $Eb_0$ obtained from the head position detector of FIG. 41 when the recording head is moved.
Figure 44D:
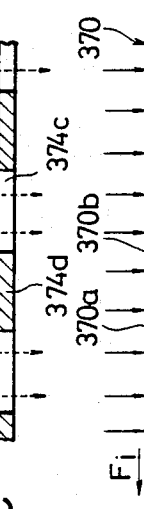
Figure 44E:
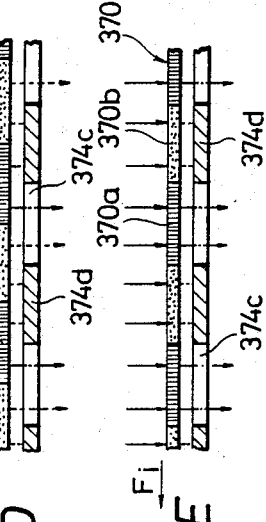

The positional phase between the track positions TR, the fixed slit 374 and the moving filter 370 is fixed as follows. When the head 12 is located opposite to the central portion of each track position TR according to this embodiment, i.e., 100% centered on-track, the blue filter 370a, the red filter 370b l and the slit 374c are set in relative positions, as shown in FIG. 44(d), that is, at the 50% transmittance position Both levels of the voltage signals $E_{ao}$ and $E_{bo}$ become what are shown in FIG. 46 relative to the movement of the head 12 and, when the head 12 is located in the completely on-track position [TR$_1$], [TR$_2$]..., are equal to the average level $V_o$. As set forth above, the head position signals $E_{ao}$ and $E_{bo}$ are supplied to respective input terminals of the operational amplifier 38 through the resistors 40 and 42.

In the head position detector 300D, the head carriage 216 attached to a the color filter plate 370 thus moves together with the head 12 in the inward and outward directions $F_i$ and $F_o$. Consequently, the relative positions of the blue filter 370a and the red filter 370b of the color filter plate 370 and of the slit 374c of the fixed slit plate 374 periodically change. Since the respective intensity and quantity of light with the blue and red components incident on the color sensor 376 periodically change, the head position signals $E_{ao}$ and $E_{bo}$ representing the position of the head 12 are generated by the blue and red sensors 376a, 376b of the color sensor 376. The head position signals $E_{ao}$ and $E_{bo}$ thus derived from the direct detection of the movement of the head 12 or the head carriage 216 are highly accurate As the blue and red components of light are selectively detected by the color sensor 376 through the slit 374c, the great advantage in view of production is that the formation of a row of slits 374c or even of only one slit 374c is sufficient to meet requirements Moreover, the color filter plate 370 is available inexpensively, which is also advantageous. Although the blue and red filters and the corresponding blue and red sensors are used according to this embodiment, usable colors are not limited to them and needless to say other color filters and sensors may be used.

(H) Rotary Head Position Detector

Figure 47:
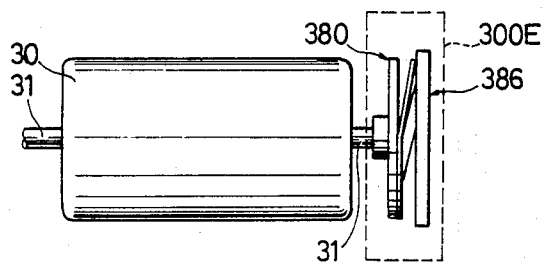
FIG. 47 is a perspective view showing the construction of still another head positioner embodying the present invention.

Still another head position detector 300E embodying the present invention is, as shown in FIG. 47, attached to the d.c. motor 30 for the head. The head position detector comprises a brush unit 380 coupled to the output shaft 31 of the d.c. motor 30 and a fixed resistive base unit 386.

Figures 48A, 48B:
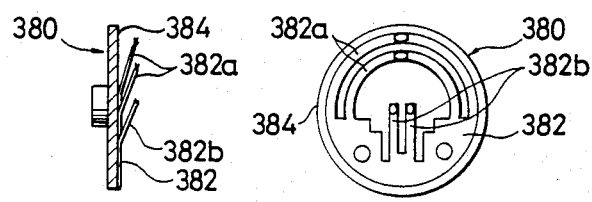
FIGS. 48(a) and 48(b) are diagrams showing the construction of a unit for the head positioner of FIG. 47.

FIGS. 48(a) and 48(b) are detailed illustrations of the brush unit 380. The brush unit 380 comprises a highly conductive brush plate 382 equipped with two slide brushes 382a in the form of a half ring and two central brushes 382b in the form of an antenna. The conductive brush plate 382 is bonded to an insulating brush holder 384. As shown in FIG. 48(a), the front ends of the brushes 382a and 382b forwardly protrude from the brush holder 384 and lightly press against the predetermined portion of the resistive base unit 386.

Figure 49:
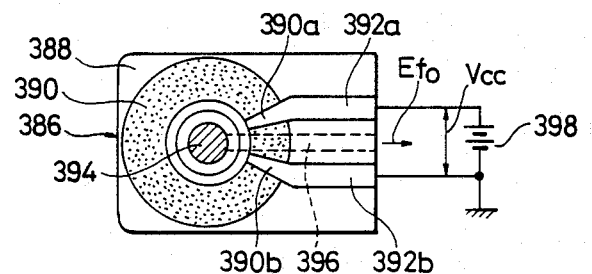
FIG. 49 is a diagram showing the detailed construction of a resistive base unit for the head positioner of FIG. 47.

FIG. 49 shows the detailed construction of the resistive base unit 386. In the resistive base unit 386, a resistive body 390 having an annular smooth surface is provided against the front face of an insulating base 388, i.e., a face opposite to the brush unit 380. The resistive body 390 should preferably be made of durable, abrasion resistant material, e.g., conductive plastics. First and second terminals 392a and 392b are connected to the portions 390a and 390b of the resistive body 390. The portions 390a and 390b are close to each other but different in the circumferential direction. A fixed d.c. voltage $+V_{cc}$ from the constant voltage source 398 is supplied across the terminals 392a and 392b. A circular highly conductive central contact 394 is provided inside the resistive body 390 and the central contact 394 is connected to a lead terminal 396 installed on the rear side of the base 388, so that a head position signal $E_{fo}$ is taken out of the lead terminal 396 as will be described later.

In the brush unit 380 and the resistive base unit 386 thus constructed, the front end of the slide brush 382a and that of the central brush 382b resiliently contact respectively the resistive body 390 and the central contact 394 to a slight degree when the brush unit 380 is combined with the base unit, as shown in FIG. 47. A pair of slide brushes 382a and another pair of central brushes 382b are provided according to this embodiment in order to ensure the contact of the brushes with the resistive body 390 and the central contact 394.

The operation of the head position detector 300E will now be described. When the d.c. motor 30 rotates, the brush unit 380 rotates together with the output shaft 31, whereby the brush 382a slides on the resistive body 390 of the resistive base unit 386. As a result, the source voltage $+V_{cc}$ is divided into the voltage $E_{fo}$ depending on the position of the slide brush 382a. The voltage $E_{fo}$ $l$ is led to the lead terminal 396 through the central brush 382b and the central contact 394.

Figure 50:
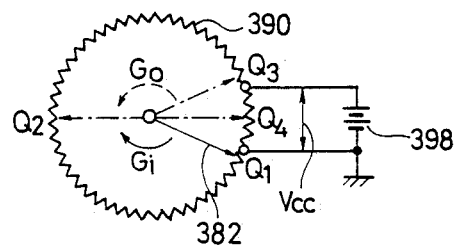
FIG. 50 is an equivalent circuit illustrating the operation of the head,. positioner of FIG. 47.

FIG. 50 is intended to make the above operation understandable with reference to an equivalent circuit. In FIG. 50, the brush 382 rotates counterclockwise in the direction of arrow $G_i$ when the d.c. motor 30 rotates forwardly (clockwise) and rotates clockwise in the direction of arrow $G_o$ when the d.c. motor 30 rotates in reverse (counterclockwise). The end of the brush 382 on the center side corresponds to the slide brush 382a.

Assume that the d.c. motor 30 is forwardly rotated and the brush 382 is rotated counterclockwise in the direction of arrow $G_i$ of FIG. 50 in order to move the head 12 (not shown) in the inward direction $F_i$. When the brush 382 arrives at a position $Q_1$ immediately after it passes through the grounded second terminal 392b, the level of the output voltage $E_{fo}$ is minimized at $V_m$ (zero volts). As the brush 382 then rotates counter clockwise $G_i$, the level of the output voltage $E_{fo}$ rises and, when the brush 382 reaches the left-side mid-point between the terminals 392a and 392b, the level of output voltage $E_{fo}$ shows the intermediate value $V_o$ ($V_{cc}/2$). When the brush 382 is moved to a position $Q_3$ immediately before the powered first terminal 392a, the level of the output voltage $E_{fo}$ is maximized at $V_M$ ($V_{cc}$). When the brush passes through the first terminal 392a, the potential gradient is reversed this time and the level of the output voltage $E_{fo}$ decreases and becomes $V_{cc}/2$ in an intermediate position $Q_4$ and is then minimized at $V_m$ immediately before the second terminal 392b. As the sectional distance is short during the stroke from the first terminal 392a to the second one 392b, the potential gradient becomes very steep and the level of the output voltage $E_{fo}$ thus quickly changes from the maximum value $V_M$ to the minimum value $V_m$.

Figure 51:
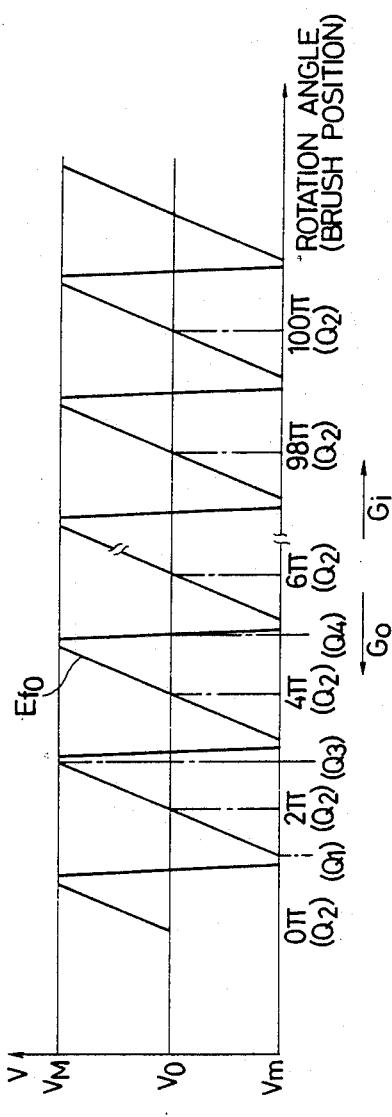
FIG. 51 is a signal waveform chart showing a change in the output voltage $Ef_0$ level relative to the angle of revolution of the brush in the head positioner of FIG. 47.
Figure 52:
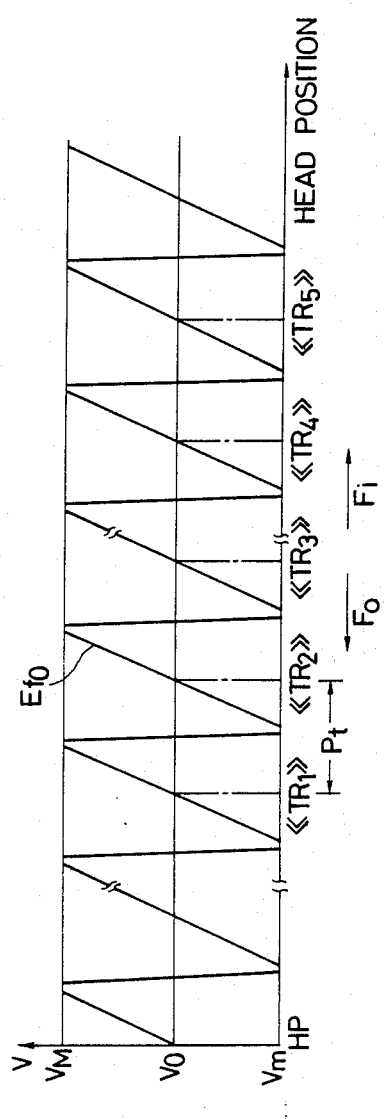
FIG. 52 is a signal waveform chart showing a change in the level of the head positioning signal $Ef_0$ relative to the head position.

As shown in FIG. 51, accordingly, the level of the output voltage $E_{fo}$ changes like a saw tooth relative to the rotational angle or rotational phase of the brush 382 with its period being 2 radian. According to this embodiment, as set forth above, the head 12 is arranged so as to cover a distance of 100 micrometers corresponding to the one turn of the d.c. motor 30, during one revolution of the brush 328. Also, when the head 12 is located opposite to the central portion [TR$_1$], [TR$_2$], ... [TR$_{50}$] of each track position Tr$_1$, TR$_2$, ... TR$_{50}$, the brush 382 is moved to the position Q2 of FIG. 51. With respect to the position of the head 12, the output voltage $E_{fo}$ has a saw-tooth waveform with a period of the distance of the track pitch $P_t$, as shown in FIG. 52. Also, the level of the output voltage $E_{fo}$ becomes equal to the central level $V_o$ when the head is located opposite to the central portion [TR$_1$], [TR$_2$], ... [TR$_{50}$] of each track position TR$_1$, TR$_2$, ... TR$_{50}$. The voltage waveform becomes flat when the output voltage $E_{fo}$ reaches the maximum value $V_M$ and minimum value $V_m$ and this is because the front end of the brush 382 (to be precise, the slide brush 382a) passes over the first and second terminals 392a and 392b. Therefore, the output voltage $E_{fo}$ is a head position signal having a saw-tooth waveform and representing each position of the head 12. The voltage that varies across the track pitch $P_t$, that is, voltage-to-head movement ratio is $V_{cc}/P_t$, so that its positional resolution is quite high.

The potentiometer type head position detector 300E according to this embodiment is thus cost-saving and simple in construction. However, it provides high positional resolution and produces the head position signal $E_{fo}$ appropriate for a tracking servo.

Although the first and second terminals 392a and 392b are arranged close to each other as shown in FIG. 49 to increase the servo feed dynamic range, various modifications are possible, if necessary. For instance, the first terminal may be installed 180° apart from the second one or there may be two pairs of the first and second terminals.

What is claimed:

1. A bidirectional d.c. motor driving circuit with a speed servo, comprising a comparator receiving a single-pole speed control voltage at one input terminal and a feedback signal at another terminal, and producing an error control voltage at an output terminal, the level of said feedback signal fluctuating according to a d.c. motor speed;

a first operational amplifier for receiving said error control voltage at a first input terminal and a motor stop voltage at a second input terminal, the level of said motor stop voltage being set at a predetermined level and having the same polarity as said error control voltage;

a second operational amplifier for receiving said motor stop voltage at a first input terminal corresponding in polarity to the first input terminal of said first operational amplifier and said error control voltage at a second input terminal corresponding in polarity to the second terminal of said first operational amplifier;

a first driving circuit having an input terminal connected to an output terminal of said first operational amplifier and an output terminal connected to one terminal of said d.c. motor;

a second driving circuit having an input terminal connected to an output terminal of said second operational amplifier and an output terminal connected to another terminal of said d.c. motor through a first resistor;

a second resistor and a third resistor being connected in series between the output terminals of said first and second driving circuits, said second and third resistors together with said d.c. motor and said first resistor constituting a bridge circuit; and a differential amplifier for a speed servo, said differential amplifier receiving at one input terminal a voltage produced at a junction between said another terminal of said d.c. motor and said first resistor, receiving at another input terminal a voltage produced at a junction between said second and third resistors, and producing said feedback signal corresponding to the difference between both voltages 2. A bidirectional d.c. motor driving circuit equipped with a speed servo, said bidirectional d c. motor driving circuit comprising:

a first analog switch and a second analog switch, said first switch being connected between a first terminal of a d.c. motor and a first voltage source terminal, said second switch being connected between a second terminal of said d.c. motor and a second voltage source terminal;

a first variable d.c. current source and a second variable d.c. current source which are selectively operated, said first current source being connected between said second terminal of said d.c. motor and said second voltage source terminal, said second current source being connected between said first terminal of said d.c. motor and said second voltage source terminal;

switching control means for turning said first analog switch on and said second analog switch off when said first current source is operated and turning on said second analog switch and turning off said first analog switch when said second variable d.c. current source is operated;

a first resistor and a second resistors which have small resistances relative to said motor for detecting current, said first resistor being connected in a path from said first voltage source terminal to said second voltage source terminal throgh said first analog switch, said d.c. motor and said first current source, said second resistor being connected in a path from said first voltage source terminal to said second voltage source terminal through said second analog switch, said d.c. motor and said second current source;

an additive-subtractive circuit receiving the respective voltages from both terminals of said d.c. motor and said first and second resistors, and multiplying said voltages by predetermined proportional coefficients and adding said multiplied voltages to carry out addition and subtraction and thereby generate a speed detection voltage indicating a speed of said d.c. motor; and speed servo comparator-controller means for comparing a speed control voltage for setting motor speed with said speed detection voltage, and controlling and selectively operating said first and second variable d.c. current sources.

3. A bidirectional d.c. motor driving circuit equipped with a speed servo as claimed in claim 2, wherein said speed servo comparator-controller means comprises a comparator for receiving said single-pole speed control voltage at one input terminal thereof and said speed detection voltage at other input terminal, comparing both voltages and producing an error control voltage proportional to a difference of said voltages;

wherein said first variable d.c. current source comprises a first differential amplifier for receiving said error control voltage at a first input terminal and a motor stop voltage of the same polarity as said error control voltage and set at a predetermined level at a second input terminal, and a first current driving transistor whose base is connected to an output terminal of said first differential amplifier and whose collector is connected to the second terminal of said d.c. motor and whose emitter is connected to the second voltage source terminal through said first resistor;

wherein said second variable d.c. current source comprises a second differential amplifier for receiving said motor stop voltage at a first input terminal corresponding in polarity to said first input terminal of said first operational amplifier and said error control voltage at a second input terminal corresponding in polarity to said second input terminal of said first operational amplifier, and a second current driving transistor whose base is connected to an output terminal of said second differential amplifier and whose collector is connected to said first terminal of said d.c. motor and whose emitter is connected to said second voltage source terminal through said second resistor; and wherein said switching control means comprises a comparator for comparing said error control voltage with said motor stop voltage and selectively causing said first analog switch to conduct when said first current driving transistor operates and said second analog switch to conduct when said second current driving transistor operates.

4. A position detector for producing a position signal indicating the position of an object moving in first and second predetermined linear directions within a predetermined positional range, said position detector comprising:

a moving slit plate comprising a first row and a second row of slits having the same slit width and the same slit pitch, said first row of slits being offset from said second row by one-half of said pitch thereof and moving linearly in the direction of said slits thus arranged interlockingly with a movement of said object in said first and second predetermined linear directions;

first and second light emitting means respectively arranged opposite to said first and second rows of slits on a first side of said moving slit plate;

a fixed slit plate having slits arranged in rows opposite to both said first and second rows of slits on a second side of said moving slit plate;

first photoelectric converter means arranged to receive light from said first light emitting means through the first row of slits of said moving slit plate and said fixed slits and second photoelectric converter means arranged to receive light from said second light emitting means through the second row of slits of said moving slit plate and said fixed slits; and means for generating a position signal, corresponding to a position of said object, from signals output by said first and second photoelectric converter means.

5. A position detector for producing a position signal indicating the position of an object moving in a predetermined direction within a predetermined positional range, said position detector comprising:

a color filter plate having a first color filter and a second color filter alternately arranged and of substantially equal widths, said first and second color filters substantially allowing respectively a first color component and a second color component of light to pass therethrough, and movable in the direction of alternation of said first and second color filters thus arranged interlockingly with a movement of said object;

a white light source opposed to a first side of said color filter plate;

a fixed slit plate opposed to a second side of said color filter plate, said fixed slit plate having slits substantially equal in width to that of said first and second color filters and light screens between said slits arranged in the same direction as the arrangement of said first and second color filters; and first and second color detecting means receiving said first and second components of light through the slits of said fixed slit plate, said first color detecting means preferentially converting said first color component of light over said second color component of light into a first electrical signal, said second color detecting means preferentially converting said second color component over said first color component into a second electrical signal, said first and second electrical signals indicating a position of said object.

6. A position detector as claimed in claim 4, wherein said moving slit plate further comprises third and fourth rows of slits having the same slit width and the same slit pitch as said first and second rows of slits, said third row of slits being offset from said fourth row by one-half of said pitch thereof, said third and fourth rows of slits being offset from said first and second rows, respectively, by one-quarter of said pitch thereof, said position detector further comprising:

third and fourth light emitting means respectively arranged opposite to said third and fourth rows of slits on said second side of of said moving slit plates;

said fixed slit plate further having slits arranged opposite to both said third and fourth rows of slits on said second side of said moving slit plate; and third photoelectric converter means arranged to receive light from said third light emitting means through the third row of slits of said moving slit plate and said fixed slits and fourth photoelectric converter means arranged to receive light from said fourth light emitting means through the fourth row of said moving slit plate and said fixed slits;

said means for generating a position signal providing said position signal in accordance with signals output by said first through fourth photoelectric converter means.

* * * * *